(12) United States Patent
Di et al.

(10) Patent No.: US 12,719,980 B2
(45) Date of Patent: Aug. 25, 2026

(54) TERMINAL STATE IDENTIFICATION METHOD AND APPARATUS

(71) Applicant: HONOR DEVICE CO., LTD., Shenzhen (CN)

(72) Inventors: Haoxuan Di, Shenzhen (CN); Junlong Guo, Shenzhen (CN); Danhong Li, Shenzhen (CN); Xiaowu Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 287 days.

(21) Appl. No.: 18/709,178

(22) PCT Filed: May 5, 2023

(86) PCT No.: PCT/CN2023/092352

§ 371 (c)(1),
(2) Date: May 10, 2024

(87) PCT Pub. No.: WO2023/226718

PCT Pub. Date: Nov. 30, 2023

(65) Prior Publication Data

US 2025/0055935 A1 Feb. 13, 2025

(30) Foreign Application Priority Data

May 27, 2022 (CN) ........................ 202210590878.X

(51) Int. Cl.
*H04M 1/72457* (2021.01)
*H04M 1/72454* (2021.01)

(52) U.S. Cl.
CPC ... *H04M 1/72457* (2021.01); *H04M 1/72454* (2021.01)

(58) Field of Classification Search
CPC ...................... H04M 1/72457; H04M 1/72454
See application file for complete search history.

(56) References Cited

U.S. PATENT DOCUMENTS

2011/0081634 A1 4/2011 Kurata et al.
2016/0379105 A1 12/2016 Moore, Jr. et al.
2022/0357826 A1* 11/2022 Cheng ................ G06F 3/04883

FOREIGN PATENT DOCUMENTS

CN 106817678 A 6/2017
CN 106912026 A 6/2017
CN 108196998 A 6/2018
CN 109257736 A 1/2019
(Continued)

*Primary Examiner* — Myron Wyche
(74) *Attorney, Agent, or Firm* — WOMBLE BOND DICKINSON (US) LLP

(57) ABSTRACT

A terminal state identification method and apparatus are provided, and are applied to the field of terminal technologies. The method includes: determining a first probability value based on acceleration data; determining a second probability value based on the acceleration data; determining a state of a terminal user based on the first probability value and the second probability value, where the state of the terminal user includes a first state, a second state, and a third state, when determining that the terminal user is in the first state, where the first interface includes a first window, and the first window is used to display travel recommendation information for a current location to the user.

20 Claims, 33 Drawing Sheets

(56) References Cited

FOREIGN PATENT DOCUMENTS

| | | | |
|---|---|---|---|
| CN | 109558841 | A | 4/2019 |
| CN | 111353467 | A | 6/2020 |
| CN | 112995409 | A | 6/2021 |
| CN | 113973282 | A | 1/2022 |
| CN | 114466102 | A | 5/2022 |
| CN | 116055618 | A | 5/2023 |
| JP | 2011100182 | A | 5/2011 |
| WO | 2019006732 | A1 | 1/2019 |
| WO | 2021179818 | A1 | 9/2021 |

* cited by examiner

TERMINAL STATE IDENTIFICATION METHOD AND APPARATUS

CROSS-REFERECNE TO RELATED APPLICATIONS

This application is a national stage of International Application No. PCT/CN2023/092352, filed on May 5, 2023, which claims priority to Chinese Patent Application No. 202210590878.X, filed on May 27, 2022. The disclosures of both of the aforementioned applications are hereby incorporated by reference in their entireties .

TECHNICAL FIELD

This application relates to the field of terminal technologies, and in particular, to a terminal state identification method and apparatus.

BACKGROUND

With rapid development of railway transportation, more users tend to select, during traveling, vehicles that run at a high speed, for example, a high-speed train, a bullet train, and a train. In addition, with popularization of intelligent terminals, the intelligent terminals become a necessity for users to carry during traveling. Therefore, when a high-speed and convenient travel service is enjoyed, terminal experience of the users cannot be ignored.

In the conventional technology, whether a terminal user is a high-speed railway user is identified by using a dedicated high-speed railway network. However, in this manner, a capability of identifying a high-speed train state of the terminal is very limited, and a state of getting on/off a high-speed train by the terminal user cannot be accurately identified. Consequently, user experience is affected. Therefore, a terminal state identification method needs to be urgently provided.

SUMMARY

In view of this, this application provides a terminal state identification method and apparatus, a computer-readable storage medium, and a computer program product, so that a scenario in which a terminal user gets on/off a high-speed train carriage can be intelligently identified, to recommend a corresponding function to the user and improve experience of using an intelligent terminal when the user takes a high-speed train.

According to a first aspect, a terminal state identification method is provided, and includes:

- obtaining acceleration data of a terminal by using an acceleration sensor;
- determining a first probability value based on the acceleration data, where the first probability value is used to represent a probability that the terminal is in a walking state, and when the first probability value is greater than a first probability threshold, the terminal is in the walking state;
- determining a second probability value based on the acceleration data, where the second probability value is used to represent a probability that the terminal is in a high-speed train state, and when the second probability value is greater than a second probability threshold, the terminal is in the high-speed train state;
- determining a state of a terminal user based on the first probability value and the second probability value, where the state of the terminal user includes a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and
- displaying a first interface when determining that the terminal user is in the first state, where the first interface includes a first window, and the first window is used to display travel recommendation information for a current location to the user.

The method may be performed by a terminal device or a chip in a terminal device. In this embodiment of this application, the first probability value (namely, the probability used to represent that the terminal is in the walking state) and the second probability value (namely, the probability used to represent that the terminal is in the high-speed train state) are determined by using the acceleration data; then the state of the terminal user is determined from the following three states based on the first probability value and the second probability value: the first state, the second state, and the third state, where the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and finally, when it is intelligently identified that the terminal is in the first state, a related recommendation interface is presented to the user to provide a convenient service for the user, to improve experience of using the intelligent terminal when the user takes a high-speed train.

In this embodiment of this application, the state in which the terminal user leaves a high-speed train carriage, a state in which the terminal user gets off a high-speed train carriage, or a state in which the terminal user does not enter a high-speed train carriage is defined as the first state.

In this embodiment of this application, the state in which the terminal user is located in a high-speed train carriage and a high-speed train is currently driving is defined as the second state.

In this embodiment of this application, the state in which the terminal user is located in a high-speed train carriage but a high-speed train does not drive (or stops running) is defined as the third state. The third state may also be referred to as an intermediate state.

A dedicated high-speed railway network is usually deployed around a high-speed railway. In this embodiment of this application, a specific quantity of base stations connected to the terminal is counted to determine whether the terminal is located along a high-speed railway line. That is, a quantity of high-speed railway base stations connected to the terminal along the high-speed railway line is used as a factor for identifying the state of the terminal user.

In a possible implementation, the method further includes:

- obtaining identification information of M access network devices, where the M access network devices are a plurality of access network devices recently connected to the terminal user; and
- determining a first quantity based on the identification information of the M access network devices, where the first quantity is a quantity of first access network devices in the M access network devices, and the first access network device is an access network device that carries a first identifier; and the determining a state of a terminal user based on the first probability value and the second probability value includes:

determining the state of the terminal user based on the first quantity, the first probability value, and the second probability value.

Optionally, the first identifier is highwayID. A dedicated high-speed railway network base station may carry highwayID.

A value of M is not specifically limited in this embodiment of this application. For example, the value of M may be 10, 13, or 15.

Therefore, by considering the first quantity, the first probability value, and the second probability value, accuracy of identifying the high-speed train state of the terminal user can be improved. In addition, for the second state, after the first quantity is introduced, accuracy of identifying that the terminal user switches from the first state to the second state can be significantly improved.

Optionally, in a possible implementation, the determining the state of the terminal user based on the first quantity, the first probability value, and the second probability value includes:

determining whether the first quantity is greater than a first quantity threshold;

obtaining a plurality of first probability thresholds in fourth preset duration;

obtaining, based on the plurality of first probability thresholds, fourth duration that is in the fourth preset duration and in which the terminal is in the walking state;

determining whether the fourth duration is greater than a sixth time threshold;

obtaining a plurality of second probability values in second preset duration;

obtaining, based on the plurality of second probability values, second duration that is in the second preset duration and in which the terminal is in the high-speed train state;

determining whether the second duration is greater than a seventh time threshold; and when the first quantity is greater than the first quantity threshold, the fourth duration is greater than the sixth time threshold, and the second duration is greater than the seventh time threshold, determining that the state of the terminal user is the second state, where the state of the terminal user is switched from the first state to the second state.

Therefore, when the state of the terminal user is determined with reference to the first quantity, not only a quantity of base stations that are connected to the terminal in a recent period of time and that carry a dedicated high-speed railway network identifier needs to be counted, but also accumulated duration (corresponding to the fourth duration) that is in a recent period of time (corresponding to the fourth preset duration) and in which the terminal user is in the walking state and accumulated duration (corresponding to the second duration) that is in a recent period of time (corresponding to the second preset duration) and in which the terminal user is in the high-speed train state need to be counted, and then the obtained quantity of base stations and accumulated duration are respectively compared with corresponding thresholds. When all of the quantity of base stations and the accumulated duration meet preset conditions, for example, the first quantity is greater than the first quantity threshold, the fourth duration is greater than the sixth time threshold, and the second duration is greater than the seventh time threshold, it may be determined that the terminal user is located in a high-speed train that is driving, that is, in the second state. This can improve accuracy of identifying the state of the terminal user.

In addition, to help people travel more conveniently, subway stations are usually built at high-speed railway stations. This embodiment of this application also provides a corresponding technical solution for this scenario.

In a possible implementation, when it is determined that the terminal user is in the first state, the method further includes:

detecting subway station information based on location information of the terminal;

displaying a second window in the first interface after identifying a subway station, where the second window is used to display information required for the terminal user to enter the subway station to the user, and the second window includes a first control;

detecting an operation performed on the first control; and displaying a second interface in response to the operation performed on the first control, where the second interface includes a subway boarding code.

Therefore, after the terminal user leaves a high-speed train carriage, if it is detected that the user enters the subway station, the subway boarding code may be further pushed to the user, to pop up or push a to-be-used exit card function for the user in real time. This saves a time for the user to actively open an exit card, and provides a convenient service for the user.

After the user gets off a high-speed train carriage, there is still a distance to a subway gate. Therefore, to reduce power consumption of the terminal, the subway station information may be detected based on the location information of the terminal after a period of time.

Optionally, in an embodiment, the detecting subway station information based on location information of the terminal includes: detecting the subway station information based on the location information of the terminal after a preset time period (for example, 10 minutes). In this way, power consumption of the terminal is reduced.

In a possible implementation, the second window further includes a second control; and the method further includes:

detecting an operation performed on the second control; and displaying a third interface in response to the operation performed on the second control, where the third interface includes a personal health code of the terminal user.

After it is detected that the terminal user leaves a high-speed train carriage, if it is detected that the user enters the subway station, a personal health code control may be pushed to the user. In this way, after getting off the high-speed train, the user may directly open the health code in a travel card, to provide convenience for the user.

In a possible implementation, the second window further includes a third control; and the method further includes:

detecting an operation performed on the third control; and displaying a fourth interface in response to the operation performed on the third control, where the fourth interface includes a communications itinerary card of the terminal user.

After it is detected that the terminal user leaves a high-speed train carriage, if it is detected that the user enters the subway station, an itinerary code control may be pushed to the user. In this way, after the user gets off the high-speed train, if an itinerary code needs to be displayed, the itinerary code may be directly opened in the travel card, to provide convenience for the user.

In a possible implementation, the method further includes:

enabling a network acceleration module when determining that the terminal user is in the second state.

For a high-speed train carriage that is driving, signal quality in the carriage is relatively poor. Therefore, when the second state is intelligently determined, the network acceleration module of the terminal may be turned on or enabled for the user, to accelerate a network connection or perform network optimization, and improve Internet access experience of the user in a subway carriage.

Optionally, the network acceleration module may be implemented through full network aggregation acceleration technology (Link Turbo) network optimization.

Optionally, in a possible implementation, before the enabling a network acceleration module, the method further includes:

determining whether the terminal is in a screen-on state; and enabling the network acceleration module if the terminal is in the screen-on state; or not enabling the network acceleration module if the terminal is not in the screen-on state.

Herein, whether the terminal is in the screen-on state may be determined after the second state is intelligently determined. If it is detected that the terminal is in the screen-on state, the user may be currently using the terminal. To improve experience of using the terminal in the high-speed train (for example, optimizing a network and increasing an Internet access speed of the user), the network acceleration module may be enabled. If it is detected that the terminal is not in the screen-on state, it indicates that the user does not use the terminal. To reduce power consumption, the network acceleration module may not be enabled.

Optionally, in a possible implementation, after the enabling a network acceleration module, the method further includes:

displaying a prompt box (or a prompt window) to the user, where the prompt box includes a first option and a second option, the first option is used to choose to disable the network acceleration module, and the second option is used to choose to continue to enable the network acceleration module.

If the user taps the first option, the network acceleration module is disabled, to avoid an increase in network traffic and reduce power consumption of the terminal. If the user taps the second option, a state of enabling the network acceleration module is maintained.

Optionally, in a possible implementation, before the enabling a network acceleration module, the method further includes:

detecting whether the user is currently using the mobile phone; and enabling the network acceleration module when detecting that the user is using the mobile phone.

For example, in a high-speed train carriage that is driving, the user needs to use the mobile phone while taking the high-speed train. In this case, if it is detected that the terminal is in a screen-on state, the network acceleration module is enabled. If it is detected that the user does not use the mobile phone, the network acceleration module is not enabled.

The state of the terminal user is determined based on the first probability value and the second probability value in the following three manners.

In a first possible implementation, the determining a state of a terminal user based on the first probability value and the second probability value includes:

obtaining a plurality of first probability values in first preset duration;

obtaining, based on the plurality of first probability values, first duration that is in the first preset duration and in which the terminal is in the walking state;

determining whether the first duration is greater than a first time threshold;

obtaining a plurality of second probability values in second preset duration;

obtaining, based on the plurality of second probability values, second duration that is in the second preset duration and in which the terminal is in the high-speed train state;

determining whether the second duration is less than a second time threshold; and when the first duration is greater than the first time threshold and the second duration is less than the second time threshold, determining that the terminal user is in the first state, where the state of the terminal user is switched from the second state to the first state.

Therefore, based on the first probability value and the second probability value, by determining a relationship between the first duration and the first time threshold and a relationship between the second duration and the second time threshold, it may be accurately determined that the terminal user is in the state of getting off a high-speed train carriage (namely, the first state), and switches from the second state to the first state.

In a second possible implementation, the determining a state of a terminal user based on the first probability value and the second probability value includes:

obtaining a plurality of first probability values in first preset duration;

obtaining, based on the plurality of first probability values, first duration that is in the first preset duration and in which the terminal is in the walking state;

determining whether the first duration is less than a third time threshold;

obtaining a plurality of second probability values in third preset duration;

obtaining, based on the plurality of second probability values, third duration that is in the third preset duration and in which the terminal is in the high-speed train state;

determining whether the third duration is less than a fourth time threshold; and when the first duration is less than the third time threshold and the third duration is less than the fourth time threshold, determining that the terminal user is in the third state, where the state of the terminal user is switched from the second state to the third state.

Therefore, based on the first probability value and the second probability value, by determining a relationship between the first duration and the third time threshold and a relationship between the third duration and the fourth time threshold, it may be accurately determined that the terminal user is in the third state, and switches from the second state to the third state.

In a third possible implementation, the determining a state of a terminal user based on the first probability value and the second probability value includes:

obtaining a plurality of second probability values in second preset duration;

obtaining, based on the plurality of second probability values, second duration that is in the second preset duration and in which the terminal is in the high-speed train state;

determining whether the second duration is greater than a fifth time threshold; and when the second duration is greater than the fifth time threshold, determining that the state of the terminal user is the second state, where the state of the terminal user is switched from the third state to the second state.

Therefore, based on the first probability value and the second probability value, by determining a relationship between the second duration and the fifth time threshold, it may be quickly determined that the terminal user is in the second state, and switches from the third state to the second state.

In a possible implementation, the method further includes:

displaying a fifth interface when determining that the terminal user is in the second state or the third state, where the fifth interface includes a third window, the third window is used to display information about long-distance public transportation navigation to the user, and the third window includes a fourth control;

detecting an operation performed on the fourth control; and displaying a sixth interface in response to the operation performed on the fourth control, where the sixth interface includes one or more of the following information: information about a current station, information about a passed station, and information about all stations of a current train number.

If it is determined that the terminal user is in the second state or the third state, a function of long-distance public transportation navigation may be further recommended to the user, to help improve user experience.

In a possible implementation, the determining a first probability value based on the acceleration data includes:

calculating the first probability value based on the acceleration data by using a first binary classification network.

In a possible implementation, the determining a second probability value based on the acceleration data includes:

calculating the second probability value based on the acceleration data by using a second binary classification network.

Optionally, the binary classification network may be a learning network such as a decision tree network, a support vector machines (support vector machines, SVM) network, a logistic regression network, or a neural network.

Optionally, the first binary classification network and the second binary classification network may be of different network types, or may be of a same network type. This is not specifically limited. For example, the first binary classification network is a decision tree network, and the second binary classification network is a binary classification neural network. For another example, both the first binary classification network and the second binary classification network are decision tree networks.

In a possible implementation, the method further includes:

displaying a first setting interface, where the first setting interface includes a high-speed train setting control; and entering a high-speed train setting interface in response to an operation performed by the user on the high-speed train setting control, where the high-speed train setting interface includes a third option, and the third option is used to choose to enable or disable the network acceleration module in the second state by default.

The user may preset, in the high-speed train setting control, whether to enable the network acceleration module in the high-speed train state by default. If the user sets that the network acceleration module in the high-speed train state is enabled by default, the network acceleration module is automatically enabled after a scenario in which the high-speed train is driving is intelligently identified (for example, the second state is entered), to improve Internet access experience when the user takes a high-speed train. If the user sets that the network acceleration module in the high-speed train state is disabled by default, the network acceleration module is not automatically enabled even after a scenario in which the high-speed train is driving is identified (for example, the subway carriage is entered), to reduce power consumption.

According to a second aspect, a terminal state identification apparatus is provided, including a unit configured to perform the method in any implementation of the first aspect. The apparatus may be a terminal (or a terminal device), or may be a chip in a terminal (or a terminal device). The apparatus includes an input unit, a display unit, and a processing unit.

When the apparatus is a terminal, the processing unit may be a processor, the input unit may be a communications interface, and the display unit may be a graphics processing module and a screen. The terminal may further include a memory. The memory is configured to store computer program code. When the processor executes the computer program code stored in the memory, the terminal is enabled to perform the method in any implementation of the first aspect.

When the apparatus is a chip in a terminal, the processing unit may be a logical processing unit in the chip, the input unit may be an output interface, a pin, a circuit, or the like, and the display unit may be a graphics processing unit in the chip. The chip may further include a memory. The memory may be a memory (for example, a register or a cache) in the chip, or may be a memory (for example, a read-only memory or a random access memory) located outside the chip. The memory is configured to store computer program code. When the processor executes the computer program code stored in the memory, the chip is enabled to perform the method in any implementation of the first aspect.

According to a third aspect, a computer-readable storage medium is provided. The computer-readable storage medium stores computer program code. When the computer program code is run by a terminal state identification apparatus, the apparatus is enabled to perform the method in any implementation of the first aspect.

According to a fourth aspect, a computer program product is provided. The computer program product includes computer program code. When the computer program code is run by a terminal state identification apparatus, the apparatus is enabled to perform the method in any implementation of the first aspect.

DESCRIPTION OF EMBODIMENTS

The following describes the technical solutions in the embodiments of this application with reference to the accompanying drawings.

The technical solutions in the embodiments of this application are applied to a scenario in which a user takes, with a terminal, a vehicle that runs at a high speed. The vehicle that runs at a high speed is not specifically limited in the embodiments of this application. The vehicle that runs at a high speed may be a vehicle of a train type, for example, a K-numbered train, a high-speed train, a maglev train, an express train, a bullet train, or an inter-city train. Alternatively, the vehicle that runs at a high speed may be a vehicle of a shipping type, for example, a cruise ship or a yacht.

For ease of description, in the embodiments of this application, a high-speed train is used as an example for description. However, this does not constitute a limitation on the embodiments of this application.

The technical solutions in the embodiments of this application are specific to a scenario in which a user gets on a high-speed train carriage with an intelligent terminal and a scenario in which the user gets off a subway carriage with the intelligent terminal. In addition, after the user gets on a high-speed train carriage with the intelligent terminal, a high-speed train may include two scenarios: The high-speed train is in a running state and the high-speed train is in a stop state (for example, stops at an intermediate station; or for another example, waits for departure). The terminal state identification method in the embodiments of this application is applicable to both scenarios.

Figure 1:
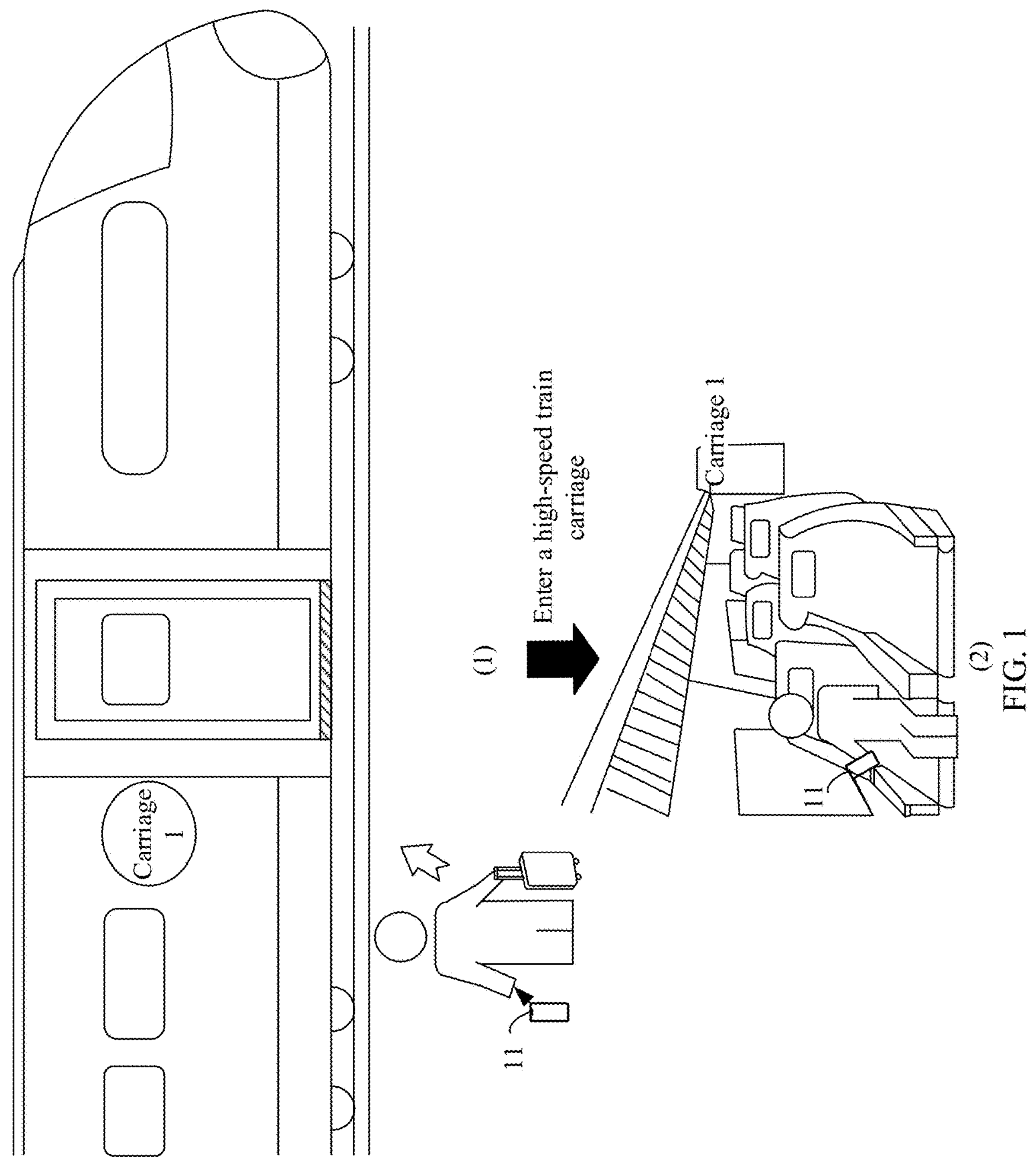
FIG. 1 is an example diagram of an application scenario according to an embodiment of this application.
Figure 2:
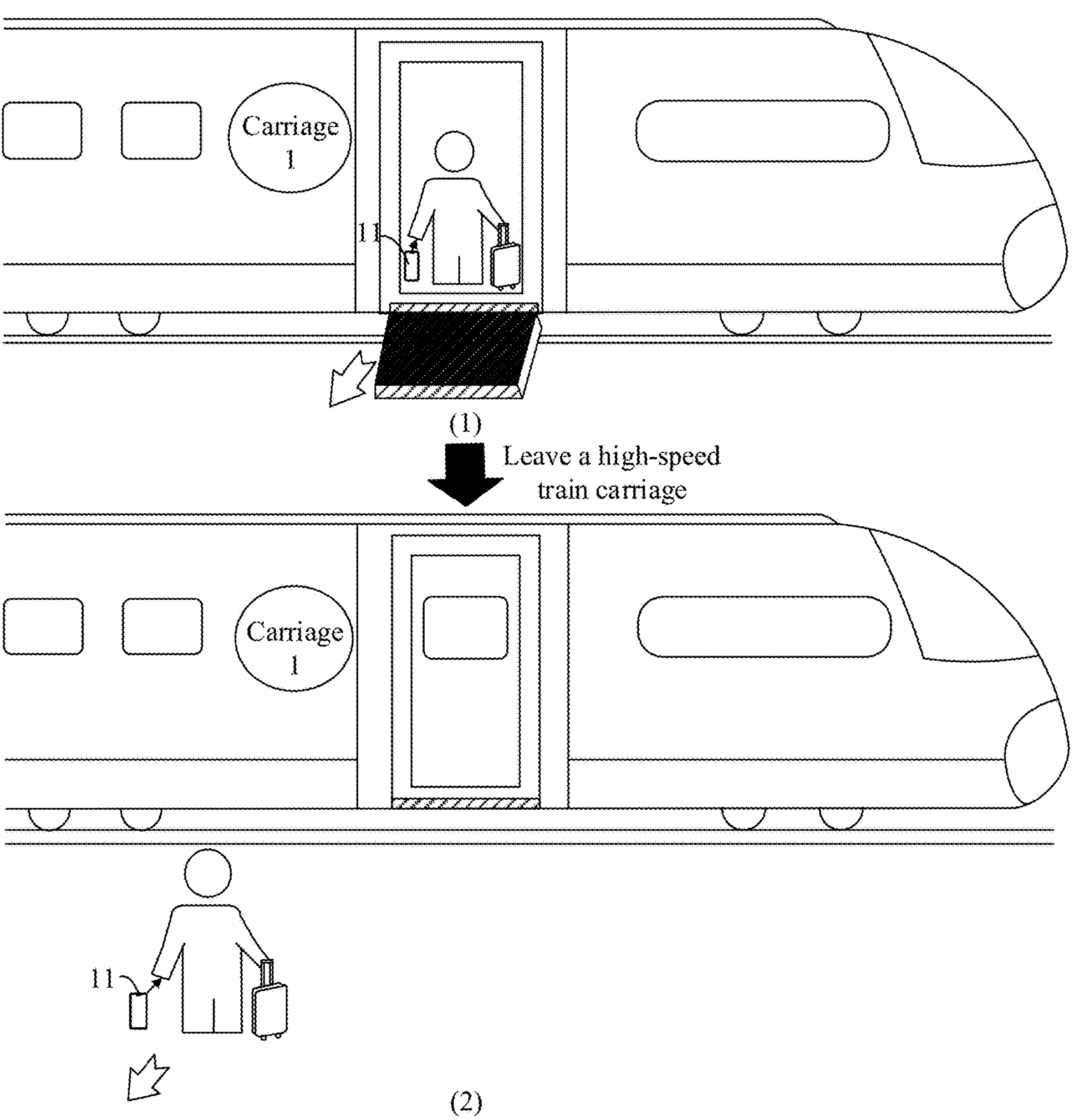
FIG. 2 is another example diagram of an application scenario according to an embodiment of this application.

The following describes an application scenario of the embodiments of this application with reference to examples in FIG. 1 and FIG. 2.

An example diagram of a scenario in which a user gets on a high-speed train carriage with a terminal is shown in (1) in FIGS. 1 and (2) in FIG. 1. As shown in (1) in FIG. 1, the user is ready to enter a high-speed train carriage with the terminal 11. As shown in (2) in FIG. 1, after entering the high-speed train carriage, the user may use the terminal 11.

It should be understood that a scenario that is shown in (2) in FIG. 1 and in which the user uses the terminal 11 in the high-speed train carriage is merely an example for description. The embodiments of this application are not limited thereto. Actually, the user may not use the terminal 11 after entering the high-speed train carriage.

It should be further understood that a high-speed train shown in (2) in FIG. 1 may be in a driving state, or may be in a non-driving state, for example, in a state of waiting for departure or in a state of making an intermediate stop.

An example diagram of a scenario in which a user leaves a high-speed train carriage with a terminal is shown in (1) in FIGS. 2 and (2) in FIG. 2. As shown in (1) in FIG. 2, a door of the subway carriage is opened, and the user is ready to leave the high-speed train carriage with the terminal 11. As shown in (2) in FIG. 2, the user has left the high-speed train carriage with the terminal 11.

It should be understood that the scenarios in FIG. 1 and FIG. 2 are merely examples for describing an application scenario of this application. This does not constitute a limitation on the embodiments of this application, and this application is not limited thereto.

In the embodiments of this application, an example in which a user takes a high-speed train is used for description. When the user takes a high-speed train, if it cannot be effectively identified whether a terminal is in a state of leaving a high-speed train carriage or entering a high-speed train carriage, a personalized recommendation cannot be provided for the user or network optimization cannot be performed. Consequently, experience of using the terminal when the user takes a high-speed train is affected.

According to the technical solutions provided in the embodiments of this application, acceleration data is collected by using an acceleration sensor; a first probability value and a second probability value are determined based on the acceleration data; a state of a terminal user is then determined based on the first probability value and the second probability value, where the state of the terminal user includes a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and a first interface is presented to the user when it is determined that the terminal is in the first state, where the first interface includes a first window, and the first window is used to display travel recommendation information for a current location to the user. In this way, a high-speed train state of the terminal can be accurately identified, to provide a recommendation service for the user in a corresponding scenario.

Figure 3:
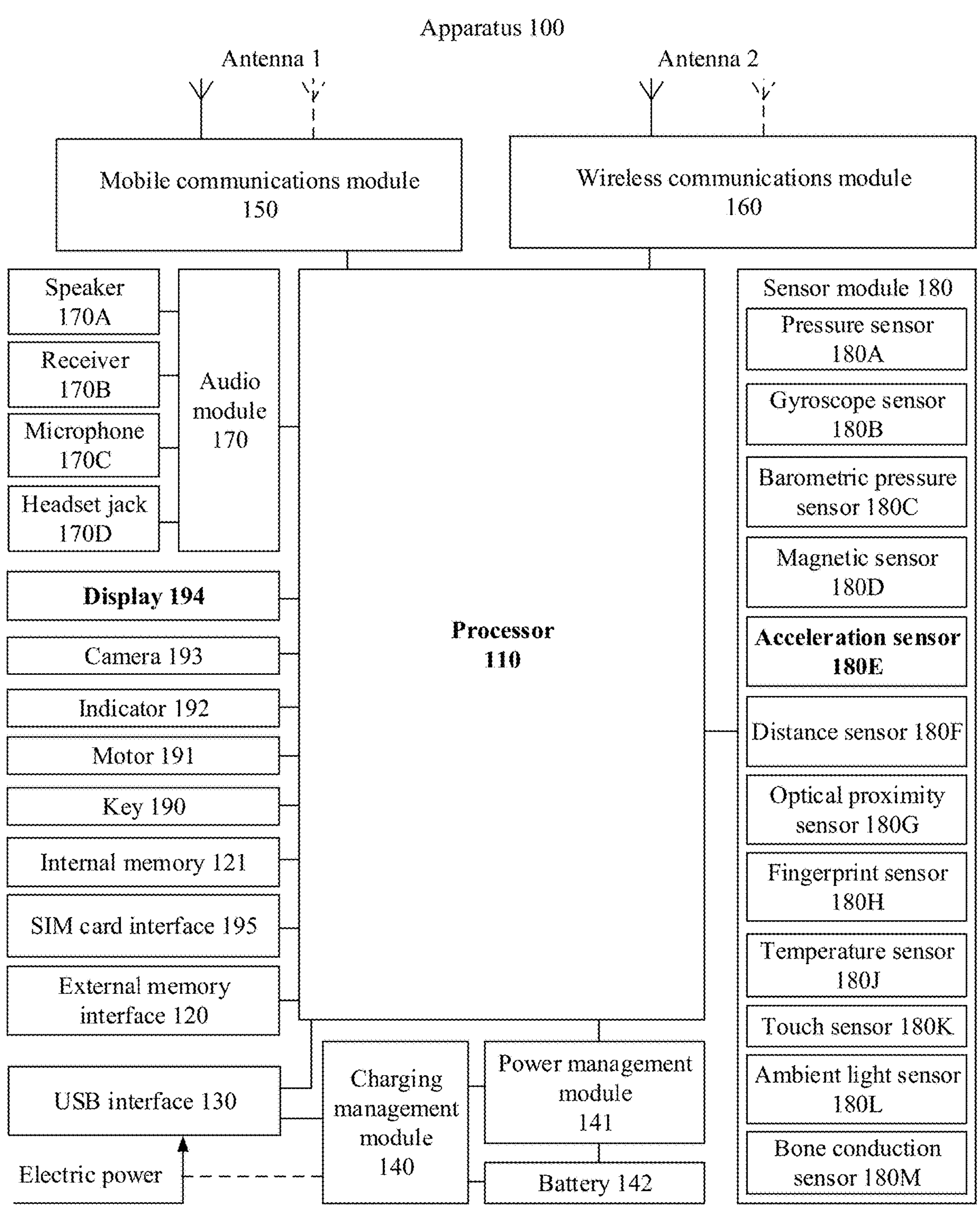
FIG. 3 is a schematic diagram of a hardware system of an electronic device applicable to this application.

FIG. 3 shows a hardware system of an electronic device applicable to this application.

The apparatus 100 may be an electronic device such as a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), or a projector. A specific type of the apparatus 100 is not limited in embodiments of this application.

The apparatus 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that a structure shown in FIG. 3 does not constitute a specific limitation on the apparatus 100. In some other embodiments of this application, the apparatus 100 may include more or fewer components than the components shown in FIG. 3, the apparatus 100 may include a combination of some of the components shown in FIG. 3, or the apparatus 100 may include subcomponents of some of the components shown in FIG. 3. For example, the optical proximity sensor 180G shown in FIG. 3 may be optional. The components shown in FIG. 3 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be an integrated device.

The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache. The memory may store instructions or data recently used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

The connection relationship between the modules shown in FIG. 3 is merely an example for description, and does not constitute a limitation on the connection relationship between the modules in the apparatus 100. Optionally, the modules in the apparatus 100 may alternatively use a combination of a plurality of connection manners in the foregoing embodiment.

The apparatus 100 may implement a display function by using the GPU, the display 194, and the application processor. The GPU is a microprocessor for image processing and is connected to the display 194 and the application processor. The GPU is configured to perform mathematical and geometric calculation for graphics rendering. The processor 110 may include one or more GPUs, and the one or more GPUs execute program instructions to generate or change displayed information.

The display 194 may be configured to display an image or a video. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light emitting diode (quantum dot light emitting diodes, QLED). In some embodiments, the apparatus 100 may include one or N displays 194, where N is a positive integer greater than 1.

The apparatus 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may perform algorithm optimization on noise, brightness, and a color of an image, and the ISP may further optimize parameters such as exposure and a color temperature of a photographing scene. In some embodiments, the ISP may be disposed in the camera 193.

The camera 193 is configured to capture a still image or a video. An optical image is generated for an object through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as red green blue (red green blue, RGB) or YUV. In some embodiments, the apparatus 100 may include one or N cameras 193, where N is a positive integer greater than 1.

The digital signal processor is configured to process a digital signal, and may process another digital signal in addition to the digital image signal. For example, when the apparatus 100 selects a frequency, the digital signal processor is configured to perform Fourier transform and the like on frequency energy.

The apparatus 100 may implement an audio function such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal. In some embodiments, the audio module 170 or some functional modules in the audio module 170 may be disposed in the processor 110.

The speaker 170A, also referred to as a loudspeaker, is configured to convert an audio electrical signal into a sound signal. The apparatus 100 may listen to music or listen to a hands-free call by using the speaker 170A.

The receiver 170B, also referred to as an earpiece, is configured to convert an audio electrical signal into a sound signal. When a user answers a call or listens to voice information by using the apparatus 100, the receiver 170B may be placed near an ear to listen to a voice.

The microphone 170C, also referred to as a mike or a mic, is configured to convert a sound signal into an electrical signal. When making a call or sending voice information, the user may make a sound near the microphone 170C to input a sound signal to the microphone 170C.

The headset jack 170D is configured to be connected to a wired headset. The headset jack 170D may be a USB interface 130, or may be a 3.5 mm open mobile apparatus 100 platform (open mobile terminal platform, OMTP) standard interface, or a cellular telecommunications industry association of the USA (cellular telecommunications industry association of the USA, CTIA) standard interface.

The gyroscope sensor 180B may be configured to determine a movement posture of the apparatus 100. In some embodiments, angular velocities of the apparatus 100 around three axes (namely, an x axis, a y axis, and a z axis) may be determined by using the gyroscope sensor 180B. The gyroscope sensor 180B may be configured to implement image stabilization during photographing. For example, when a shutter is pressed, the gyroscope sensor 180B detects a shake angle of the apparatus 100, and calculates, based on the angle, a distance that needs to be compensated by a lens module, so that the lens counteracts the shake of the apparatus 100 through a reverse movement, to implement image stabilization. The gyroscope sensor 180B may be further used in scenarios such as navigation and a motion sensing game.

The barometric pressure sensor 180C is configured to measure barometric pressure. In some embodiments, the apparatus 100 calculates an altitude based on a barometric pressure value that is measured by the barometric pressure sensor 180C, to assist in positioning and navigation.

The magnetic sensor 180D may include a Hall sensor. The apparatus 100 may detect opening and closing of a flip holster by using the magnetic sensor 180D. In some embodiments, when the apparatus 100 is a flip phone, the apparatus 100 may detect opening and closing of a flip cover based on the magnetic sensor 180D. The apparatus 100 may set a feature such as automatic unlocking of the flip cover based on a detected opening/closing state of the holster or a detected opening/closing state of the flip cover. Optionally, the magnetic sensor 180D may also be referred to as a magnetometer sensor. The magnetic sensor 180D is configured to collect magnetometer data of the apparatus 100. The magnetometer data reflects a magnetic field change around the electronic device.

The acceleration sensor 180E may detect magnitudes of acceleration of the apparatus 100 in all directions (usually, the x axis, the y axis, and the z axis). When the apparatus 100 is still, a magnitude and a direction of gravity may be detected. The acceleration sensor 180E may be further configured to identify a posture of the apparatus 100 as an input parameter of an application such as switching between a landscape mode and a portrait mode or a pedometer.

In some embodiments, acceleration data of the apparatus 100 may be obtained by using the acceleration sensor 180E.

The distance sensor 180F is configured to measure a distance. The apparatus 100 may measure a distance by using infrared or laser. In some embodiments, for example, in a photographing scene, the apparatus 100 may measure a distance by using the distance sensor 180F, to implement quick focusing.

The optical proximity sensor 180G may include, for example, a light-emitting diode (light-emitting diode, LED) and an optical detector such as a photodiode. The LED may be an infrared LED. The apparatus 100 emits infrared light outward by using the LED. The apparatus 100 detects infrared reflected light from a nearby object by using the photodiode. When the reflected light is detected, the apparatus 100 may determine that there is an object nearby. When no reflected light is detected, the apparatus 100 may determine that there is no object nearby. The apparatus 100 may detect, by using the optical proximity sensor 180G, whether the user holds the apparatus 100 close to the ear, to automatically turn off a screen to save power. The optical proximity sensor 180G may be further used for automatically unlocking and locking a screen in a holster mode or a pocket mode. It should be understood that the optical proximity sensor 180G in FIG. 3 may be an optional component. In some scenarios, an ultrasonic sensor may be used to replace the optical proximity sensor 180G to detect proximity light.

The ambient light sensor 180L is configured to sense brightness of ambient light. The apparatus 100 may adaptively adjust brightness of the display 194 based on the sensed brightness of the ambient light. The ambient light sensor 180L may be further configured to automatically adjust white balance during photographing. The ambient light sensor 180L may further cooperate with the optical proximity sensor 180G to detect whether the apparatus 100 is in a pocket to prevent an accidental touch.

The fingerprint sensor 180H is configured to collect a fingerprint. The apparatus 100 may implement functions, such as unlocking, application lock accessing, photographing, and incoming call answering, by using a feature of the collected fingerprint.

The touch sensor 180K is also referred to as a touch device. The touch sensor 180K may be disposed on the display 194. The touch sensor 180K and the display 194 form a touchscreen, and the touchscreen is also referred to as a touch control screen. The touch sensor 180K is configured to detect a touch operation performed on or near the touch sensor 180K. The touch sensor 180K may transfer the detected touch operation to the application processor, to determine a touch event type. A visual output related to the touch operation may be provided by using the display 194. In some other embodiments, the touch sensor 180K may alternatively be disposed on a surface of the apparatus 100 at a location different from that of the display 194.

The key 190 includes a power key and a volume key. The key 190 may be a mechanical key, or may be a touch-sensitive key. The apparatus 100 may receive a key input signal, to implement a function that is related to a key input signal.

The motor 191 may generate a vibration. The motor 191 may be configured to provide an incoming call prompt, and may be further configured to provide touch feedback. The motor 191 may generate different vibration feedback effects for different touch operations performed on different applications. For touch operations performed on different areas of the display 194, the motor 191 may also generate different vibration feedback effects. Different application scenarios (for example, a time reminder, information receiving, an alarm clock, and a game) may correspond to different vibration feedback effects. A touch vibration feedback effect may be further customized.

In some embodiments, the processor 110 may obtain acceleration data of a terminal by using the acceleration sensor 180E; determine a first probability value based on the acceleration data, where the first probability value is used to represent a probability that the terminal is in a walking state, and when the first probability value is greater than a first probability threshold, the terminal is in the walking state; determine a second probability value based on the acceleration data, where the second probability value is used to represent a probability that the terminal is in a high-speed train state, and when the second probability value is greater than a second probability threshold, the terminal is in the high-speed train state; determine a state of a terminal user based on the first probability value and the second probability value, where the state of the terminal user includes a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and when determining that the terminal user is in the first state, invoke the display 194 to display a first interface, where the first interface includes a first window, and the first window is used to display travel recommendation information for a current location to the user.

The hardware system of the apparatus 100 is described above in detail. The following describes a software system of the apparatus 100. The software system may use a layered architecture, an event-driven architecture, a microkernel architecture, a microservices architecture, or a cloud architecture. In the embodiments of this application, the layered architecture is used as an example to describe the software system of the apparatus 100.

Figure 4:
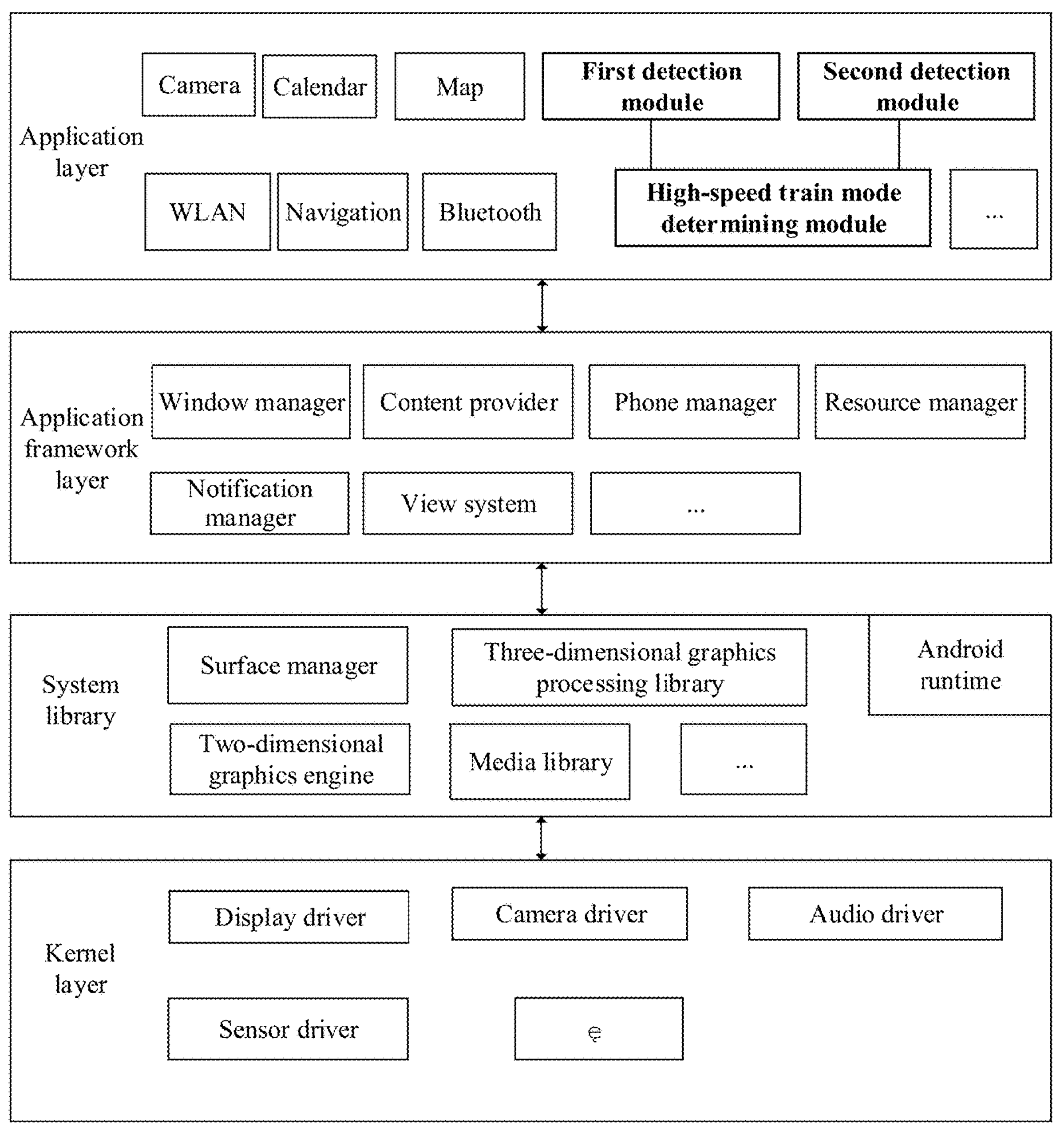
FIG. 4 is a schematic diagram of a software system of an electronic device applicable to this application.

As shown in FIG. 4, a software system using a layered architecture is divided into several layers, and each layer has a clear role and task. The layers communicate with each other by using a software interface. In some embodiments, the software system may be divided into four layers: an application layer, an application framework layer, an Android runtime (Android Runtime) and system library, and a kernel layer from top to bottom.

The application layer may include applications such as Camera, Calendar, Phone, Map, Navigation, WLAN, and Bluetooth. It may be understood that the application shown in FIG. 4 is merely an example for description, and the embodiments of this application are not limited thereto. Optionally, the application layer may further include another system application (for example, Gallery, Music, Video, or Messages), a third-party program installed by a user, and the like.

In some possible embodiments, the application layer further includes a first detection module, a second detection module, and a high-speed train mode determining module. The first detection module is configured to determine a first probability value based on acceleration data. The first probability value is used to represent a probability that a terminal is in a walking state. When the first probability value is greater than a first probability threshold, the terminal is in the walking state. The second detection module is configured to determine a second probability value based on the acceleration data. The second probability value is used to represent a probability that the terminal is in a high-speed train state. When the second probability value is greater than a second probability threshold, the terminal is in the high-speed train state. The high-speed train mode determining module is configured to determine a state of a terminal user based on the first probability value and the second probability value. The state of the terminal user includes a first state, a second state, and a third state. The first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running.

Optionally, in some possible embodiments, the high-speed train mode determining module is further configured to determine the state of the terminal user based on the first quantity, the first probability value, and the second probability value. The first quantity is a quantity of first access network devices in M access network devices. The first access network device is an access network device that carries a first identifier. The M access network devices are a plurality of access network devices recently connected to the terminal user.

It should be understood that an example in which the first detection module, the second detection module, and the subway mode determining module are located at the application layer is used above for description. However, the embodiments of this application are not limited thereto. Actually, some or all of the first detection module, the second detection module, and the subway mode determining module may be located at another layer (for example, the system library) or the like.

The application framework layer provides an application programming interface (application programming interface, API) and a programming framework for the application at the application layer. The application framework layer may include some predefined functions.

For example, the application framework layer includes a window manager, a content provider, a view system, a phone manager, a resource manager, and a notification manager.

The window manager is configured to manage a window program. The window manager may obtain a display size, determine whether there is a status bar, perform screen locking, take a screenshot, and the like.

The content provider is configured to store and obtain data, and enable the data to be accessible to an application. The data may include a video, an image, audio, calls made and answered, a browsing history and a bookmark, and an address book.

The view system includes visual controls such as a text display control and a picture display control. The view system may be configured to construct an application. A display interface may include one or more views, for example, include a display interface of an SMS message notification icon, and may include a text display view and a picture display view.

The phone manager is configured to provide a communications function for the apparatus 100, for example, management of a call state (answering or declining).

The resource manager provides various resources for an application, such as a localized string, an icon, a picture, a layout file, and a video file.

The notification manager enables an application to display notification information in a status bar, and may be configured to convey a notification message that may automatically disappear after a short stay without requiring user interaction. For example, the notification manager is configured to provide a notification of download completion and a message notification. The notification manager may further manage a notification that appears in the status bar at the top of the system in a form of a graph or scroll bar text, for example, a notification of an application running in the background. The notification manager may further manage a notification that appears on a screen in a form of a dialog window. For example, text information is displayed in the status bar, a prompt tone is made, the electronic device vibrates, or an indicator light blinks.

The Android Runtime includes a kernel library and a virtual machine. The Android Runtime is responsible for scheduling and management of the Android system.

The kernel library includes two parts: One part is a functional function that needs to be invoked by a java language, and the other part is a kernel library of Android.

The application layer and the application framework layer are run in the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, an open graphics library for embedded systems (open graphics library for embedded systems, OpenGL ES)), and a 2D graphics engine (for example, a skia graphics library (skia graphics library, SGL)).

The surface manager is configured to manage a display subsystem and provide fusion of 2D and 3D layers for a plurality of applications.

The media library supports playback and recording of audio in a plurality of formats, playback and recording of videos in a plurality of formats, and still image files. The media library may support a plurality of audio and video coding formats, such as MPEG-4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The three-dimensional graphics processing library may be configured to implement three-dimensional graphics drawing, image rendering, composition, and layer processing.

The two-dimensional graphics engine is a drawing engine for 2D drawing.

The kernel layer is a layer between hardware and software. The kernel layer may include drive modules such as a display driver, a camera driver, an audio driver, and a sensor driver.

The following describes an example of working procedures of the software system and the hardware system of the apparatus 100 with reference to display of a photographing scene.

When a user performs a touch operation on the touch sensor 180K, a corresponding hardware interrupt is sent to the kernel layer. The kernel layer processes the touch operation into an original input event. The original input event includes, for example, information such as touch coordinates and a timestamp of the touch operation. The original input event is stored at the kernel layer. The application framework layer obtains the original input event from the kernel layer, identifies a control corresponding to the original input event, and notifies an application (application, APP) corresponding to the control. For example, the touch operation is a tap operation, and the APP corresponding to the control is a camera APP. After the camera APP is awakened by the tap operation, the camera driver at the kernel layer may be invoked by using the API, and the camera 193 may be controlled by using the camera driver to perform photographing.

The following describes the terminal state identification method and apparatus according to the embodiments of this application with reference to FIG. 5A and FIG. 5B to FIG. 21A and FIG. 21B.

Figure 5A:
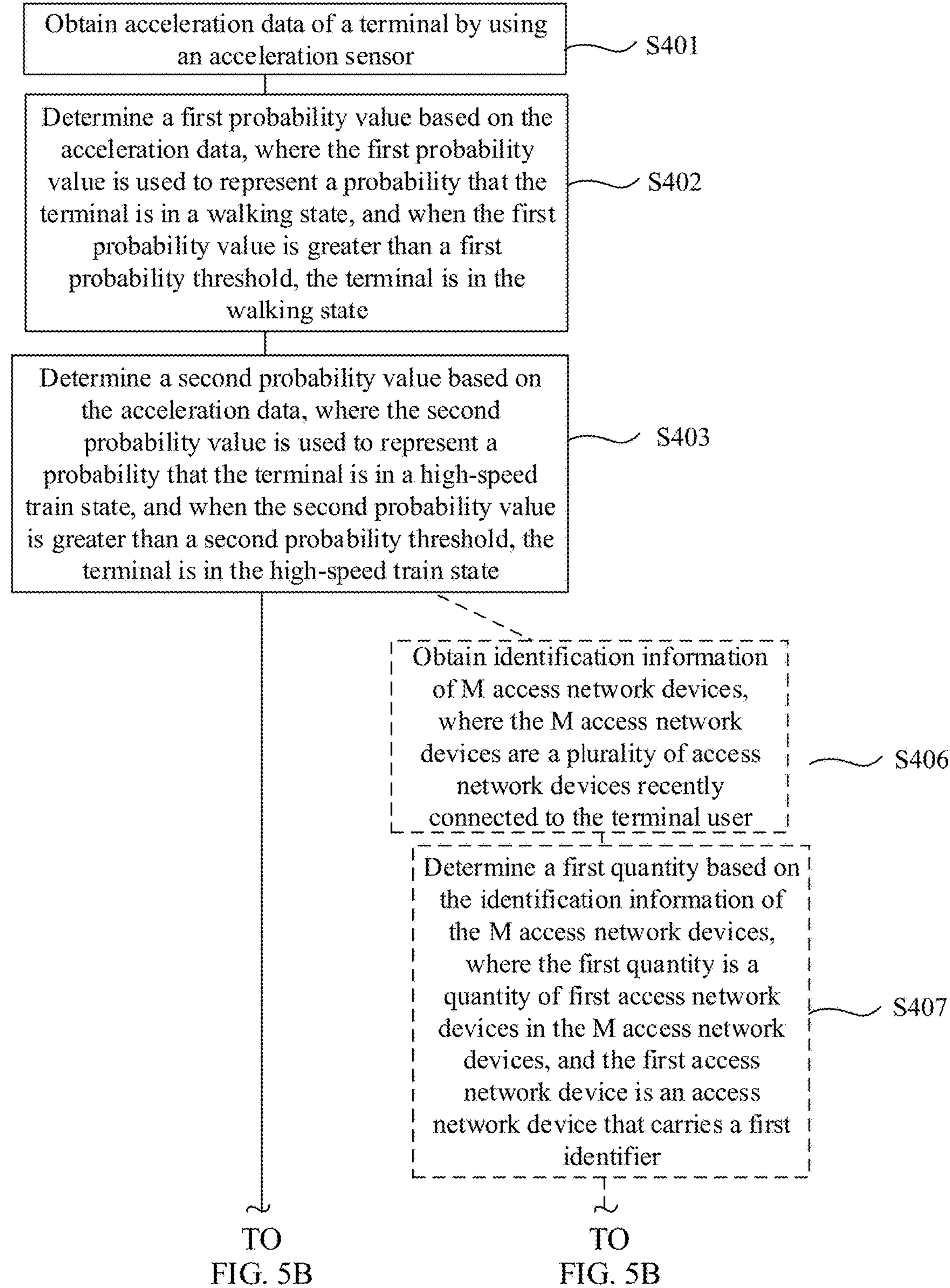
FIG. 5A and FIG. 5B are a schematic flowchart of a terminal state identification method according to an embodiment of this application.
Figure 5B:
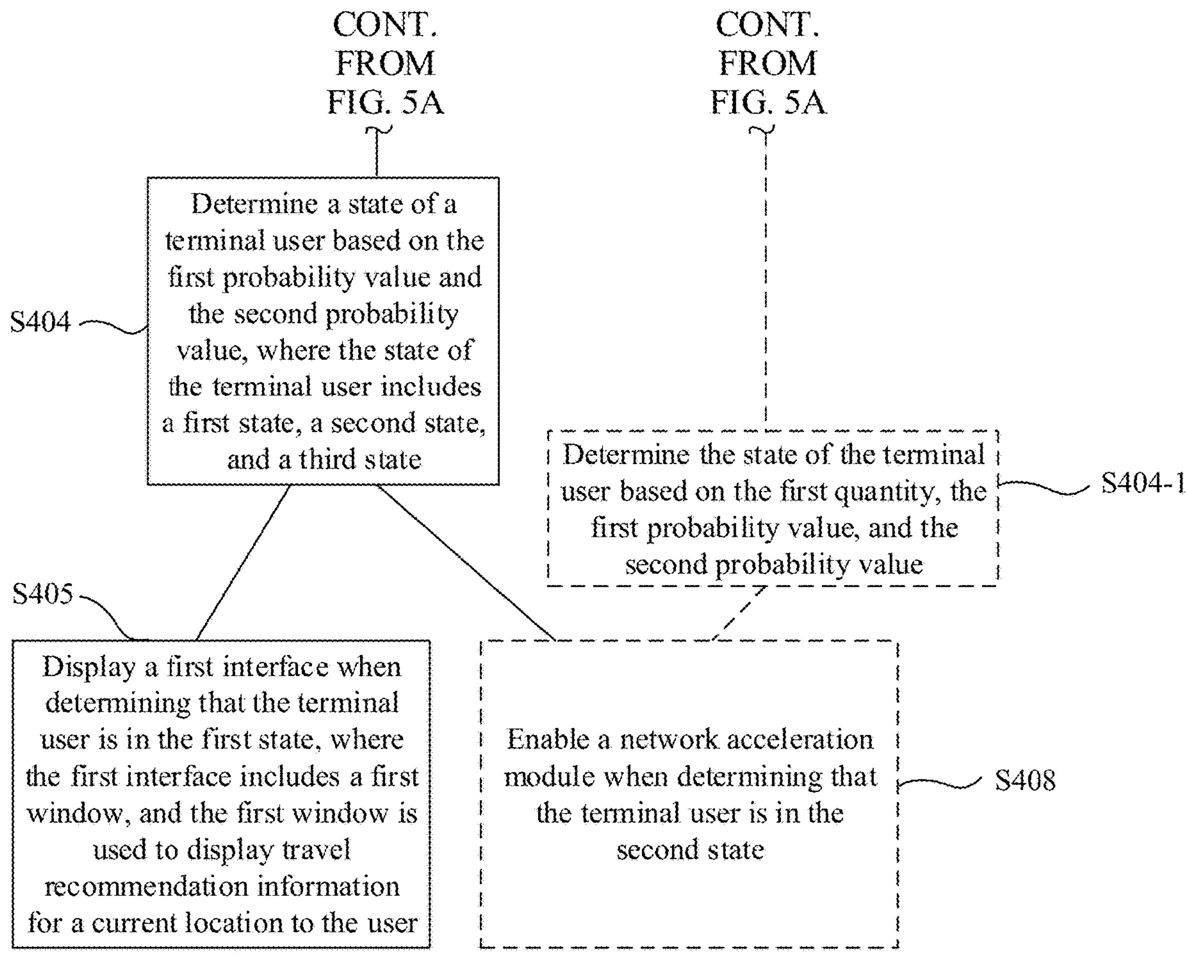

FIG. 5A and FIG. 5B are a schematic flowchart of a terminal state identification method 400 according to an embodiment of this application. It may be understood that an acceleration sensor in FIG. 5A and FIG. 5B is merely an example for description, and this application is not limited thereto. It may be understood that the sensor may be replaced with a sensor that has a same function. The method may be applied to the scenarios shown in FIG. 1 and FIG. 2. The method 400 includes the following steps.

S401: Obtain acceleration data of a terminal by using the acceleration sensor.

Specifically, when a user carries the terminal, the acceleration data may be collected by using the acceleration sensor. For example, the acceleration data includes 3-axis (x axis, y axis, and z axis) data.

It may be understood that the acceleration sensor may be replaced with another sensor that can collect the acceleration data of the terminal.

For example, the acceleration sensor may be the acceleration sensor 180E in FIG. 3.

S402: Determine a first probability value based on the acceleration data, where the first probability value is used to represent a probability that the terminal is in a walking state, and when the first probability value is greater than a first probability threshold, the terminal is in the walking state.

A walking state of a terminal user is a movement state in which the user walks with the terminal.

It should be understood that walking is an overview of a movement behavior scenario of the user, and walking includes but is not limited to behavior such as having a walk, running, or jumping.

The first probability value may also be expressed as a walking probability value. The first probability value is used to represent the probability that the terminal is currently in the walking state.

Optionally, whether the terminal is in the walking state may be determined by setting the first probability threshold. If the calculated first probability value is greater than the first probability threshold, it is determined that the terminal is in the walking state.

It may be understood that the first probability threshold may be preset. A value of the first probability threshold is not limited in this embodiment of this application.

In this embodiment of this application, a subway probability value may be calculated by using a binary classification network. Optionally, in an embodiment, S402 includes: inputting the acceleration data to a first binary classification network to obtain the first probability value.

The first binary classification network is a pre-trained network, and the collected acceleration data is input to the first binary classification network, to output the first probability value.

A training process of the first binary classification network is not specifically limited in this embodiment of this application. For example, training data may be input to a decision tree network, and a parameter of a training model is continuously adjusted through iterative optimization until the training model is stable. After the model is stable, the trained model is used as the first binary classification network.

Figure 6:
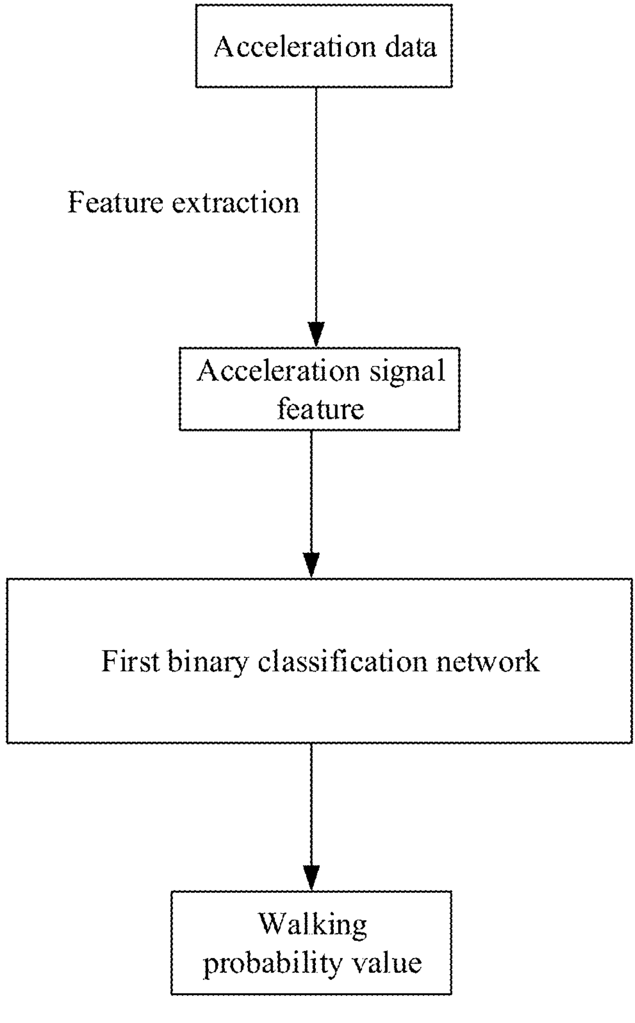
FIG. 6 is an example flowchart of calculating a walking probability value according to an embodiment of this application.

A flowchart in FIG. 6 is used as an example for description. As shown in FIG. 6, a process of calculating the first probability value may include the following steps: Feature extraction is performed based on the acceleration data, to obtain an acceleration signal feature; feature extraction is performed based on magnetometer data, to obtain a magnetometer signal feature; the acceleration signal feature is input to the first binary classification network; and the walking probability value (namely, the first probability value) is obtained.

For example, that feature extraction is performed based on the acceleration data, to obtain an acceleration signal feature includes: The 3-axis data collected by the acceleration sensor is fused; and then the acceleration signal feature is extracted. For example, a time domain feature is obtained by calculating a mean variance and the like of fused 3-axis data, and a frequency domain feature is obtained in a manner such as Fourier transform or wavelet transform.

It should be understood that a person skilled in the art may learn that there are a plurality of means for feature extraction. This is merely an example for description. This embodiment of this application is not limited thereto.

A type of the binary classification network (including the first binary classification network and a second binary classification network that appears below) is not limited in this embodiment of this application. For example, the binary classification network may be a learning network such as a decision tree network, a support vector machines (support vector machines, SVM) network, a logistic regression network, or a neural network.

S403: Determine a second probability value based on the acceleration data, where the second probability value is used to represent a probability that the terminal is in a high-speed train state (which specifically refers to a high-speed train that is driving or that is running at a high speed), and when the second probability value is greater than a second probability threshold, the terminal is in the high-speed train state.

The second probability value may also be expressed as a high-speed train probability value. The second probability value is used to represent the probability that the terminal is currently in the high-speed train state.

Optionally, whether the terminal is in the high-speed train state may be determined by setting the second probability threshold. If the calculated second probability value is greater than the second probability threshold, it is determined that the terminal is in the high-speed train state.

It may be understood that the second probability threshold may be preset. A value of the second probability threshold is not limited in this embodiment of this application.

Similarly, in this embodiment of this application, the high-speed train probability value may be calculated by using a binary classification network. Optionally, in an embodiment, S403 includes: inputting the acceleration data to the second binary classification network to obtain the second probability value.

The second binary classification network is a pre-trained network, and the collected acceleration data is input to the second binary classification network, to output the second probability value.

A training process of the second binary classification network is not specifically limited in this embodiment of this application. For example, training data may be input to a decision tree network, and a parameter of a training model is continuously adjusted through iterative optimization until the training model is stable. After the model is stable, the trained model is used as the second binary classification network.

Figure 7:
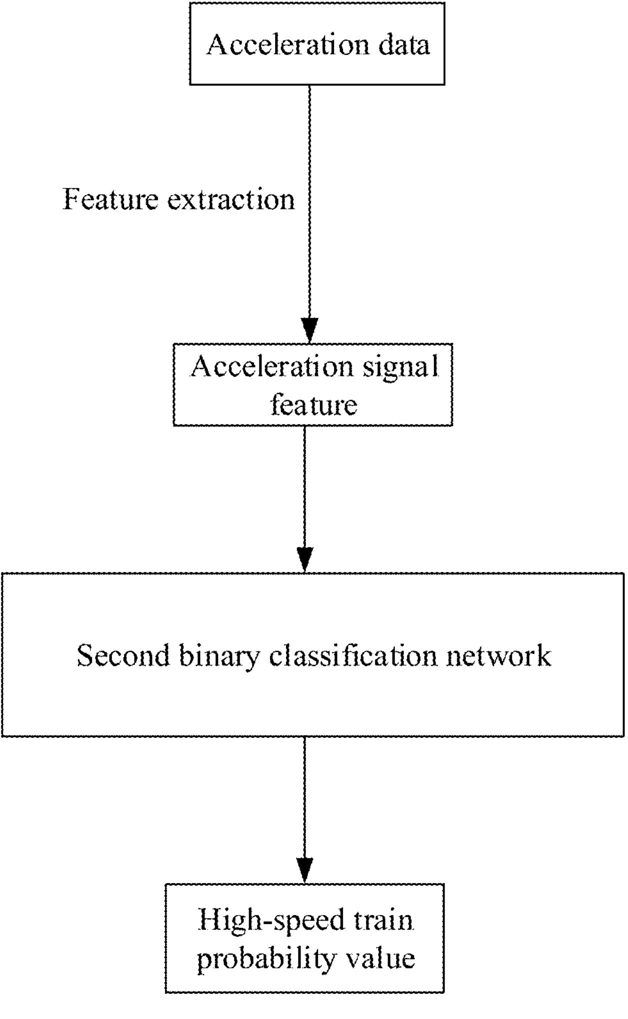
FIG. 7 is an example flowchart of calculating a high-speed train probability value according to an embodiment of this application.
Figure 8:
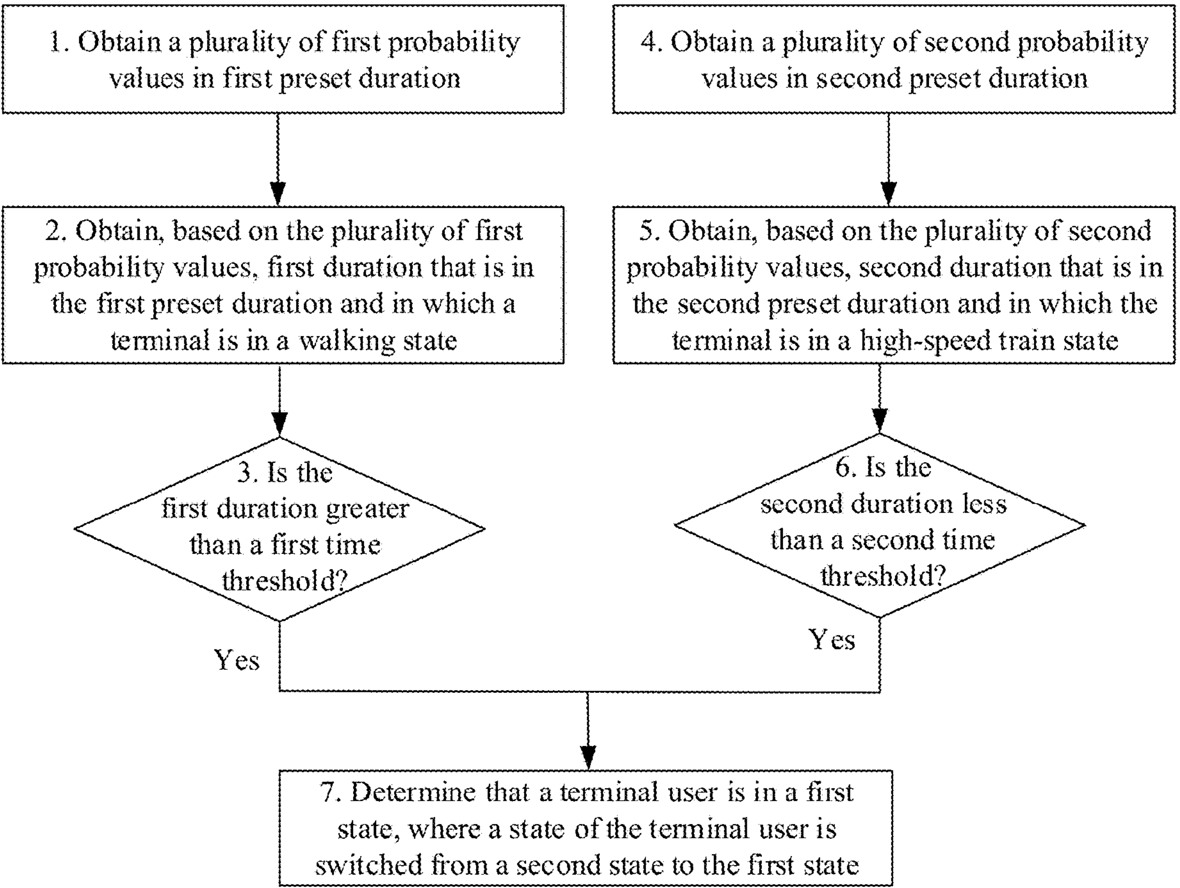
FIG. 8 is an example flowchart of determining a state of a terminal user according to an embodiment of this application.

A flowchart in FIG. 7 is used as an example for description. As shown in FIG. 7, a process of calculating the second probability value may include the following steps: Feature extraction is performed based on the acceleration data, to obtain an acceleration signal feature; the acceleration signal feature is input to the second binary classification network; and the high-speed train probability value (namely, the second probability value) is obtained.

For example, that feature extraction is performed based on the acceleration data, to obtain an acceleration signal feature includes: The 3-axis data collected by the acceleration sensor is fused; and then the acceleration signal feature is extracted. For example, a time domain feature is obtained by calculating a mean variance and the like of fused 3-axis data, and a frequency domain feature is obtained in a manner such as Fourier transform or wavelet transform.

It should be understood that a person skilled in the art may learn that there are a plurality of means for feature extraction. This is merely an example for description. This embodiment of this application is not limited thereto.

S404: Determine a state of a terminal user based on the first probability value and the second probability value, where the state of the terminal user includes a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running.

Generally, from a perspective of whether the terminal user leaves a high-speed train carriage, the terminal user may be in a state of entering a high-speed train carriage, or may be in a state of leaving a high-speed train carriage. When the user is in a high-speed train carriage, based on a driving state of the high-speed train, the high-speed train may be driving or the high-speed train may stop running (for example, stop at an intermediate station; or for another example, wait for a waiting time before departure).

In this embodiment of this application, the state in which the terminal user leaves a high-speed train carriage, a state in which the terminal user gets off a high-speed train carriage, or a state in which the terminal user does not enter a high-speed train carriage is defined as the first state. Optionally, in an implementation, the terminal user may switch from a state of being in a high-speed train that is driving to the state of getting off a high-speed train carriage.

For example, if a high-speed train arrives at a destination station after driving for a period of time, and the terminal user leaves a high-speed train carriage, it may be considered that the terminal user switches from the second state to the first state.

In this embodiment of this application, the state in which the terminal user is located in a high-speed train carriage and a high-speed train is currently driving is defined as the second state. Optionally, in an implementation, the terminal user may switch from the state of not entering a high-speed train carriage to a state of being in a high-speed train carriage that is driving.

For example, after arriving at a high-speed railway station, the user may enter the high-speed railway station through ticket check, and then enter a high-speed train carriage. After the user enters the high-speed train carriage, the high-speed train starts driving. In a process from ticket check at the station to running of the high-speed train, it may be considered that the terminal user switches from the first state to the second state.

Optionally, in an implementation, the terminal user may switch from a state of being in a high-speed train carriage that stops running to a state of being in a high-speed train carriage that is driving.

For example, if a high-speed train stops at an intermediate station after driving for a period of time, the user still stays in a high-speed train carriage, and the high-speed train continues to drive after staying for a period of time, it may be considered that the terminal user switches from the third state to the second state.

In this embodiment of this application, the state in which the terminal user is located in a high-speed train carriage but a high-speed train does not drive (or stops running) is defined as the third state. The third state may also be referred to as an intermediate state. Optionally, the terminal user may switch from a state in which a high-speed train is driving to the intermediate state.

For example, if the high-speed train stops at an intermediate station after driving for a period of time, and the user still stays in a high-speed train carriage, it may be considered that the terminal user switches from the second state to the third state.

The following describes in detail an implementation of determining the state of the terminal user with reference to the first probability value and the second probability value.

Specifically, the state of the terminal user is determined based on the first probability value and the second probability value in the following two manners.

Manner 1: Optionally, in a possible implementation, the determining a state of a terminal user based on the first probability value and the second probability value may include step 1 to step 7 in FIG. 8. Specific steps are as follows:

Step 1: Obtain a plurality of first probability values in first preset duration.

Step 2: Obtain, based on the plurality of first probability values, first duration that is in the first preset duration and in which the terminal is in the walking state.

Step 3: Determine whether the first duration is greater than a first time threshold.

Step 4: Obtain a plurality of second probability values in second preset duration.

Step 5: Obtain, based on the plurality of second probability values, second duration that is in the second preset duration and in which the terminal is in the high-speed train state.

Step 6: Determine whether the second duration is less than a second time threshold.

Step 7: When the first duration is greater than the first time threshold and the second duration is less than the second time threshold, determine that the terminal user is in the first state, where the state of the terminal user is switched from the second state to the first state.

Specific duration of the first preset duration is not limited in this embodiment of this application. For example, the first preset duration may be set to 12 seconds.

Specific duration of the second preset duration is not limited in this embodiment of this application. For example, the second preset duration may be set to 35 seconds.

As described above, when the first probability value is greater than the first probability threshold, the terminal may be defined as being in the walking state. Herein, accumulated duration (corresponding to the first duration) that is in a recent period of time (corresponding to the first preset duration) and in which the terminal is in the walking state needs to be counted, and then the accumulated duration is compared with a specified threshold (corresponding to the first time threshold). In addition, accumulated duration (corresponding to the second duration) that is in a recent period of time (corresponding to the second preset duration) and in which the terminal is in the high-speed train state further needs to be counted, and then the accumulated duration is compared with a specified threshold (corresponding to the second time threshold). If the first duration is greater than the first time threshold and the second duration is less than the first time threshold, it is determined that the terminal user is in the first state, and switches from the second state to the first state.

It should be noted that the first duration may be duration including consecutive time points in the first preset duration, or may be duration including inconsecutive time points in the first preset duration.

For example, the first duration includes the first second, the third second, the fourth second, and the sixth second in the first preset duration.

For another example, the first duration includes the first second to the fourth second in the first preset duration.

Similarly, for descriptions of the second duration, refer to explanations of the first duration. For brevity, details are not described herein again.

For example, if the first time threshold is 6 seconds, the first preset duration is 12 seconds, and in the 12 seconds, the accumulated duration in which the terminal is in the walking state is counted as 8 seconds; and if the second time threshold is 16 seconds, the second preset duration is 32 seconds, and in the 32 seconds, the accumulated duration in which the terminal is in the high-speed train state is counted as 10 seconds, it may be learned that the 8 seconds is greater than the 6 seconds, and the 10 seconds is less than the 16 seconds. In this case, it is determined that the terminal user switches from the second state to the first state.

Generally, when the user switches from the state of being located in a carriage that is driving to the state of leaving a high-speed train carriage, there is a process in which the second probability value (or the high-speed train probability value or a high-speed train score value) decreases and the first probability value (or the walking probability value or a walking score value) increases. The following provides descriptions with reference to an example in FIG. 9.

Figure 9:
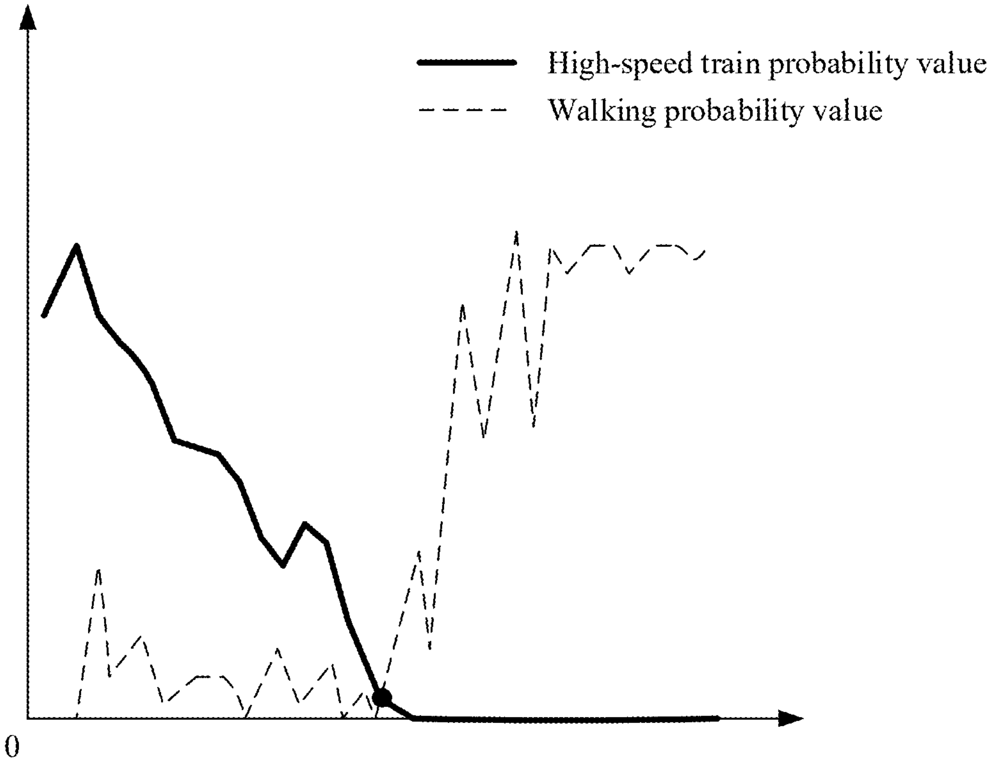
FIG. 9 is a schematic diagram of change trends of a first probability value and a second probability value after a user gets off a high-speed train carriage.
Figure 10:
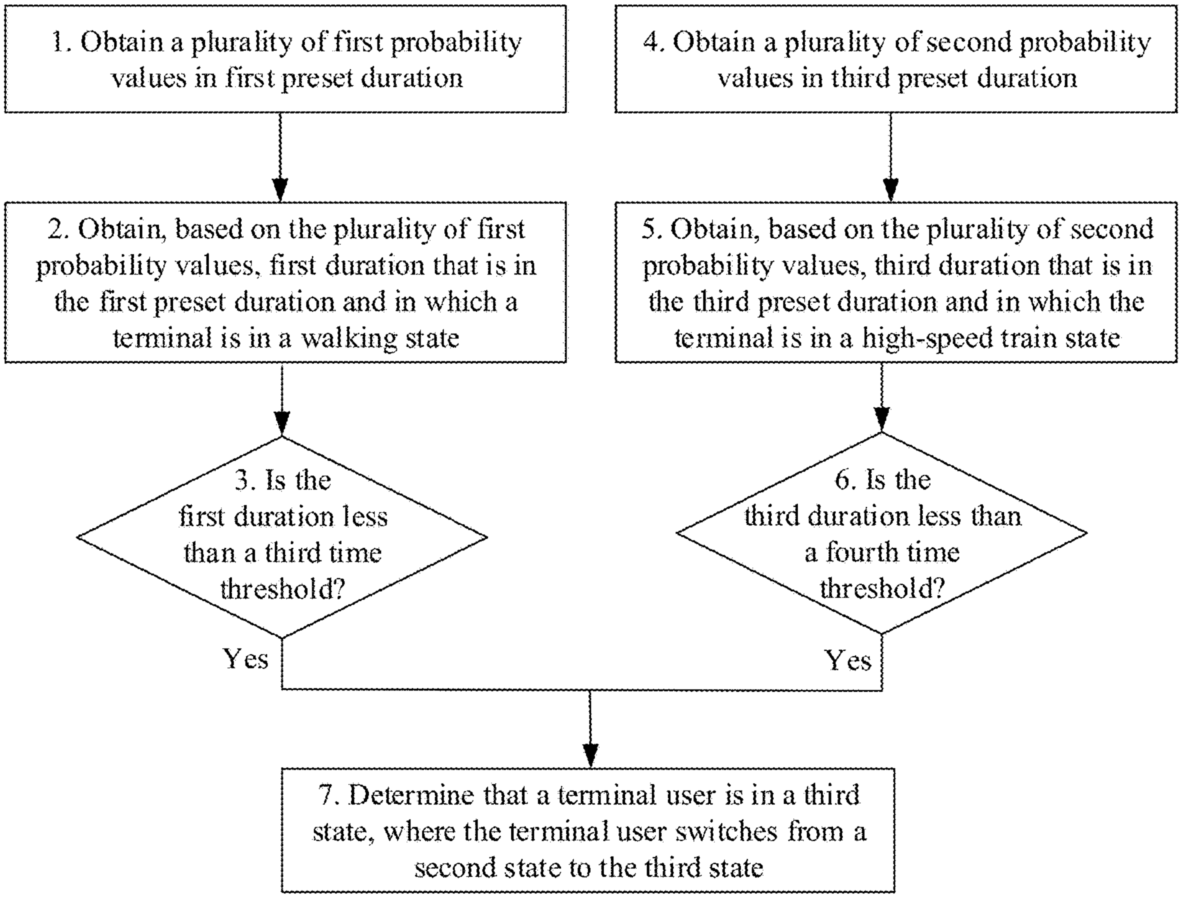
FIG. 10 is another example flowchart of determining a state of a terminal user according to an embodiment of this application.

FIG. 9 shows change trends of the first probability value and the second probability value after the user gets off a high-speed train carriage. As shown in FIG. 9, when the user gets off the high-speed train, the high-speed train probability value decreases continuously over time, and the walking score value increases accordingly. For example, a black dot shown in FIG. 9 may be determined as a time point at which the user leaves a high-speed train carriage.

It should be understood that the change trends of the first probability value and the second probability value shown in FIG. 9 are merely examples for description, and this embodiment of this application is not limited thereto.

Therefore, in the manner 1, based on the first probability value and the second probability value, by determining a relationship between the first duration and the first time threshold and a relationship between the second duration and the second time threshold, it may be accurately determined that the terminal user is in the state of getting off a high-speed train carriage (namely, the first state), and switches from the second state to the first state.

Manner 2: Optionally, in a possible implementation, the determining a state of a terminal user based on the first probability value and the second probability value may include step 1 to step 7 in FIG. 10. Specific steps are as follows:

Step 1: Obtain a plurality of first probability values in first preset duration.

Step 2: Obtain, based on the plurality of first probability values, first duration that is in the first preset duration and in which the terminal is in the walking state.

Step 3: Determine whether the first duration is less than a third time threshold.

Step 4: Obtain a plurality of second probability values in third preset duration.

Step 5: Obtain, based on the plurality of second probability values, third duration that is in the third preset duration and in which the terminal is in the high-speed train state.

Step 6: Determine whether the third duration is less than a fourth time threshold.

Step 7: When the first duration is less than the third time threshold and the third duration is less than the fourth time threshold, determine that the terminal user is in the third state, where the terminal user switches from the second state to the third state.

For a manner of determining the first duration in the manner 2 and related descriptions, refer to descriptions of step 1 and step 2 in the manner 1. Details are not described herein again.

Specific duration of the third preset duration is not limited in this embodiment of this application. For example, the third preset duration may be set to 11 seconds.

As described above, when the first probability value is greater than the first probability threshold, the terminal may be defined as being in the walking state. Herein, accumulated duration (corresponding to the first duration) that is in a recent period of time (corresponding to the first preset duration) and in which the terminal is in the walking state needs to be counted, and then the accumulated duration is compared with a specified threshold (corresponding to the third time threshold). In addition, accumulated duration (corresponding to the third duration) that is in a recent period of time (corresponding to the third preset duration) and in which the terminal is in the high-speed train state further needs to be counted, and then the accumulated duration is compared with a specified threshold (corresponding to the fourth time threshold). If the first duration is less than the third time threshold and the third duration is less than the fourth time threshold, it is determined that the terminal user is in the third state, and switches from the second state to the third state.

For example, an application scenario for the manner 2 may be that a high-speed train stops at an intermediate station after driving for a period of time, and the user still stays in a high-speed train carriage.

For example, if the third time threshold is 7 seconds, the first preset duration is 12 seconds, and in the 12 seconds, the accumulated duration in which the terminal is in the walking state is counted as 8 seconds; and if the fourth time threshold is 6 seconds, the third preset duration is 11 seconds, and in the 11 seconds, the accumulated duration in which the terminal is in the high-speed train state is counted as 5 seconds, it may be learned that the 8 seconds is greater than the 7 seconds, and the 5 seconds is less than the 6 seconds. In this case, it is determined that the terminal user switches from the second state to the third state.

Therefore, in the manner 2, based on the first probability value and the second probability value, by determining a relationship between the first duration and the third time threshold and a relationship between the third duration and the fourth time threshold, it may be accurately determined that the terminal user is in the third state, and switches from the second state to the third state.

Manner 3: Optionally, in a possible implementation, the determining a state of a terminal user based on the first probability value and the second probability value may include step 1 to step 7 in FIG. 11.

Figure 11:
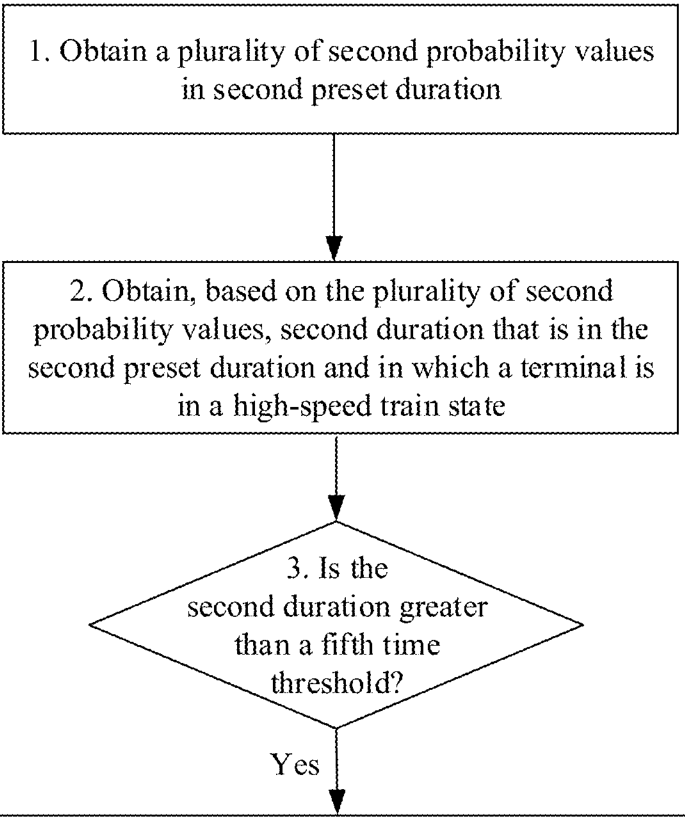
FIG. 11 is still another example flowchart of determining a state of a terminal user according to an embodiment of this application.

As shown in FIG. 11, specific steps are as follows:

Step 1: Obtain a plurality of second probability values in second preset duration.

Step 2: Obtain, based on the plurality of second probability values, second duration that is in the second preset duration and in which the terminal is in the high-speed train state.

Step 3: Determine whether the second duration is greater than a fifth time threshold.

Step 4: When the second duration is greater than the fifth time threshold, determine that the state of the terminal user is the second state, where the state of the terminal user is switched from the third state to the second state.

For example, an application scenario for the manner 3 may be a scenario in which a high-speed train continues to drive after making an intermediate stop. In this process, the terminal user stays in a high-speed train carriage.

Optionally, step 1 and step 2 in the manner 3 may be similar to step 4 and step 5 in the manner 1. However, the second duration obtained in this manner is compared with the fifth time threshold, and the second duration in the manner 1 is compared with the second time threshold.

The fifth time threshold and the second time threshold may be the same or different. This is not specifically limited.

Similarly, in this manner, accumulated duration (corresponding to the second duration) that is in a recent period of time (corresponding to the second preset duration) and in which the terminal is in the high-speed train state needs to be counted, and then the accumulated duration is compared with a specified threshold (corresponding to the fifth time threshold). If the second duration is greater than the fifth time threshold, it is determined that the terminal user is in the second state, and switches from the third state to the second state.

Therefore, in the manner 3, based on the first probability value and the second probability value, by determining a relationship between the second duration and the fifth time threshold, it may be quickly determined that the terminal user is in the second state, and switches from the third state to the second state.

Unified descriptions are provided herein. Regardless of in the manner 1, the manner 2, the manner 3, or a manner 4 described below, the comparison relationship between the duration and the time threshold is merely an example for description, and this embodiment of this application is not limited thereto.

For example, “the first duration is greater than the second time threshold” may be replaced with “the first duration is greater than or equal to the second time threshold”.

For another example, “the first duration is greater than the second time threshold” may be replaced with “the first duration falls within a preset time period”.

In this embodiment of this application, if it is determined that the terminal user is in the state of leaving a high-speed train carriage (for example, the scenario shown in FIG. 2), after the user leaves a high-speed train carriage, an exit card may be presented to the user, to help the user perform card swiping to exit the station.

S405: Display a first interface when determining that the terminal user is in the first state, where the first interface includes a first window, and the first window is used to display travel recommendation information for a current location to the user.

Optionally, content displayed in the first window includes one or more of the following: a recommended popular urban scenic spot, a recommended tour guide, a recommended surrounding hotel, a recommended subway line map, a recommended popular route, and the like.

It may be understood that the content displayed in the first window herein is merely an example for description, and this embodiment of this application is not limited thereto.

It may be further understood that an application APP in which the first window is located is not specifically limited in this embodiment of this application. The APP may be travel software, social software, video software, or the like. For example, the APP may be Qunar, Xiaohongshu, or Ctrip.

The first interface may be a lock screen main interface, or may be an unlocked interface. This is not specifically limited in this embodiment of this application.

In an implementation, when the user is using the mobile phone, the first interface is an interface displayed when the user is currently using the mobile phone. The first window may pop up from an upper part of a screen (for example, pop up in a notification bar).

In an implementation, if the terminal is in a screen-locked state, a screen is automatically turned on, and the first window pops up in a lock screen interface.

In this embodiment of this application, the first probability value (namely, the probability used to represent that the terminal is in the walking state) and the second probability value (namely, the probability used to represent that the terminal is in the high-speed train state) are determined by using the acceleration data; then the state of the terminal user is determined from the following three states based on the first probability value and the second probability value: the first state, the second state, and the third state, where the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and finally, when it is intelligently identified that the terminal is in the first state, a related recommendation interface is presented to the user to provide a convenient service for the user, to improve experience of using the intelligent terminal when the user takes a high-speed train.

Figure 12A:
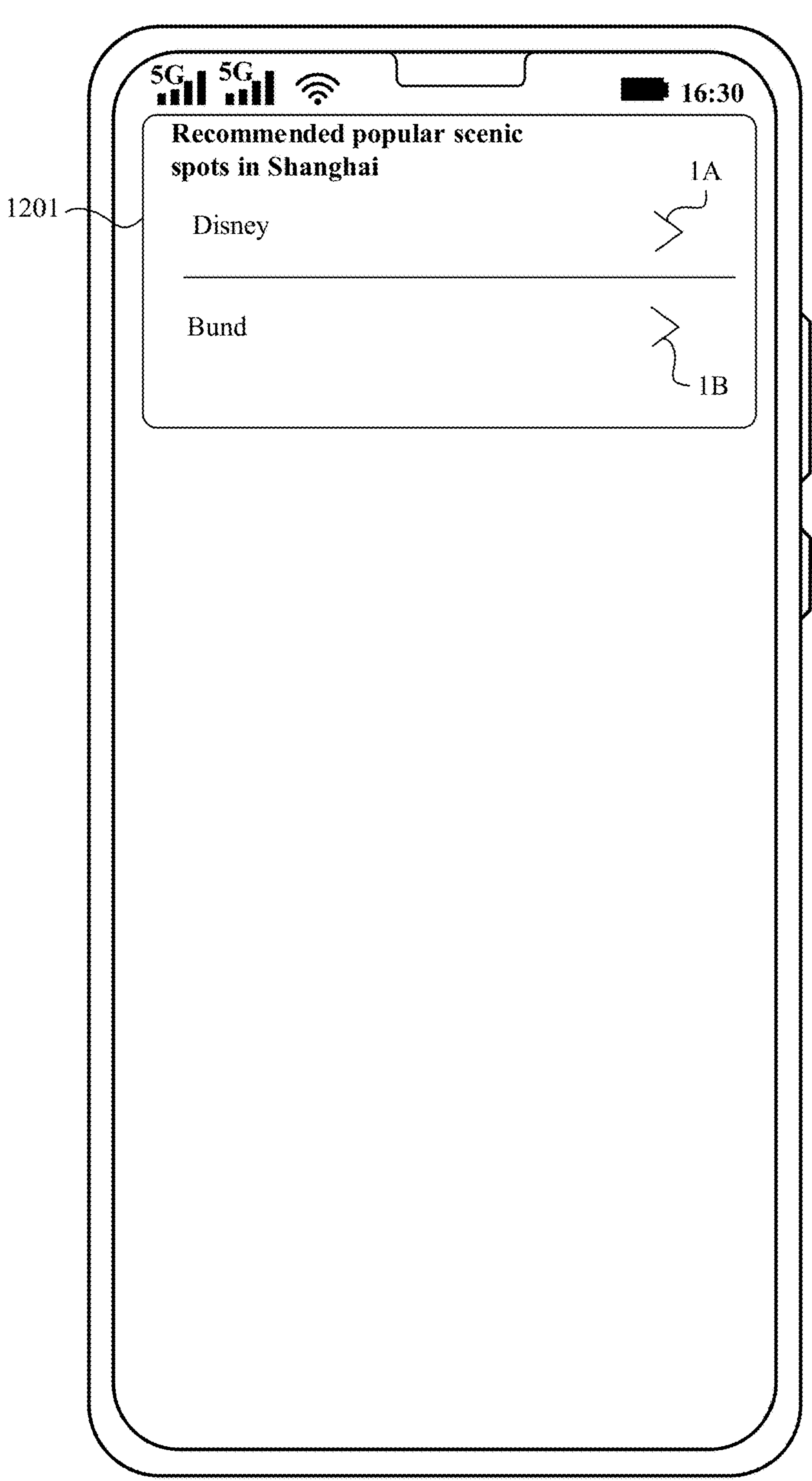
FIG. 12A, FIG. 12B, and FIG. 12C are a schematic diagram of an interface of travel recommendation information according to an embodiment of this application.
Figure 12B:
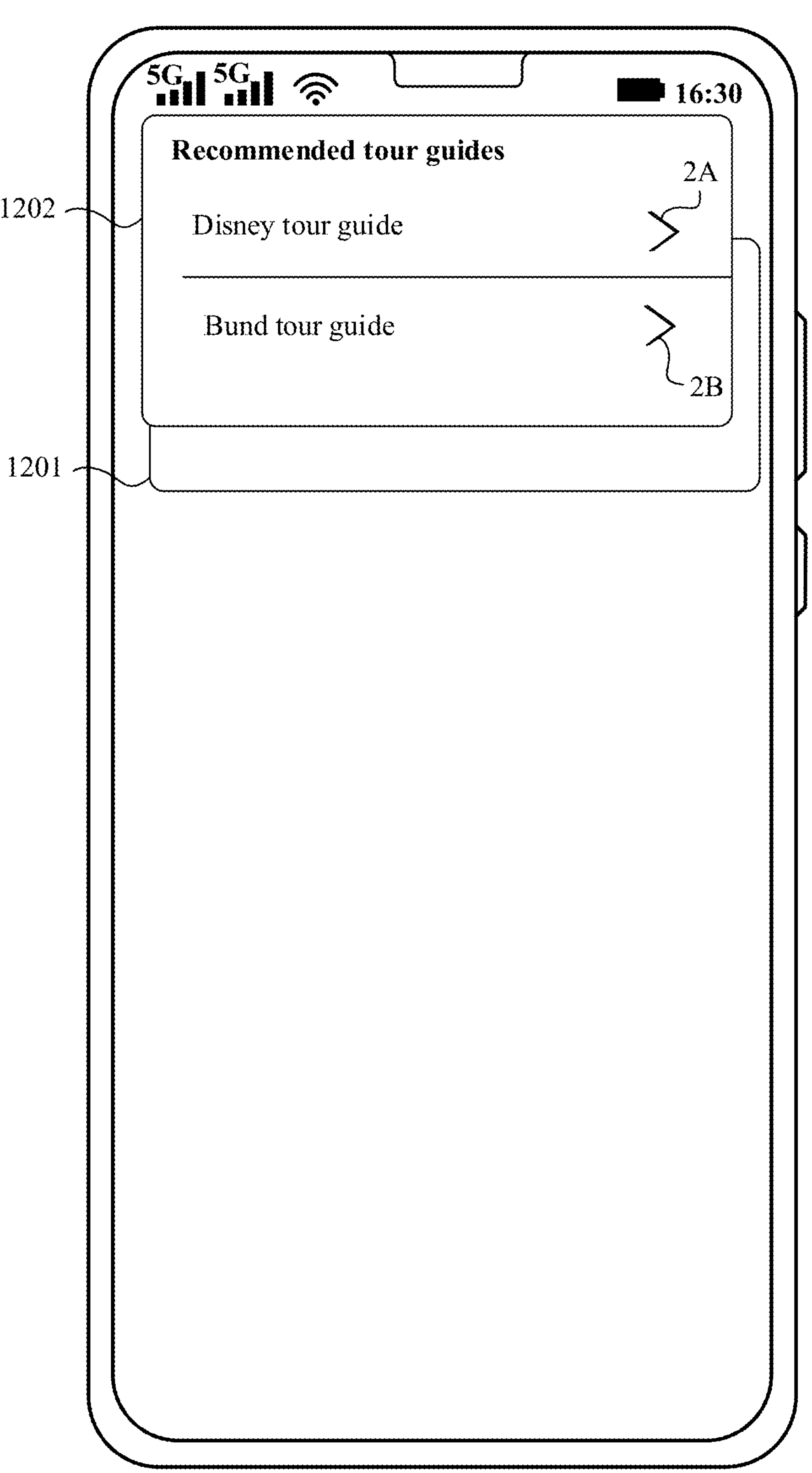
Figure 12C:
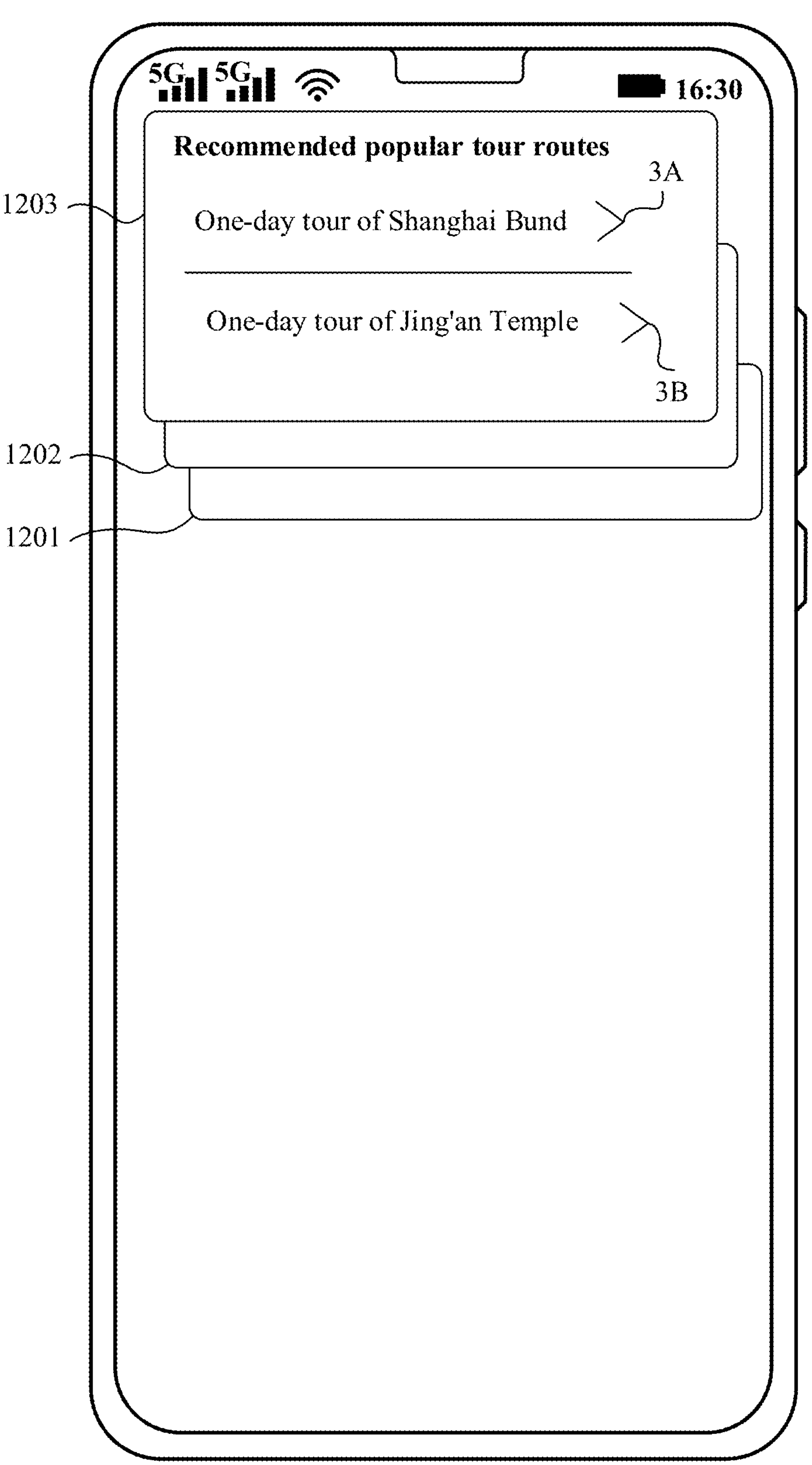

FIG. 12A, FIG. 12B, and FIG. 12C are a schematic diagram of an interface of travel recommendation information according to an embodiment of this application.

Optionally, the first window may be a recommended popular scenic spot. For example, the first window may be a window 1201 shown in FIG. 12A. In a mobile phone interface shown in FIG. 12A, popular scenic spots such as Disney and the Bund in Shanghai are recommended to the user in the window 1201. If the user needs to view details about Disney, the user may tap a control 1A shown in FIG. 12A. If the user needs to view details about the Bund, the user may tap a control 1B shown in FIG. 12A.

Optionally, the first window may be a recommended tour guide. For example, the first window may be a window 1202 shown in FIG. 12B. In a mobile phone interface shown in FIG. 12B, the window 1202 may recommend a Disney tour guide, a Bund tour guide, and the like to the user. If the user needs to view details about the Disney tour guide, the user may tap a control 2A shown in FIG. 12B. If the user needs to view details about the Bund tour guide, the user may tap a control 2B shown in FIG. 12B.

Optionally, the first window may be a recommended popular tour route. For example, the first window may be a window 1203 shown in FIG. 12C. In a mobile phone interface shown in FIG. 12C, the window 1203 may recommend popular tour routes, for example, a one-day tour of Shanghai Bund and a one-day tour of Jing’an Temple, to the user. If the user needs to view details about the one-day tour of Shanghai Bund, the user may tap a control 3A shown in FIG. 12C. If the user needs to view details about the one-day tour of Jing’an Temple, the user may tap a control 3B shown in FIG. 12C.

It may be understood that a pop-up sequence of the windows shown in FIG. 12A, FIG. 12B, and FIG. 12C is not limited in this embodiment of this application. A pop-up sequence of the window 1201, the window 1202, and the window 1203 in FIG. 12A, FIG. 12B, and FIG. 12C is merely an example for description.

It may be further understood that a manner of stacking the windows shown in FIG. 12A, FIG. 12B, and FIG. 12C is not limited in this embodiment of this application, and may be a display manner of completely covering a previous window (or may be understood as that a previous window disappears), or may be a display manner of covering some content.

As shown in FIG. 12B, after the window 1202 pops up, most content of the window 1201 is hidden, and only some content at a bottom part of the window 1201 is exposed. In this way, if the user wants to switch to the window 1201, the user may perform a related window switching operation, for example, slide the window upward for switching. Alternatively, after the window 1202 pops up, the window 1201 may disappear completely.

Similarly, as shown in FIG. 12C, after the window 1203 pops up, most content of the window 1202 is hidden, and only some content at a bottom part of the window 1202 and some content at a bottom part of the window 1201 are exposed. In this way, if the user wants to switch to the window 1201 or the window 1202, the user may perform a related window switching operation, for example, slide the window upward for switching. Alternatively, after the window 1203 pops up, the window 1202 and the window 1201 may disappear completely.

It should be understood that the window stacking manner shown in FIG. 12A, FIG. 12B, and FIG. 12C is merely an example. This is not specifically limited in this embodiment of this application. For example, if a screen size of the mobile phone permits, all of a plurality of windows may be completely displayed in the interface. For example, the window 1203, the window 1202, and the window 1201 are displayed side by side in the mobile phone interface in a time sequence.

It may be understood that the travel recommendation in FIG. 12A, FIG. 12B, and FIG. 12C may be applied to a scenario in which it is determined that the terminal user is in the first state. However, this embodiment of this application is not limited thereto.

To help people travel more conveniently, subway stations are usually built at high-speed railway stations. This embodiment of this application also provides a corresponding technical solution for this scenario.

Optionally, in an embodiment, when it is determined that the terminal user is in the first state, the method further includes:

- detecting subway station information based on location information of the terminal;
- displaying a second window in the first interface after identifying a subway station, where the second window is used to display information required for the terminal user to enter the subway station to the user, and the second window includes a first control;
- detecting an operation performed on the first control; and
- displaying a second interface in response to the operation performed on the first control, where the second interface includes a subway boarding code.

The subway station information is used to represent a geographical location of the subway station. Optionally, the subway station information includes but is not limited to subway fence information, a subway station name, the geographical location of the subway station, a subway station identifier, a subway station gate, or the like.

The location information is used to indicate a current geographical location of the terminal.

For example, for the terminal in which a GPS is disposed, the location information of the terminal may be detected in real time by using a GPS signal. Correspondingly, the location information of the terminal may include a current geographical location, of the terminal, that is located by the GPS of the terminal. Based on the geographical location of the terminal and place information marked in the GPS, it may be learned whether the terminal is located near the subway station, for example, enters a subway fence or is close to a subway card swiping gate.

Optionally, the detecting subway station information based on location information of the terminal may include two phases: a first phase of identifying the subway fence and a second phase of identifying the subway gate by using a related algorithm. A manner of detecting the subway station information is not specifically limited in this embodiment of this application.

After the terminal user leaves a high-speed train carriage, if it is detected that the user enters a subway station, the subway boarding code may be further pushed to the user, to pop up or push a to-be-used exit card function for the user in real time. This saves a time for the user to actively open an exit card, and provides a convenient service for the user.

After the user gets off a high-speed train carriage, there is still a distance to a subway gate. Therefore, to reduce power consumption of the terminal, the subway station information may be detected based on the location information of the terminal after a period of time.

Optionally, in an embodiment, the detecting subway station information based on location information of the terminal includes: detecting the subway station information based on the location information of the terminal after a preset time period (for example, 10 minutes).

After the subway station is identified, the first window (travel recommendation information) may be hidden, and then a travel card (corresponding to the second window) pops up on the mobile phone. The travel card is a functional card used to enter and exit the subway station. Optionally, the travel card may be a travel card of a third-party APP, for example, an exit card in WeChat transport or an exit card in Alipay.

It should be understood that a type of the travel card or an APP corresponding to the travel card is not specifically limited in this embodiment of this application. For example, the application APP of the travel card may be an APP that comes with a system, or may be a third-party APP.

For example, the second window includes a subway boarding code control (corresponding to the first control). After the user taps the subway boarding code control, the second interface is displayed. The second interface may include a two-dimensional code for card swiping at the station.

It should be understood that a stacking display manner of the second window and the first window is not specifically limited in this embodiment of this application.

In a possible implementation, when the second window pops up, the first window disappears completely, or the second window completely covers the first window.

In another possible implementation, when the second window pops up, some content of the first window may be covered, and an edge is left (to help the user perform a window switching operation).

In still another implementation, the second window and the first window may be displayed side by side. For example, the first window is at a lower part of the screen and the second window is at an upper part of the screen.

For example, the exit card may be a smart travel card that comes with the terminal. The smart travel card may include a boarding code for exit, for example, a two-dimensional code.

Figure 13A:
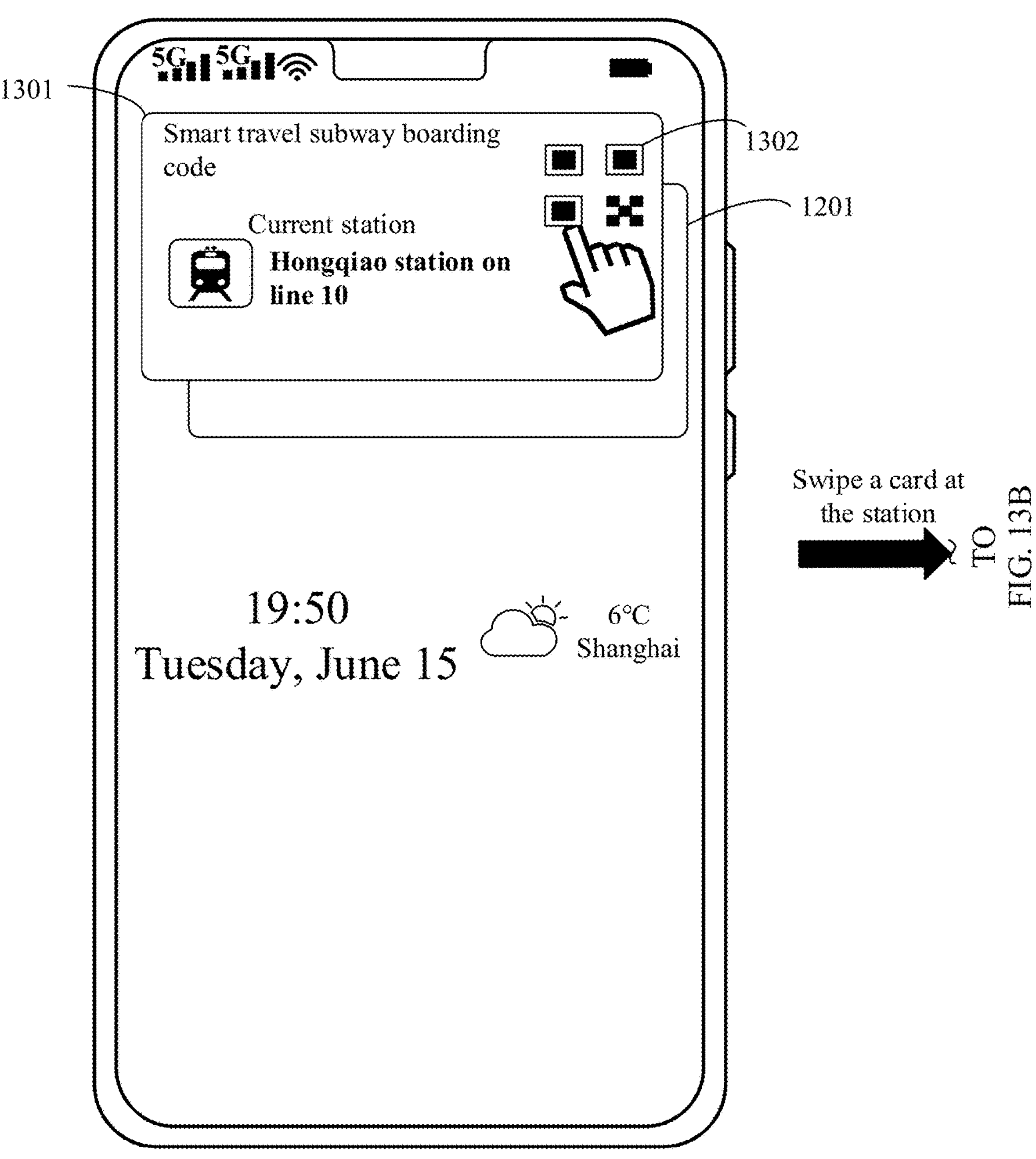
FIG. 13A and FIG. 13B are a schematic diagram of an interface of a terminal presented when a user enters a subway station after getting off a high-speed train carriage.
Figure 13B:
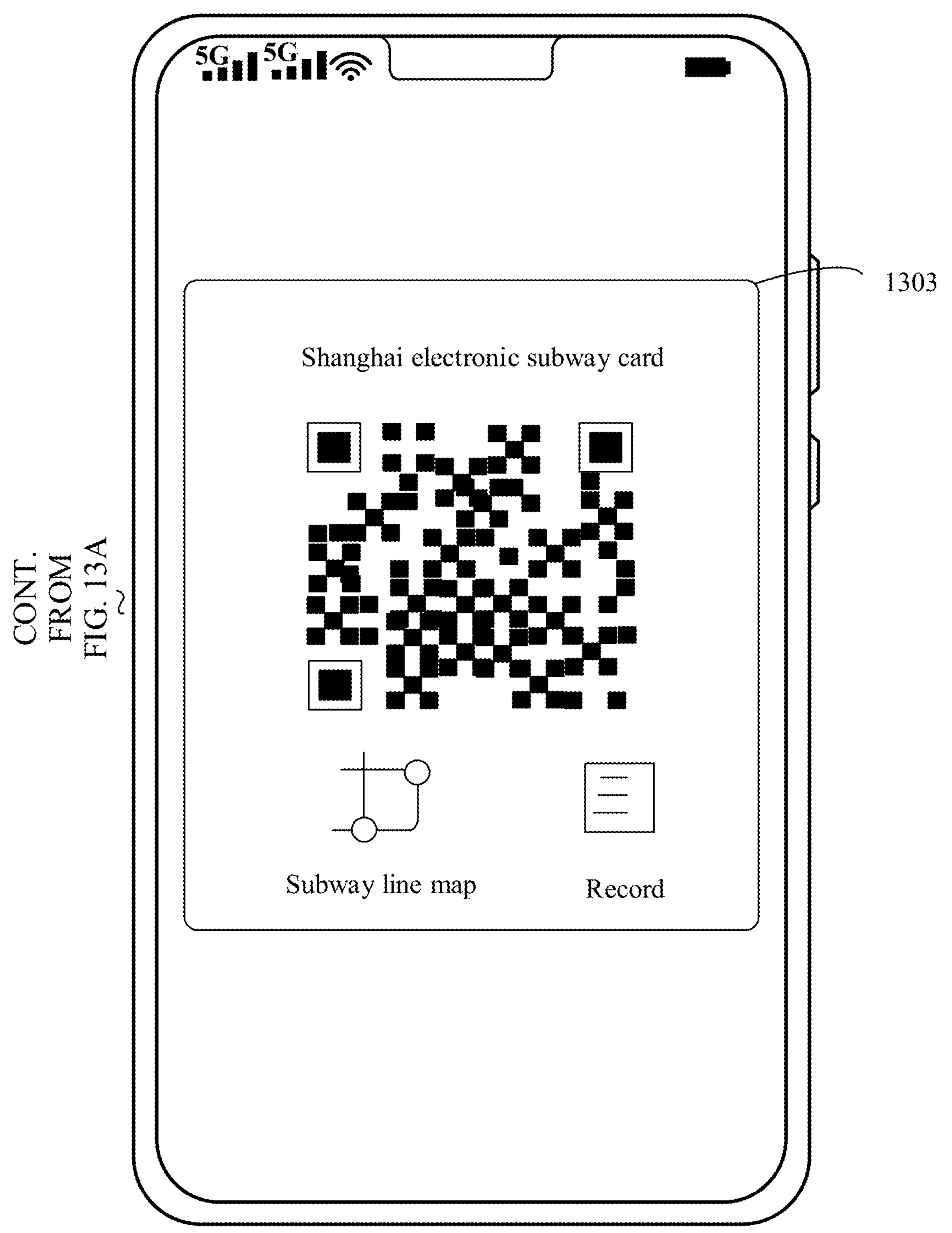

FIG. 13A and FIG. 13B are a schematic diagram of an interface of the terminal presented when the user enters the subway station after getting off a high-speed train carriage.

After the user leaves a high-speed train carriage, it is identified, after a period of time, that the user enters a subway station. In this case, the first interface may be displayed as an interface shown in FIG. 13A. As shown in FIG. 13A, after it is identified that the user enters a subway station, a window 1201 (corresponding to the first window) recommended when the user gets off a high-speed train carriage is hidden, and a travel card 1301 (corresponding to the second window) automatically pops up in the mobile phone interface.

The travel card 1301 includes a smart travel subway boarding code. For example, the travel card 1301 includes a thumbnail control 1302 of the boarding code. Optionally, a current subway station, for example, a Hongqiao station on line 10, may be displayed in the travel card 1301. For content of the window 1201, refer to the descriptions in FIG. 12A, FIG. 12B, and FIG. 12C. Details are not described herein again.

It should be understood that the travel card 1301 in FIG. 13A and FIG. 13B may be another type of travel card, for example, a travel card in Alipay or a travel card in WeChat.

Optionally, after the subway station is identified, a type of the travel card popped up by the terminal may be specifically determined based on a card type of a card that is usually swiped by the user to take a subway. The example in FIG. 13A and FIG. 13B is merely described by using an example in which the smart travel card is used by the user to enter the station.

For example, if the user usually uses the travel card in Alipay to take the subway, after the subway station is identified, the terminal pops up the travel card in Alipay. If the user usually uses the travel card in WeChat to take the subway, after the subway station is identified, the terminal pops up the travel card in WeChat.

It should be further understood that a location of the travel card 1301 after the travel card 1301 pops up is not limited in this embodiment of this application. For example, the travel card 1301 may be located in the middle of the screen, or may be located at an upper part of the screen. A location of the travel card 1301 shown in FIG. 13A does not constitute a limitation on this embodiment of this application.

It should be further understood that in FIG. 13A, an example in which the mobile phone is in an unlocked state is used for description. However, this embodiment of this application is not limited thereto. If the user does not use the mobile phone after getting off the high-speed train, or the mobile phone is in the screen-locked state, the terminal may automatically turn on the screen, and the travel card 1301 pops up in the lock screen interface.

It should be further understood that in FIG. 13A, only one window 1201 displayed in FIG. 12A, FIG. 12B, and FIG. 12C is used as an example for description, and this embodiment of this application is not limited thereto. Actually, if there are a plurality of travel recommendation windows, all of the plurality of travel recommendation windows may be stacked behind the travel card 1301 in an arrangement manner of the window 1201.

It should be further understood that in FIG. 13A, an example in which the window 1201 is partially hidden is used for description, and this embodiment of this application is not limited thereto.

After the user gets off a high-speed train carriage, if the user needs to enter a subway station, the user may tap the thumbnail control 1302 of the boarding code in the travel card 1301 after the mobile phone pops up the travel card 1301, to enlarge and display the two-dimensional code, so as to help the user perform card swiping to enter the subway station.

For example, after the thumbnail control 1302 of the boarding code is tapped, a window 1303 shown in FIG. 13B is displayed in the interface. In the interface shown in FIG. 13B, the window 1303 includes a two-dimensional code displayed in a large picture, to help the user perform card swiping to exit the station.

Optionally, the window 1303 may further include other controls, for example, a record control and a subway line map control. If the user taps the record control, a historical record may be viewed. If the user taps the subway line map, subway line maps in a city in which the user is located may be viewed.

It should be understood that the interface in FIG. 13A and FIG. 13B is merely an example for description, and does not constitute a limitation on the protection scope of the embodiments of this application.

With reference to a current epidemic prevention situation, the user needs to display personal health code information during traveling.

Optionally, in a possible embodiment, the second window further includes a second control; and the method further includes:

detecting an operation performed on the second control; and displaying a third interface in response to the operation performed on the second control, where the third interface includes a personal health code of the terminal user.

In an implementation, the travel card may further include a health code control. In this way, after getting off the high-speed train, the user may directly open the health code in the travel card, to provide convenience for the user.

Figure 14A:
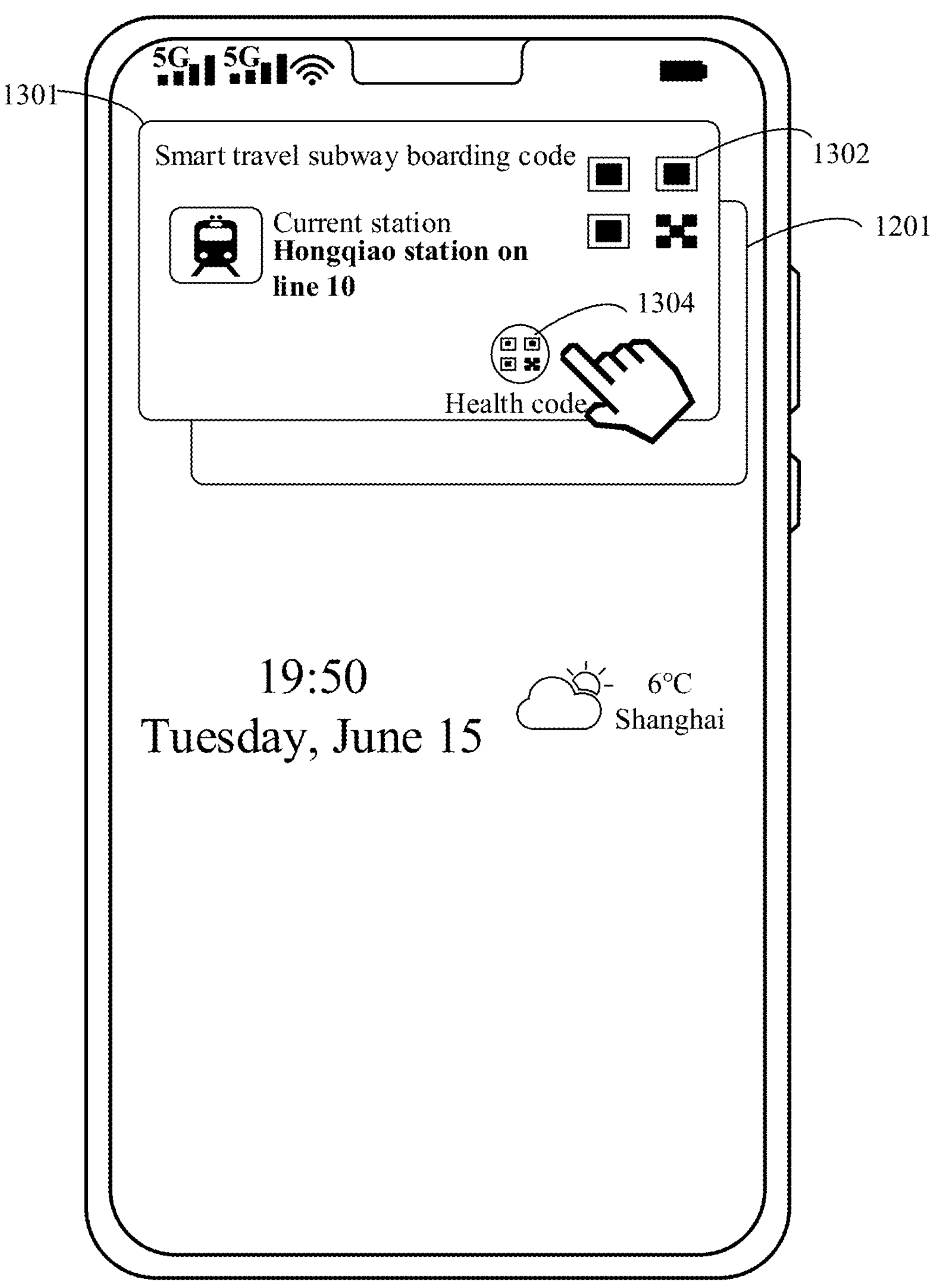
FIG. 14A and FIG. 14B are a schematic diagram of another interface of a terminal presented when a user enters a subway station after getting off a high-speed train carriage.
Figure 14B:
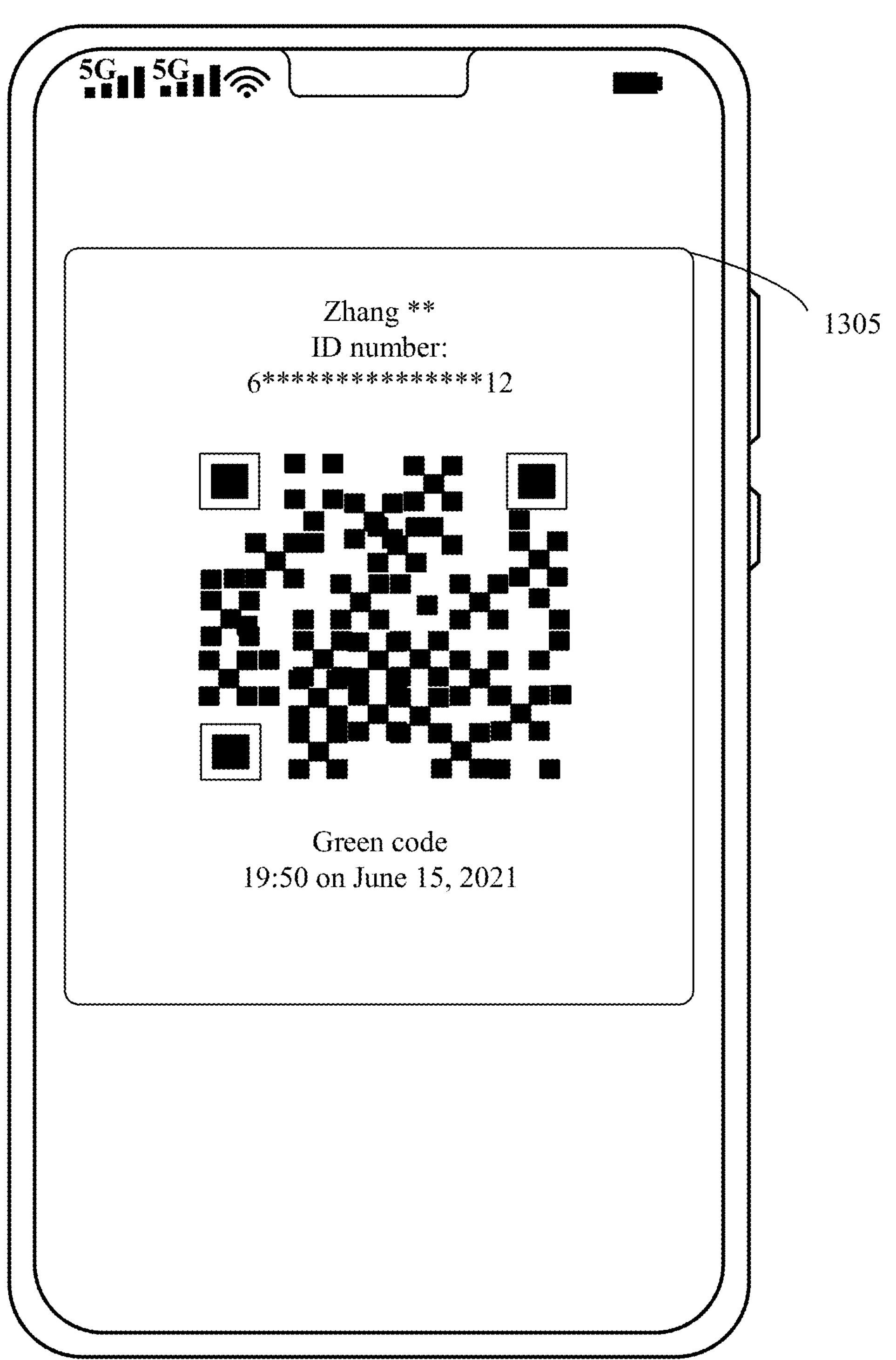

FIG. 14A and FIG. 14B are an example diagram of an interface in which a travel card includes a health code control.

For example, in an interface shown in FIG. 14A, the mobile phone interface includes a window 1201 and a window 1301. For a window stacking manner of the two windows, refer to the foregoing descriptions. Details are not described herein again. The window 1301 includes a thumbnail control 1302 of the boarding code and a health code control 1304. For related descriptions of the thumbnail control 1302 of the boarding code, refer to the foregoing descriptions. For brevity, details are not described herein again.

If the user taps the control 1304 (corresponding to the second control), an interface shown in FIG. 14B is displayed. In an example, the third interface may be displayed as the interface shown in FIG. 14B. As shown in FIG. 14B, a window 1305 is displayed in the mobile phone interface. The window 1305 is configured to display the personal health code of and other information about the terminal user.

For example, in the interface shown in FIG. 14B, a type of the shown health code is a green code, a current real-time time for displaying the health code is 19:50 on Jun. 15, 2021, and desensitized personal information (an identity card number, a name, and the like) of the user is displayed.

It should be understood that the window 1305 shown in FIG. 14B is merely an example for description, and this embodiment of this application is not limited thereto. For example, the window 1305 may further include other information or controls. Specific content may depend on a design of a health code application used in a city in which the terminal is currently located.

It may be further understood that the window 1305 in FIG. 14B is merely an interface example, and specific display should be subject to actual information about the user.

Optionally, in a possible embodiment, the second window further includes a third control; and the method further includes:

detecting an operation performed on the third control; and displaying a fourth interface in response to the operation performed on the third control, where the fourth interface includes a communications itinerary card of the terminal user.

In an implementation, the travel card may further include an itinerary code. In this way, after the user gets off the high-speed train, if the itinerary code needs to be displayed, the itinerary code may be directly opened in the travel card, to provide convenience for the user.

Figure 15A:
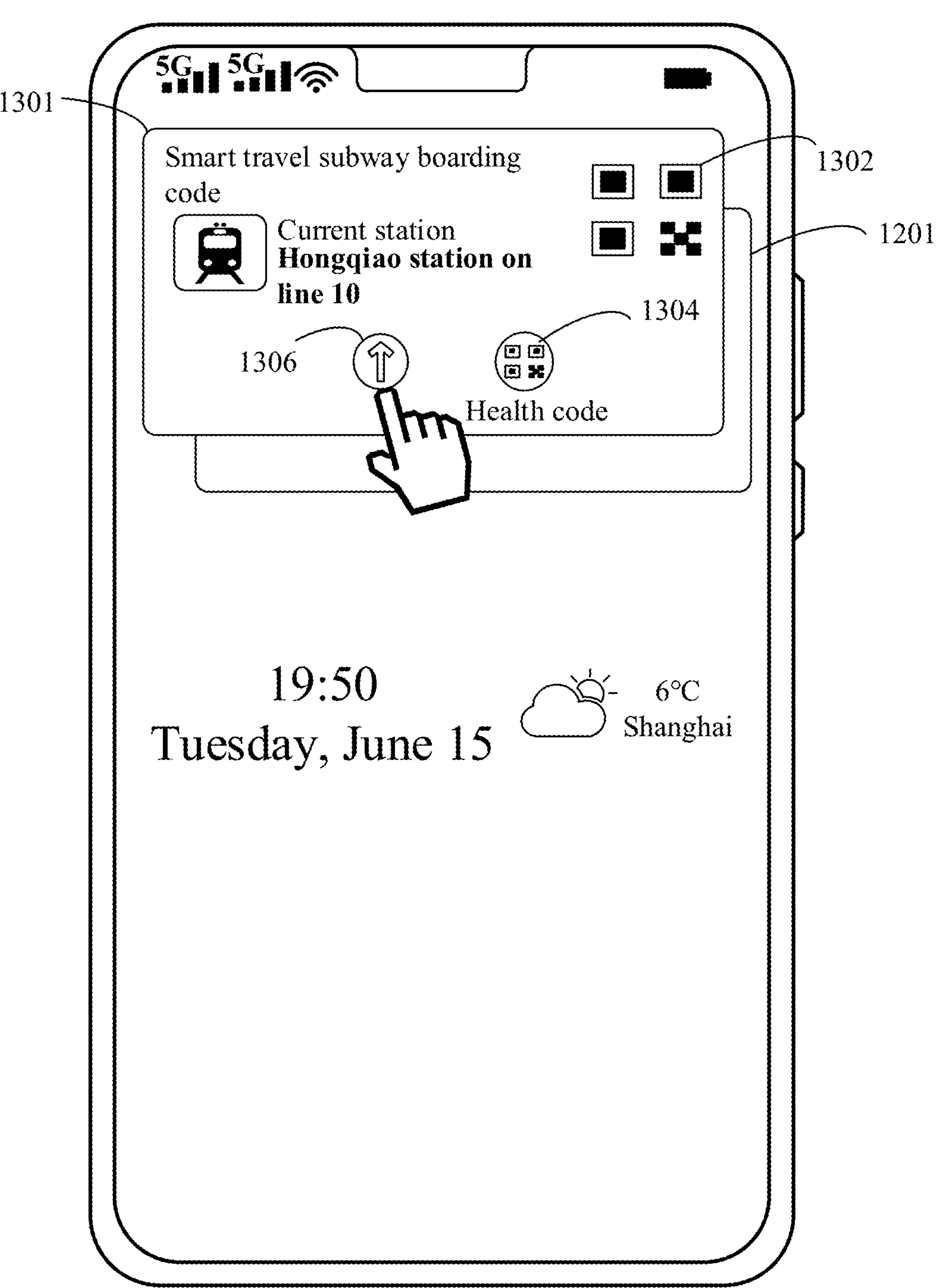
FIG. 15A, FIG. 15B, and FIG. 15C are a schematic diagram of still another interface of a terminal presented when a user enters a subway station after getting off a high-speed train carriage.

For example, in an interface shown in FIG. 15A, the mobile phone interface includes a window 1201 and a window 1301. For a window stacking manner of the two windows, refer to the foregoing descriptions. Details are not described herein again. The window 1301 includes a thumbnail control 1302 of the boarding code, a health code control 1304 (for a specific function, refer to the descriptions in FIG. 14A and FIG. 14B), and an itinerary card control 1306 (corresponding to the third control).

For a specific function of the thumbnail control 1302 of the boarding code, refer to the descriptions in FIG. 13A and FIG. 13B. For a specific function of the health code control 1304, refer to the descriptions in FIG. 14A and FIG. 14B.

Figure 15B:
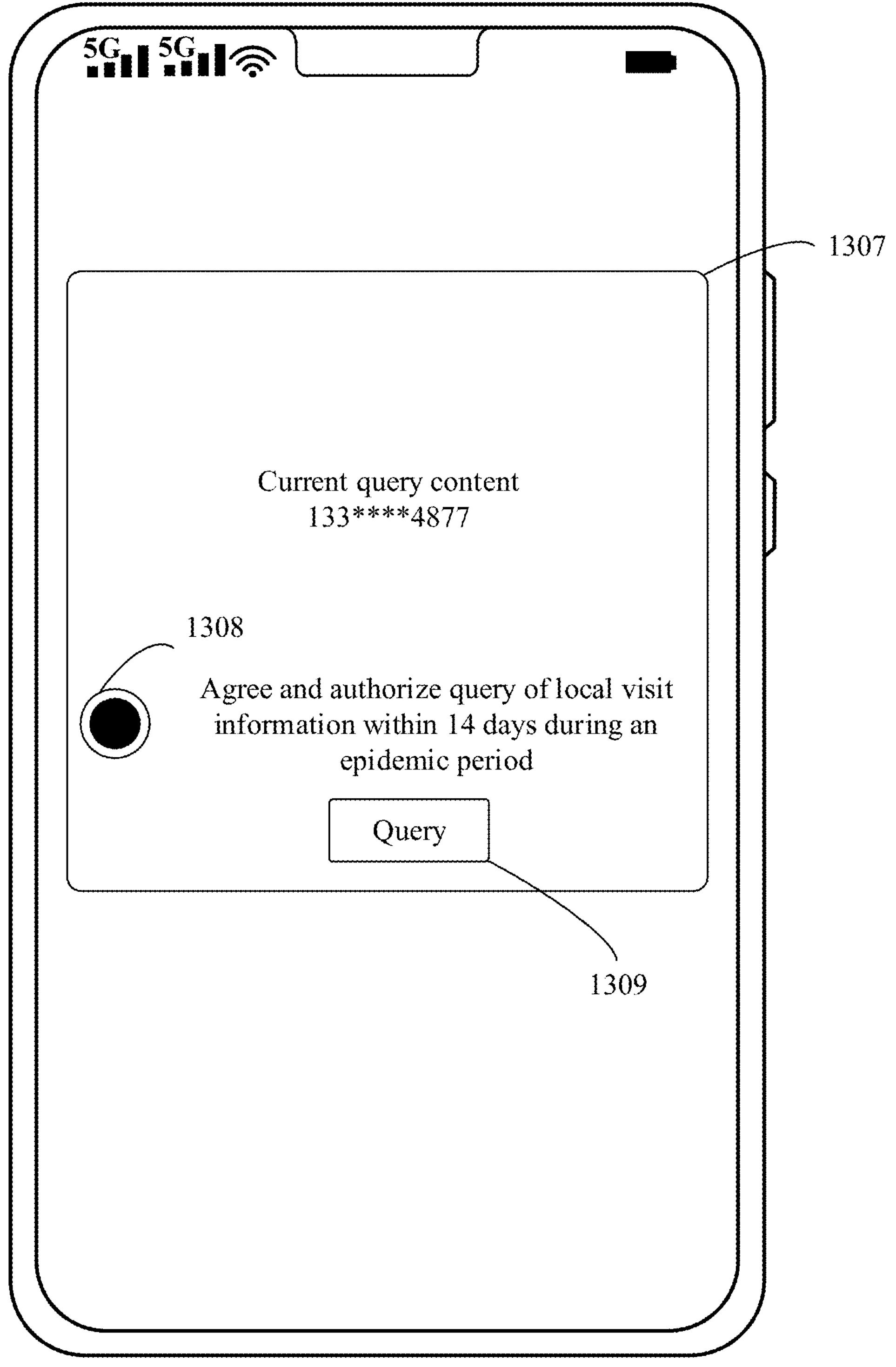

If the user taps the itinerary card control 1306, an interface shown in FIG. 15B is displayed. In the interface shown in FIG. 15B, the mobile phone displays a window 1307. The window 1307 includes a control 1309 for querying an itinerary card and an authorization agreement option 1308.

If the user agrees and authorizes query of local visit information within 14 days during an epidemic period, the authorization agreement option 1308 may be tapped. When the user selects to agree and authorize query of the local visit information within the 14 days during the epidemic period, the control 1309 may be tapped to query itinerary information.

Figure 15C:
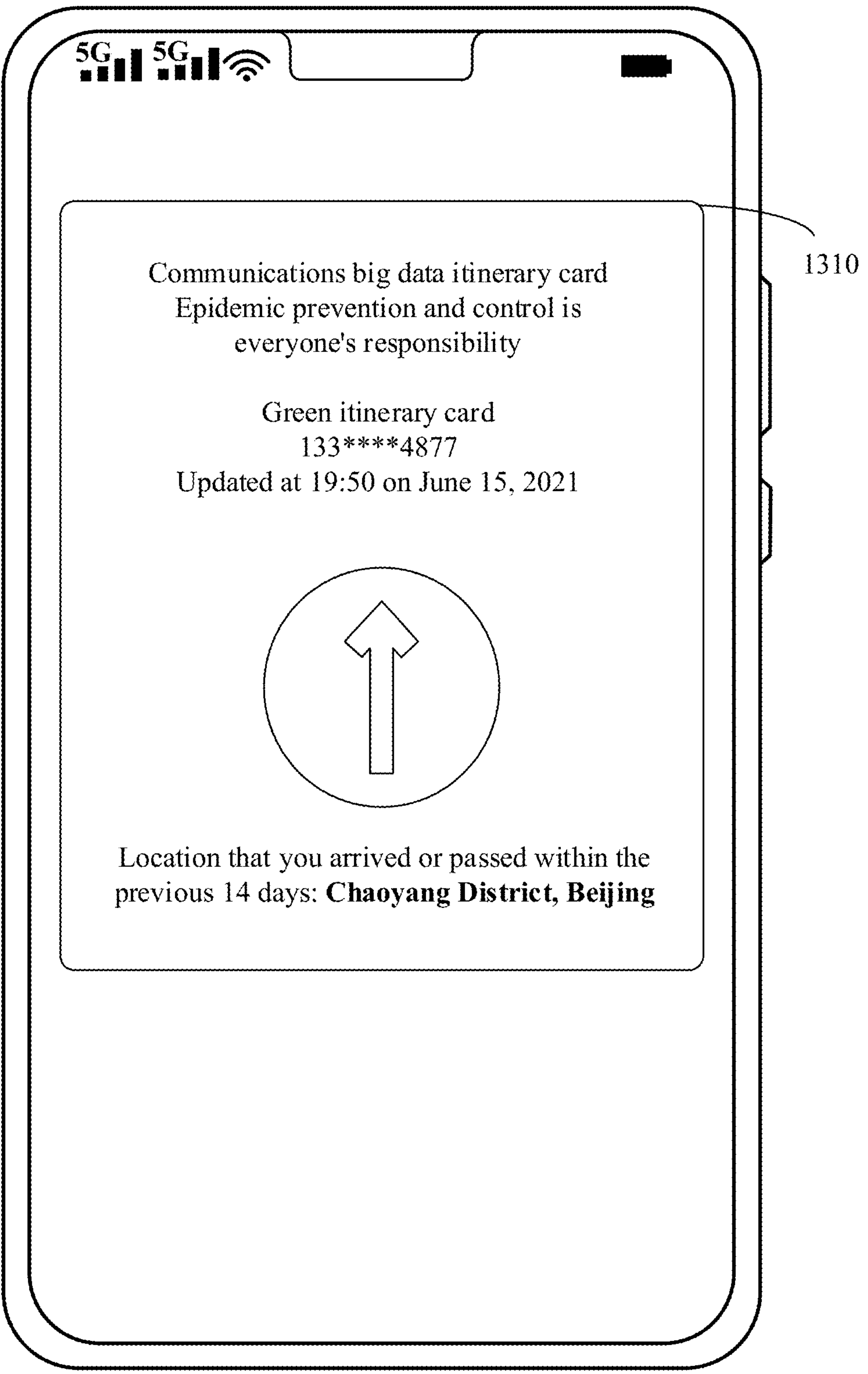

In an example, after the user taps the control 1309 shown in FIG. 15B, the fourth interface may be displayed as an interface shown in FIG. 15C. As shown in FIG. 15C, a window 1310 is displayed in the mobile phone interface. The window 1310 is configured to display personal itinerary card information of and other information about the terminal user. For example, a location (Chaoyang District, Beijing) that the user arrived or passed within the previous 14 days, a green communications itinerary card, a current real-time time for displaying the itinerary card, and desensitized personal information (a phone number and the like) of the user are displayed in the window 1310.

It may be further understood that the interface in FIG. 15C is merely an example, and specific display should be subject to actual information about the user.

A location of an itinerary code control is not specifically limited in this embodiment of this application.

In an implementation, the location of the itinerary code control may be shown in FIG. 15A, that is, the itinerary code control is located in the travel card 1301.

In another implementation, the itinerary code control may be located in the window 1305 shown in FIG. 14B. Specifically, after displaying the health code by using the window 1305, the user may continue to tap the itinerary code control in the window 1305, to display itinerary code information. After the itinerary code control is tapped, subsequent operations or interfaces may be the same as the interfaces shown in FIG. 15B and FIG. 15C.

In this embodiment of this application, the acceleration data is obtained, the first probability value and the second probability value are determined based on the acceleration data, then the state of getting on/off a high-speed train by the terminal user is determined with reference to the first probability value and the second probability value, and finally, a travel recommendation interface is displayed to the user when the state of getting off a high-speed train is determined. In this way, it can be accurately identified whether the user is in the state of getting off a high-speed train, and when the state of getting off a high-speed train is identified, a to-be-used card function is popped up for the user, to provide a convenient service for the user. Further, after the subway station information is detected, a subway-related travel card may further pop up. This saves a time for the user to actively open the exit card, and provides a more convenient service for the user.

In addition, in this embodiment of this application, a quantity of base stations that are connected to the terminal and that carry a high-speed railway mark may be further counted, and then the quantity is used as a factor for determining the state of getting on/off a high-speed train by the terminal user. Specifically, all of the quantity, the high-speed train probability value, and the walking probability value may be considered to determine the state of getting on/off a high-speed train by the terminal user. Detailed descriptions are provided below.

Optionally, in an embodiment, as shown in FIG. 5A and FIG. 5B, the method 400 further includes the following steps:

S406: Obtain identification information of M access network devices (for example, base stations), where the M access network devices are a plurality of access network devices recently connected to the terminal user.

S407: Determine a first quantity based on the identification information of the M access network devices, where the first quantity is a quantity of first access network devices in the M access network devices, and the first access network device is an access network device that carries a first identifier.

Step S404 includes the following step:

S404-1: Determine the state of the terminal user based on the first quantity, the first probability value, and the second probability value.

For example, the first access network device is a dedicated high-speed railway network base station; and the first quantity is a quantity of dedicated high-speed railway network base stations connected to the terminal.

A dedicated high-speed railway network is usually deployed around a high-speed railway. Base stations around the high-speed railway include the dedicated high-speed railway network base station and a non-dedicated high-speed railway network base station. By determining whether the user is connected to the dedicated high-speed railway network base station, it may be roughly determined whether the terminal is located along a high-speed railway line. However, when the user waits for a train or passes near the high-speed railway station, the terminal may be connected to the dedicated high-speed railway network base station. Therefore, a specific quantity of base stations connected to the terminal needs to be counted to determine whether the terminal is located along the high-speed railway line.

For example, the first identifier is highwayID. The dedicated high-speed railway network base station may carry highwayID. After the terminal is connected to the base station, an identifier of the base station may be obtained.

In an implementation, identification information of M base stations is obtained, and then a quantity of base stations that carry the first identifier in the M base stations is counted.

Specifically, a cell ID of a cellular cell connected to the terminal may be obtained, to count the quantity of base stations that carry highwayID.

A value of M is not specifically limited in this embodiment of this application. M may be an integer greater than or equal to 2. For example, the value of M may be 10, 13, or 15.

In this embodiment of this application, the state of the terminal user is determined based on the first quantity, the first probability value, and the second probability value. This can improve accuracy of identifying a high-speed train state of the terminal user. For the second state, after the first quantity is introduced, accuracy of identifying that the terminal user switches from the first state to the second state can be significantly improved.

Figure 16:
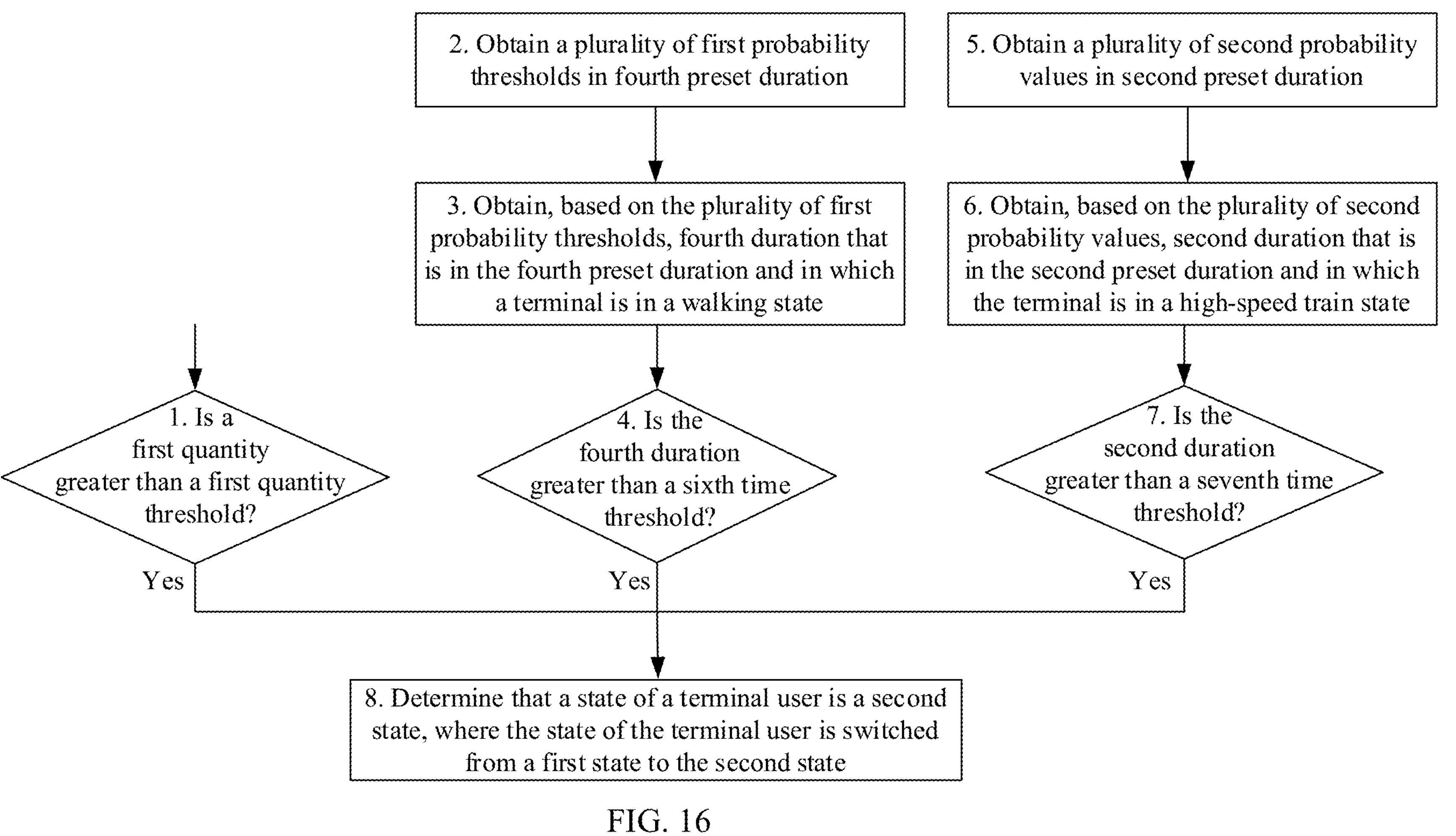
FIG. 16 is still another example flowchart of determining a state of a terminal user according to an embodiment of this application.
Figure 17:
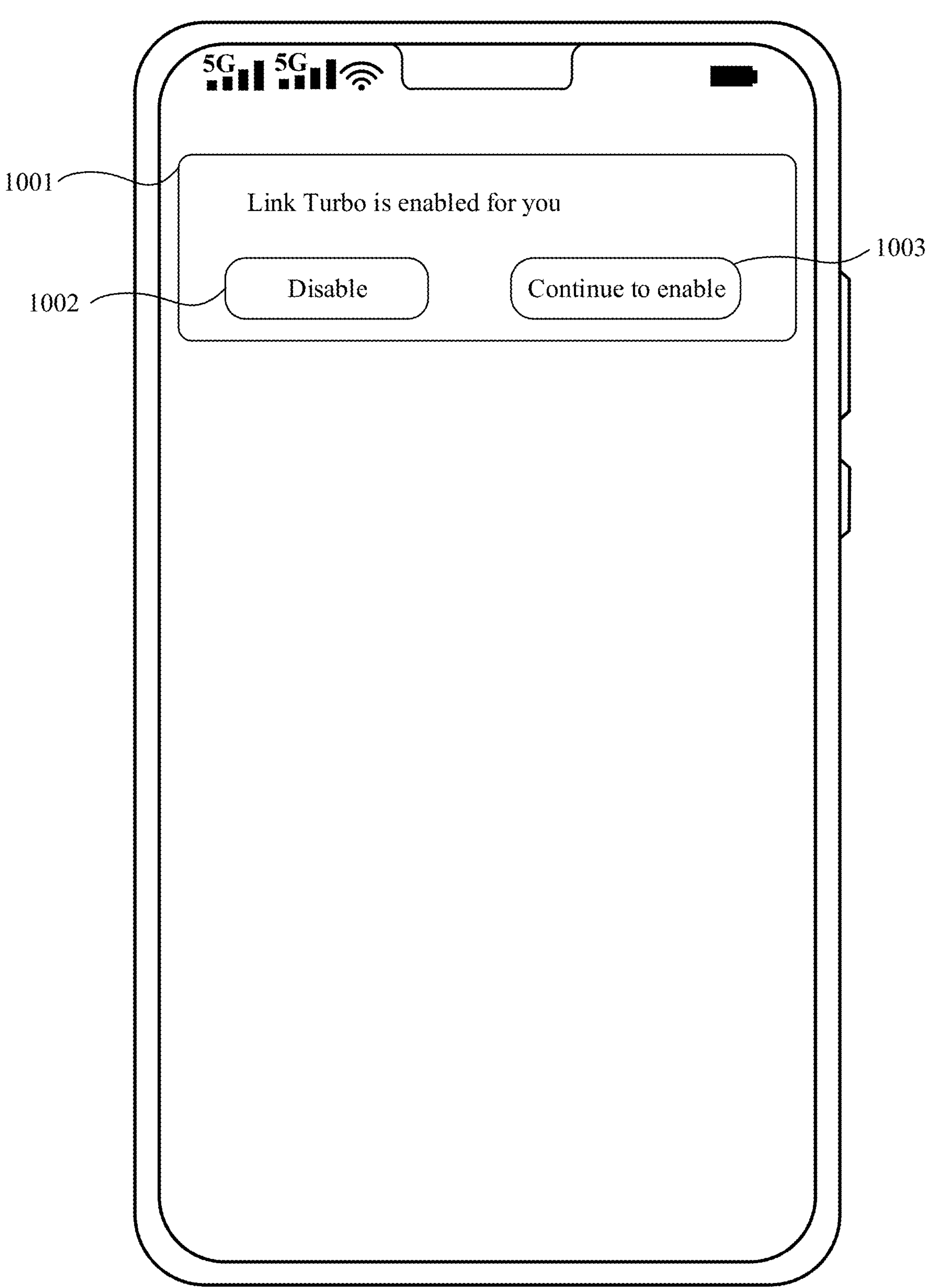
FIG. 17 is a schematic diagram of an interface for reminding a user that Link Turbo is enabled according to an embodiment of this application.

Manner 4: Optionally, in a possible implementation, S404-1 may include step 1 to step 8 in FIG. 16. FIG. 16 is a flowchart of a method for determining the state of the terminal user based on the first quantity, the first probability value, and the second probability value. As shown in FIG. 16, specific steps are as follows:

Step 1: Determine whether the first quantity is greater than a first quantity threshold.

Step 2: Obtain a plurality of first probability thresholds in fourth preset duration.

Step 3: Obtain, based on the plurality of first probability thresholds, fourth duration that is in the fourth preset duration and in which the terminal is in the walking state.

Step 4: Determine whether the fourth duration is greater than a sixth time threshold.

Step 5: Obtain a plurality of second probability values in second preset duration.

Step 6: Obtain, based on the plurality of second probability values, second duration that is in the second preset duration and in which the terminal is in the high-speed train state.

Step 7: Determine whether the second duration is greater than a seventh time threshold.

Step 8: When the first quantity is greater than the first quantity threshold, the fourth duration is greater than the sixth time threshold, and the second duration is greater than the seventh time threshold, determine that the state of the terminal user is the second state, where the state of the terminal user is switched from the first state to the second state.

A value of the fourth preset duration is not specifically limited in this embodiment of this application. For example, the fourth preset duration may depend on duration of ticket check at the high-speed railway station. For example, the fourth preset duration is 15 minutes. A reason for introducing the fourth preset duration herein is to count accumulated duration that is in the fourth preset duration and in which the terminal user is in the walking state. Generally, the user usually has a walking time in a period of time (for example, 15 minutes) before entering a high-speed train carriage. Therefore, the walking time may be used as a factor for determining whether the terminal user enters a high-speed train carriage.

Specifically, in the manner 4, not only a quantity of base stations that are connected to the terminal in a recent period of time and that carry a dedicated high-speed railway network identifier needs to be counted, but also accumulated duration (corresponding to the fourth duration) that is in a recent period of time (corresponding to the fourth preset duration) and in which the terminal user is in the walking state and accumulated duration (corresponding to the second duration) that is in a recent period of time (corresponding to the second preset duration) and in which the terminal user is in the high-speed train state need to be counted, and then the obtained quantity of base stations and accumulated duration are respectively compared with corresponding thresholds, that is, the first quantity is compared with the first quantity threshold, the fourth duration is compared with the sixth time threshold, and the second duration is compared with the seventh time threshold. When all of the quantity of base stations and the accumulated duration meet preset conditions, for example, the first quantity is greater than the first quantity threshold, the fourth duration is greater than the sixth time threshold, and the second duration is greater than the seventh time threshold, it may be determined that the terminal user is located in a high-speed train that is driving, that is, in the second state.

For example, an application scenario for the manner 4 may be a scenario in which the terminal user enters a high-speed railway station to initially take a subway. In this case, the user initially takes the subway, and there is not a scenario in which the train makes an intermediate stop and continues to drive. Therefore, the first quantity and the walking time before a high-speed train carriage is entered need to be considered.

The manner 3 described above is also a method for determining that the terminal user is in the second state. A difference between the manner 3 and the manner 4 lies in that in the manner 3, the first quantity and the first probability threshold do not need to be considered. This is because the manner 3 may be applied to a scenario in which the high-speed train continues to drive after making an intermediate stop. For the scenario in which the high-speed train continues to drive after making an intermediate stop, only the second probability value (namely, the high-speed train probability value) needs to be considered.

Similarly, the second duration (or the fourth duration) in the manner 4 may be duration including consecutive time points, or may be duration including inconsecutive time points. For related specific example descriptions, refer to the descriptions of the first duration. For brevity, details are not described herein again.

Therefore, in the manner 4, it is jointly determined, based on the first quantity, the first probability value, and the second probability value, that the terminal user is in the state of getting on a high-speed train carriage. This can improve determining accuracy.

When the second state is intelligently determined, this embodiment of this application further provides a network optimization function. For example, when the high-speed train is in a driving process, signal quality in the carriage is relatively poor, and experience of using the intelligent terminal by the user is affected. Therefore, when the second state is intelligently determined, a network acceleration module of the terminal may be turned on or enabled for the user, to accelerate a network connection or perform network optimization, and improve Internet access experience of the user in a high-speed train carriage.

Optionally, in a possible implementation, as shown in FIG. 5A and FIG. 5B, the method 400 further includes the following step:

S408: Enable the network acceleration module when determining that the terminal user is in the second state.

Optionally, the network acceleration module may be implemented through full network aggregation acceleration technology (Link Turbo) network optimization. A Link Turbo network optimization function means to bring mobile Internet access experience with a high network speed and a stable low delay to the user in a changing network condition through network technology innovation on a terminal side, combination of applications and network partners, and cloud-based collaborative network aggregation. That is, Link Turbo pre-predicts that the terminal enters a cellular network freeze circle, and performs network optimization by using the network acceleration module, to avoid impact on Internet access experience of the user. Network signal quality in a high-speed train carriage that is driving is not stable enough. Therefore, Link Turbo is enabled to improve Internet access experience when the user takes a high-speed train.

A specific occasion for enabling the network acceleration module is not limited in this embodiment of this application. In an implementation, the network acceleration module is automatically enabled provided that it is intelligently determined that the user is in the second state. In another implementation, before the network acceleration module is enabled, a screen-on state of the terminal may be determined first, and then whether the network acceleration module is enabled is determined based on the screen-on state. In still another implementation, before the network acceleration module is enabled, it may be further determined whether the user is using an APP, and then whether the network acceleration module is enabled is determined based on whether the user is using an APP. In still another implementation, after the second state is entered for a period of time, if it is determined that the user turns on the mobile phone in the period of time, and the screen is continuously turned on for 10 seconds to 20 seconds, or an APP is opened, the network acceleration module is automatically enabled. The implementations are separately described below.

Optionally, in a possible implementation, before the enabling the network acceleration module, the method further includes:

- determining whether the terminal is in the screen-on state; and
- enabling the network acceleration module if the terminal is in the screen-on state; or
- not enabling the network acceleration module if the terminal is not in the screen-on state.

Herein, whether the terminal is in the screen-on state may be determined after the second state is intelligently determined. If it is detected that the terminal is in the screen-on state, the user may be currently using the terminal. To improve experience of using the terminal in the high-speed train (for example, optimizing a network and increasing an Internet access speed of the user), the network acceleration module may be enabled. If it is detected that the terminal is not in the screen-on state, it indicates that the user does not use the terminal. To reduce power consumption, the network acceleration module may not be enabled.

Optionally, in a possible implementation, after the enabling the network acceleration module, the method further includes:

- displaying a prompt box (or a prompt window) to the user, where the prompt box includes a first option and a second option, the first option is used to choose to disable the network acceleration module, and the second option is used to choose to continue to enable the network acceleration module.

If the user taps the first option, the network acceleration module is disabled, to avoid an increase in network traffic and reduce power consumption of the terminal. If the user taps the second option, a state of enabling the network acceleration module is maintained.

It may be understood that after the user selects the first option or the second option, the prompt box automatically disappears.

Optionally, if the user does not perform selection (for example, neither taps the first option nor taps the second option), it is considered, by default, that the network acceleration module of the terminal continues to be enabled. In addition, if the user does not perform selection after preset duration, the prompt box automatically disappears after staying for 5 seconds.

It may be understood that, that the prompt box automatically disappears means that the prompt box is not displayed in the interface and may be hidden in a notification bar. When the user needs to view the prompt box again, the prompt box may be found in a message list in the notification bar (for example, a drop-down notification bar). For example, if the user has not had time to perform selection after entering a high-speed train carriage, the user performs an operation on the option in the prompt box when viewing a message in the notification bar after a period of time.

An example in which the network optimization module is implemented by using Link Turbo is used. In this case, after it is identified that the terminal user is in the second state (for example, located in a high-speed train carriage that is driving), the prompt box may pop up on the screen of the mobile phone, to prompt the user that the Link Turbo function is enabled. In an interface shown in FIG. 17, the interface includes a dialog box 1001. The dialog box 1001 may be used to prompt the user that the Link Turbo function is enabled. Optionally, the dialog box 1001 includes a disable option 1002 and a continue to enable option 1003. If the user taps the disable option 1002, the Link Turbo function may be disabled. If the user taps the continue to enable option 1003, the Link Turbo function continues to be enabled.

It should be understood that a specific interface in which the dialog box 1001 is located is not limited in this embodiment of this application. For example, if the user does not use the terminal, the dialog box 1001 is displayed in the lock screen interface. For another example, if the user is using the terminal, the dialog box 1001 is displayed in the notification bar.

Optionally, in a possible implementation, before the enabling the network acceleration module, the method further includes:

- detecting whether the user is currently using the mobile phone; and
- enabling the network acceleration module when detecting that the user is using the mobile phone.

For example, in a high-speed train carriage that is driving, the user needs to use the mobile phone while taking the high-speed train. In this case, if it is detected that the terminal is in a screen-on state, the network acceleration module is enabled. If it is detected that the user does not use the mobile phone, the network acceleration module is not enabled.

A scenario in which the network acceleration module is not enabled is not specifically limited in this embodiment of this application. For example, after the mobile phone automatically enables the Link Turbo function, the user may choose to disable the Link Turbo function, for example, tap the disable option 1002 in FIG. 17. For another example, in a setting of smart travel, the user may choose to disable the Link Turbo function in the high-speed train state by default.

This embodiment of this application further provides a setting option for a high-speed train mode. In the setting option for the high-speed train mode, the user may choose to enable or disable a network acceleration function by default.

Optionally, in a possible implementation, the method further includes:

displaying a first setting interface, where the first setting interface includes a high-speed train setting control; and entering a high-speed train setting interface in response to an operation performed by the user on the high-speed train setting control, where the high-speed train setting interface includes a third option, and the third option is used to choose to enable or disable the network acceleration module in the second state by default.

The user may preset, in the high-speed train setting control, whether to enable the network acceleration module in the high-speed train state by default. If the user sets that the network acceleration module in the high-speed train state is enabled by default, the network acceleration module is automatically enabled after a scenario in which the high-speed train is driving is intelligently identified (for example, the second state is entered), to improve Internet access experience when the user takes a high-speed train. If the user sets that the network acceleration module in the high-speed train state is disabled by default, the network acceleration module is not automatically enabled even after a scenario in which the high-speed train is driving is identified (for example, the subway carriage is entered), to reduce power consumption.

For example, the high-speed train setting interface may include an on/off option indicating whether to enable Link Turbo by default.

Figure 18A:
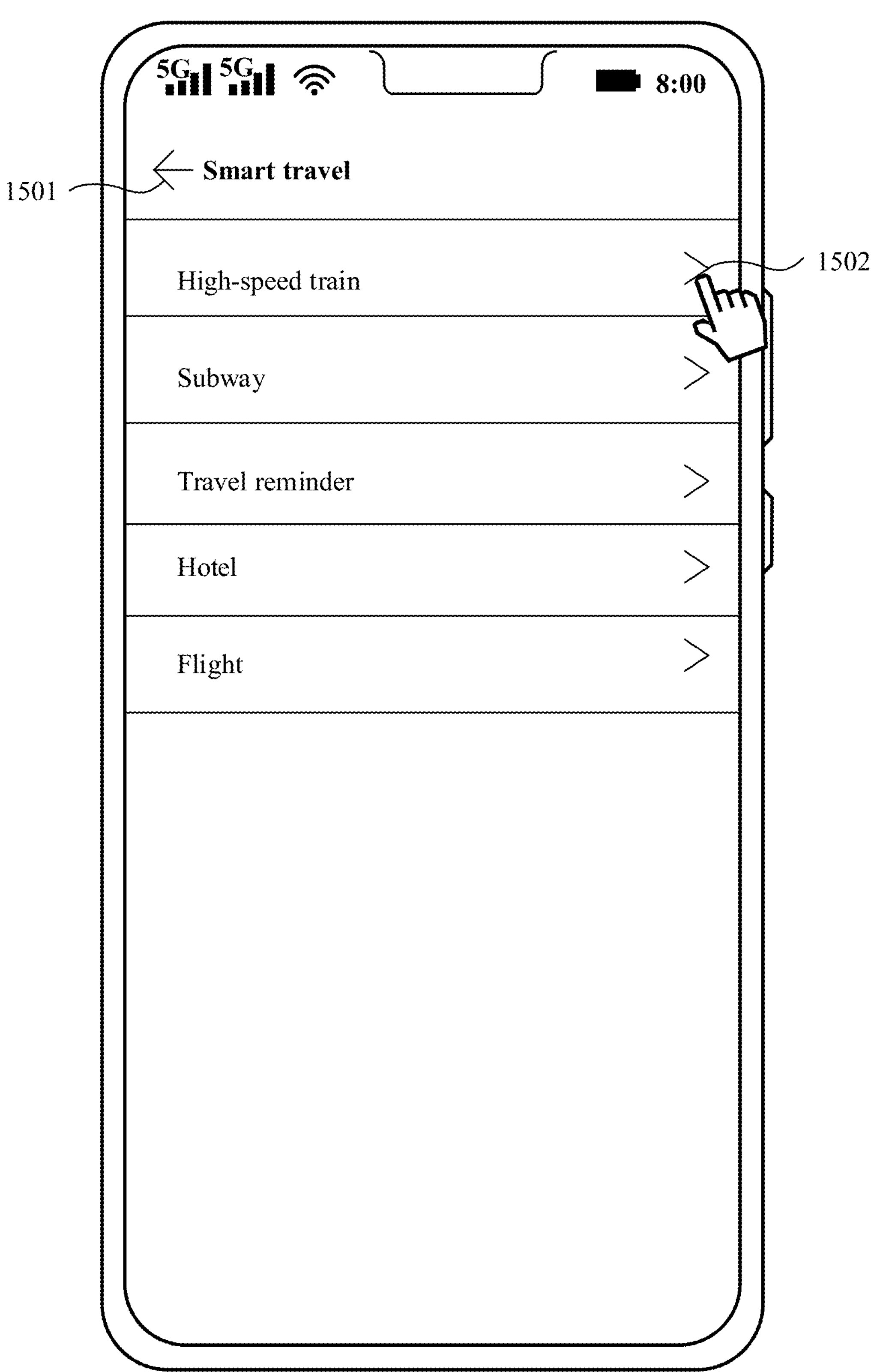
FIG. 18A and FIG. 18B are an example diagram of an interface of a setting option for smart travel according to an embodiment of this application.
Figure 18B:
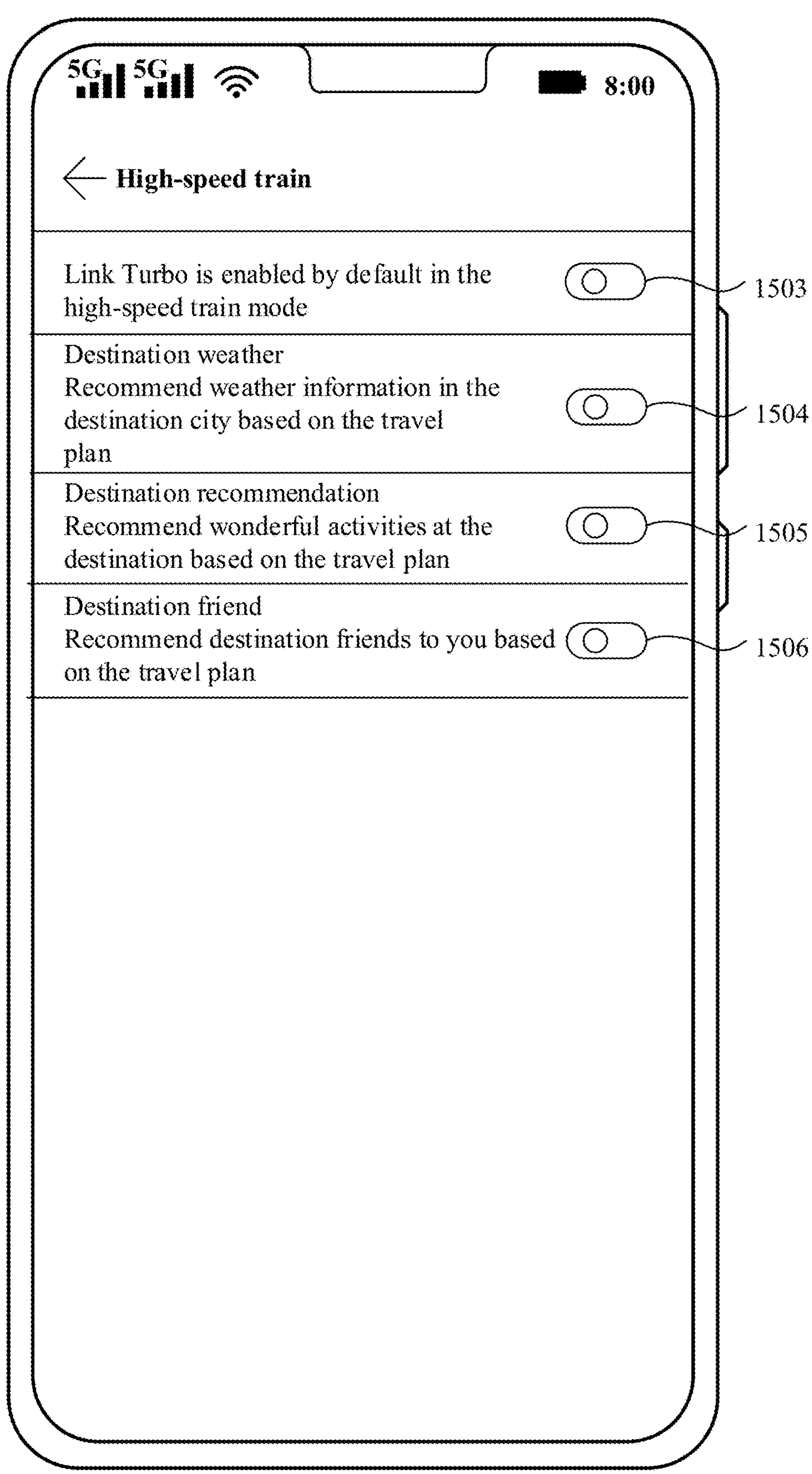

FIG. 18A and FIG. 18B are an example diagram of an interface of a setting option for smart travel. For example, the first setting interface may be a setting interface for smart travel 1501 shown in FIG. 18A. As shown in FIG. 18A, the setting interface for smart travel includes a high-speed train setting 1502. Optionally, the setting interface for smart travel 1501 further includes a subway setting, a travel reminder setting, a hotel setting, and a flight setting. It should be understood that the setting interface for smart travel may further include more setting functions about travel. This is merely an example for description, and this embodiment of this application is not limited thereto.

After the user taps the high-speed train setting 1502 in FIG. 18A, an interface shown in FIG. 18B is displayed. For example, the high-speed train setting interface may be the interface shown in FIG. 18B. The interface shown in FIG. 18B includes an on/off option 1503 (corresponding to the third option) for enabling Link Turbo by default in the high-speed train mode.

If the user selects the on option 1503, the Link Turbo function is automatically enabled after it is detected that the terminal user is in the state of getting on a high-speed train. If the user selects the off option 1503, the Link Turbo function is not enabled after it is detected that the terminal user is in the state of getting on a high-speed train.

It may be understood that the high-speed train setting interface may further include another setting function.

Optionally, as shown in FIG. 18B, the high-speed train setting interface further includes a destination weather recommendation option 1504, a destination recommendation option 1505, and a destination friend recommendation option 1506.

If the destination weather recommendation option 1504 is enabled, a weather condition in a destination city may be recommended to the user. If the destination recommendation option 1505 is enabled, a wonderful activity at a destination may be recommended to the user. If the destination friend option 1506 is enabled, a friend at the destination may be recommended to the user (for example, if contact information stored in an address book includes a city in which a contact is located, information about a friend in the corresponding city may be recommended to the user).

Optionally, in a possible implementation, the detecting that the user uses the mobile phone includes but is not limited to the following manners:

detecting that the user opens an application APP; and detecting that the mobile phone is switched from a screen-off state to the screen-on state for a period of time (for example, 10 seconds to 20 seconds).

It may be understood that the APP may be software that comes with the terminal, or may be a third-party APP (for example, an APP downloaded and installed by the user). The terminal may detect any type of APP that is opened.

For example, if the user opens a music APP, the network acceleration module is automatically enabled. In addition, a dialog box may further pop up in the notification bar, to remind the user that the network acceleration module is enabled. The dialog box may include a disable option or a continue to enable option.

Optionally, when the second state or the third state is intelligently determined, this embodiment of this application further provides a function of recommending long-distance public transportation navigation.

Optionally, in a possible implementation, when it is determined that the state of the terminal user is the second state or the third state, the method further includes:

displaying a fifth interface, where the fifth interface includes a third window, the third window is used to display information about long-distance public transportation navigation to the user, and the third window includes a fourth control;

detecting an operation performed on the fourth control; and displaying a sixth interface in response to the operation performed on the fourth control, where the sixth interface includes one or more of the following information: information about all stations of a current train number, information about a passed station, and information about a current station.

That is, if it is determined that the terminal user is in the second state or the third state, a function of long-distance public transportation navigation may be further recommended to the user, to help improve user experience.

For example, the fifth interface may be displayed on the mobile phone, and the third window pops up in the fifth interface, to display the information about long-distance public transportation navigation in the third window. The third window may include the fourth control. The fourth control provides an entry for the user to query detailed long-distance public transportation navigation (for example, details about the current train number). When the user taps the fourth control, a jump to the sixth interface may be made to display specific navigation information to the user.

An application corresponding to the function of long-distance public transportation navigation is not specifically limited in this embodiment of this application, and may be a third-party APP, or may be an APP that comes with the system, for example, Qunar APP, Railway 12306 APP, Ctrip APP, or another travel APP.

For ease of understanding, descriptions are provided below by using an interface in FIG. 19A, FIG. 19B, and FIG. 19C as an example.

Figure 19A:
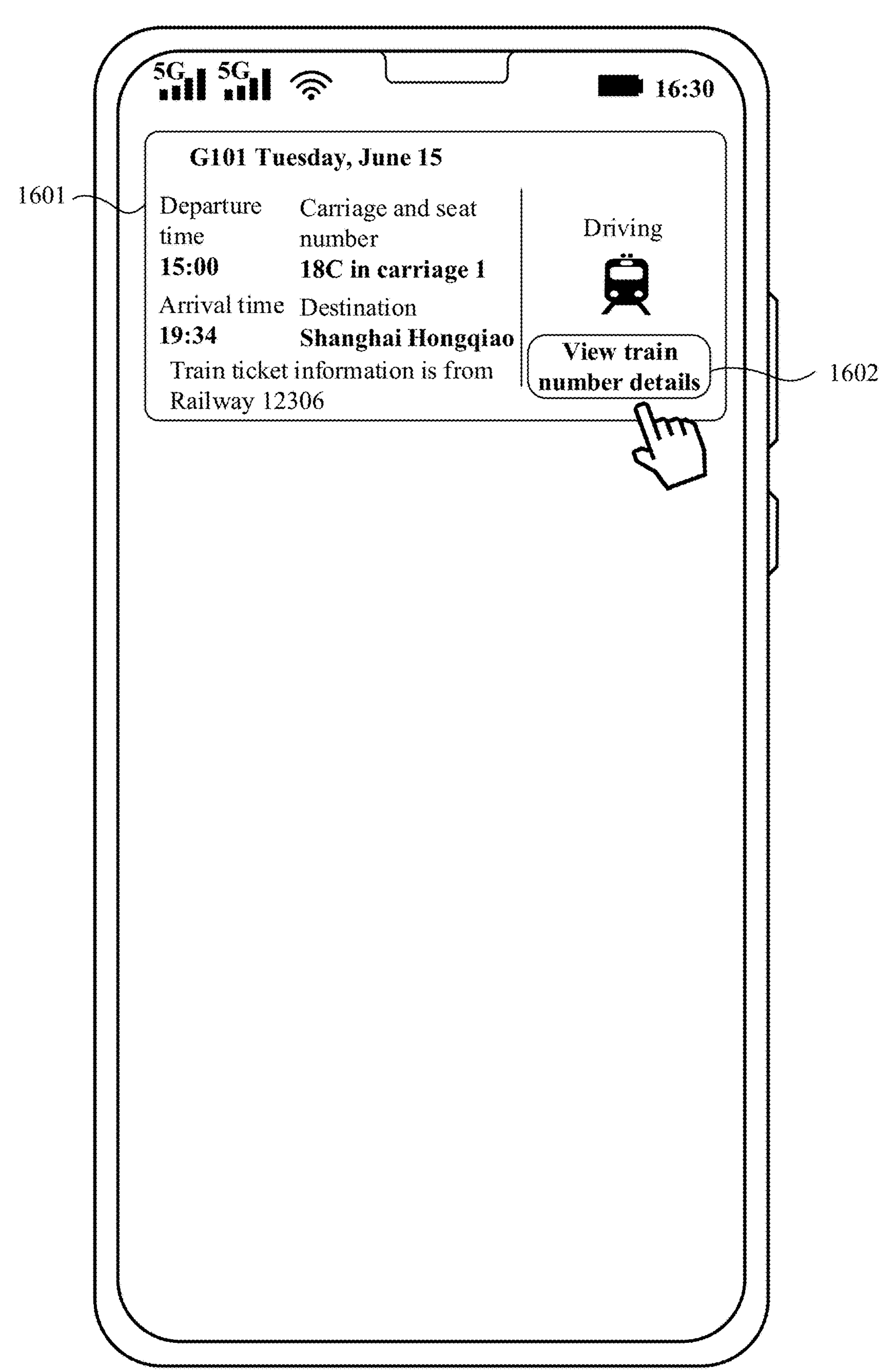
FIG. 19A, FIG. 19B, and FIG. 19C are an example diagram of an interface presented when a terminal user is in a second state or a third state.
Figure 19B:
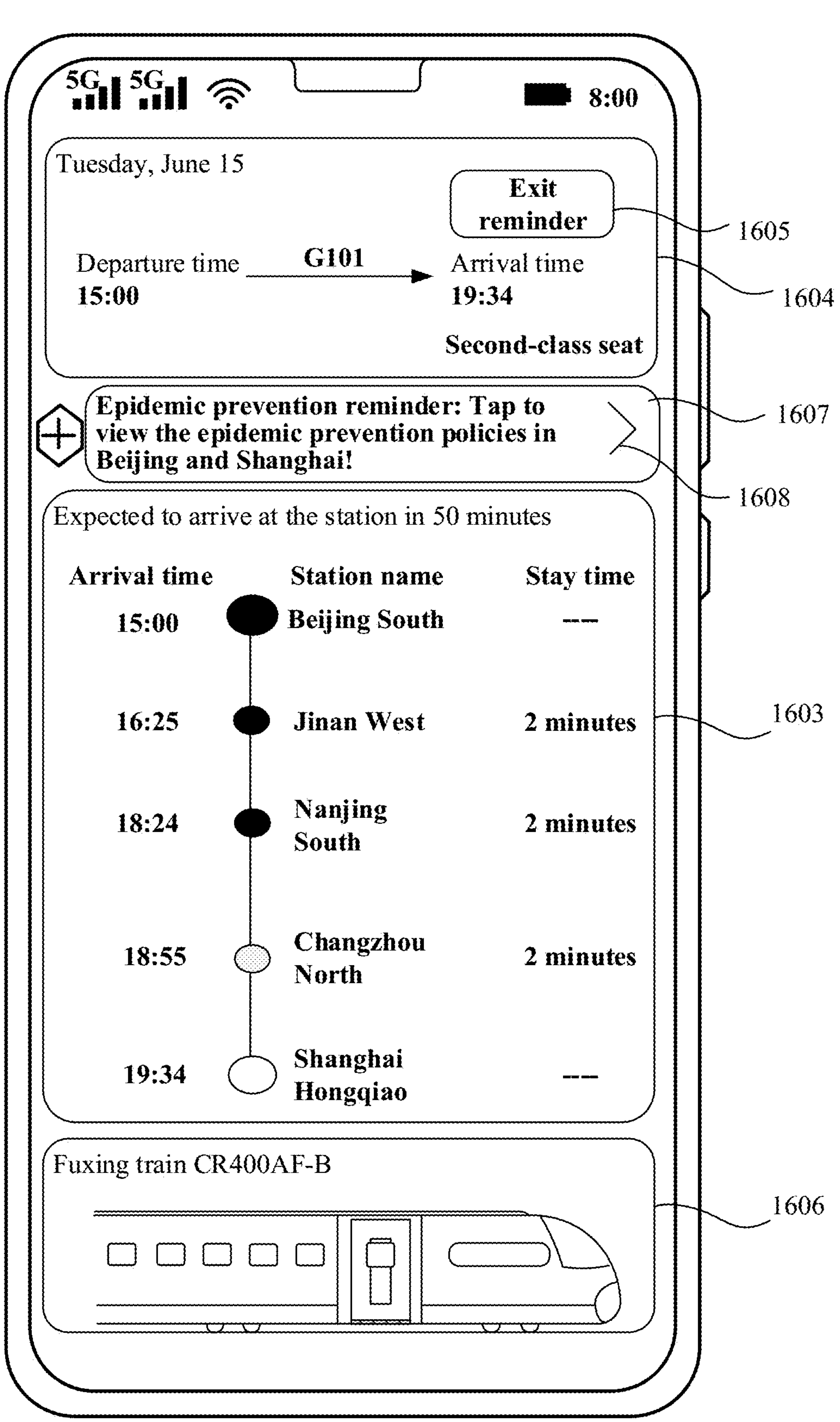
Figure 19C:
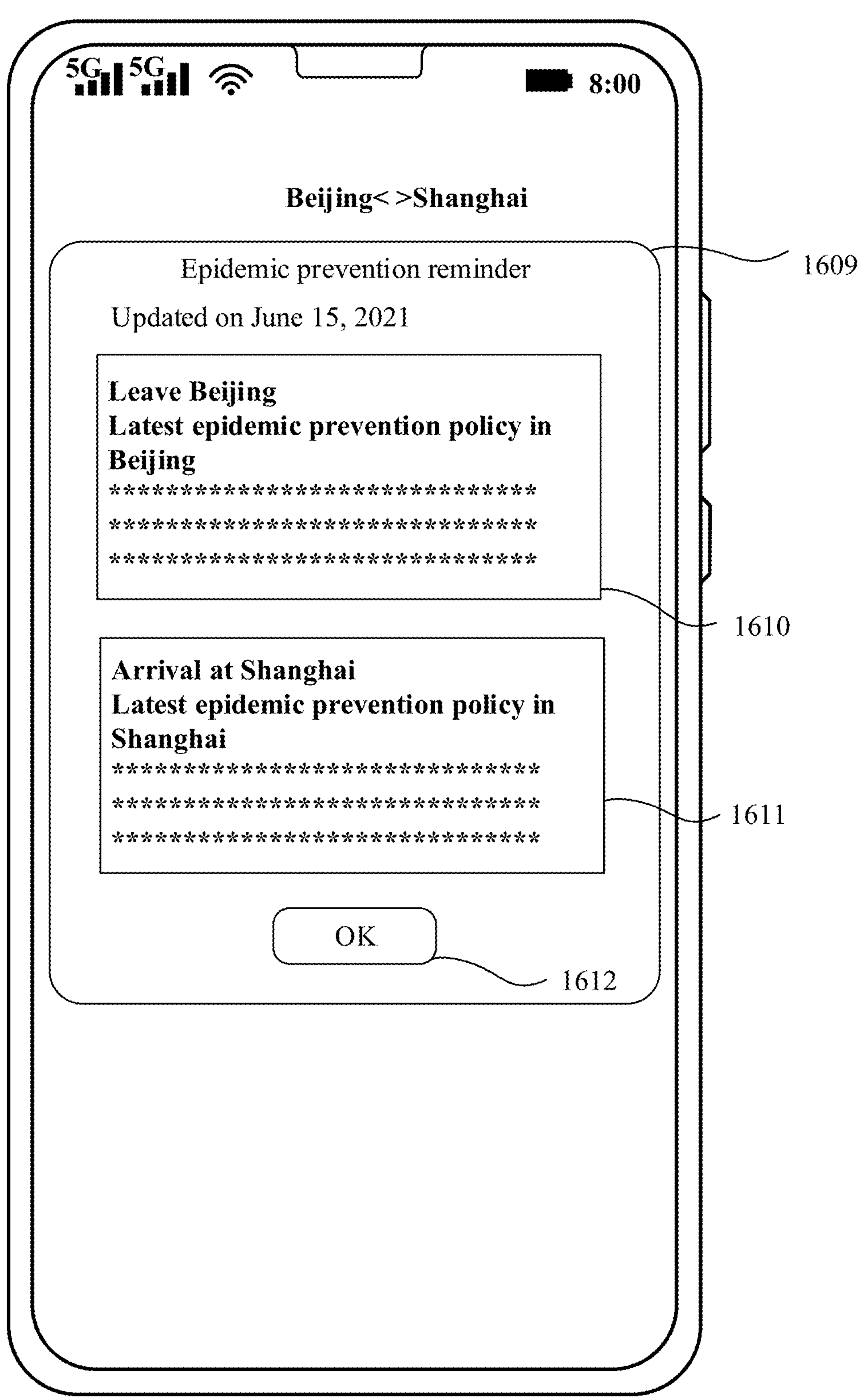

FIG. 19A, FIG. 19B, and FIG. 19C are an example diagram of an interface for recommending long-distance public transportation when the user is located in a high-speed train carriage (for example, is in the second state or the third state) according to an embodiment of this application. When it is determined that the state of the terminal user is the second state or the third state, an interface (corresponding to the fifth interface) of the mobile phone may be shown in FIG. 19A. The interface shown in FIG. 19A includes a window 1601 (corresponding to the third window), and specific information about a train number of a high-speed train that the user currently takes may be displayed in the window 1601.

For example, the train number G101, a time, that is, Tuesday, June 15, a departure time (for example, 16:25) of the user, an arrival time (19:34), a destination (for example, Shanghai Hongqiao), a carriage and seat number (18C in carriage 1), a current driving state, that is, driving, and a source (for example, the Railway 12306 APP) of train ticket information are displayed in the window 1601.

Optionally, the window 1601 may further include a control 1602 (corresponding to the fourth control) for viewing train number details. When the user taps the control 1602, the mobile phone displays the sixth interface, for example, an interface shown in FIG. 19B.

In the interface shown in FIG. 19B, the mobile phone displays a window 1603 to the user. The window 1603 may include information about all stations of the current train number (for example, all the stations of the current train number that are displayed in the window 1603 include Beijing South, Jinan West, Nanjing South, Changzhou North, and Shanghai Hongqiao), an arrival time of each station, and a time of staying at each station after the station is arrived.

Optionally, the interface shown in FIG. 19B further includes a window 1604. Information included in the window 1604 is similar to that included in the window 1601. For example, the window 1604 includes a departure time (15:00), an arrival time (19:34), and a seat number type (for example, a second-class seat). Optionally, the window 1604 may further include an exit reminder control 1605. If the user taps the control 1605, after the station is arrived, the user is reminded that the destination is arrived.

Optionally, the interface shown in FIG. 19B further includes a window 1606. The window 1606 is configured to display model information of the current train number, for example, Fuxing train CR400AF-B, appearance display of the carriage, and the like.

Optionally, the interface shown in FIG. 19B further includes an epidemic prevention reminder window 1607. In the window 1607, the user is prompted to tap to view epidemic prevention policies in Beijing and Shanghai. The window 1607 may include an option 1608. If the user needs to view the epidemic prevention policies in Beijing and Shanghai, the user may tap the option 1608.

After the user taps the option 1608, an interface shown in FIG. 19C is displayed. As shown in FIG. 19C, specific epidemic prevention policies in Beijing and Shanghai are displayed in the interface. Specifically, an epidemic prevention reminder window 1609 includes a text bar 1610 and a text bar 1611. A latest epidemic prevention policy in Beijing is displayed in details in the text bar 1610. A latest epidemic prevention policy in Shanghai is displayed in details in the text bar 1611.

Optionally, as shown in FIG. 19C, the epidemic prevention reminder window 1609 may further include a control 1612. After reading the epidemic prevention policy, the user may tap the control 1612. After the user taps 1612, the mobile phone interface may continue to display the interface shown in FIG. 19B, to help the user view station information.

It should be understood that the interface example in FIG. 19A, FIG. 19B, and FIG. 19C does not constitute a limitation on this embodiment of this application. Actually, there may be another page display possibility for the interface in FIG. 19A, FIG. 19B, and FIG. 19C. This is not limited in this embodiment of this application.

It should be further understood that the interface in FIG. 19A, FIG. 19B, and FIG. 19C is merely described by using a change from Beijing to Shanghai as an example, and this embodiment of this application is not limited thereto. Actually, this embodiment of this application is also applicable to another train travel route of the user.

Optionally, when the second state or the third state is intelligently determined, this embodiment of this application further provides a function of recommending travel ride hailing.

Optionally, in a possible implementation, when it is determined that the state of the terminal user is the second state or the third state, the method further includes:

displaying a seventh interface, where the seventh interface includes a fourth window, and the fourth window is used to display a recommendation interface of a ride hailing application to the user.

A type of the ride hailing application is not limited in this embodiment of this application. The ride hailing application may be a ride hailing APP that comes with the system, or may be third-party travel software downloaded by the user, for example, Didi Chuxing, Meituan Chuxing, Hello Chuxing, Baidu Chuxing, or Gaode Chuxing.

Optionally, the fourth window may include a start point input bar and a destination input bar. A start point in the start point input bar may be automatically filled based on a current location point, or may be manually entered by the user. This is not limited. A destination in the destination input bar may be manually entered by the user, may be filled based on travel information (for example, a destination of the high-speed train of the user), or may be recommended based on a nearby popular scenic spot. This is not limited.

Figure 20:
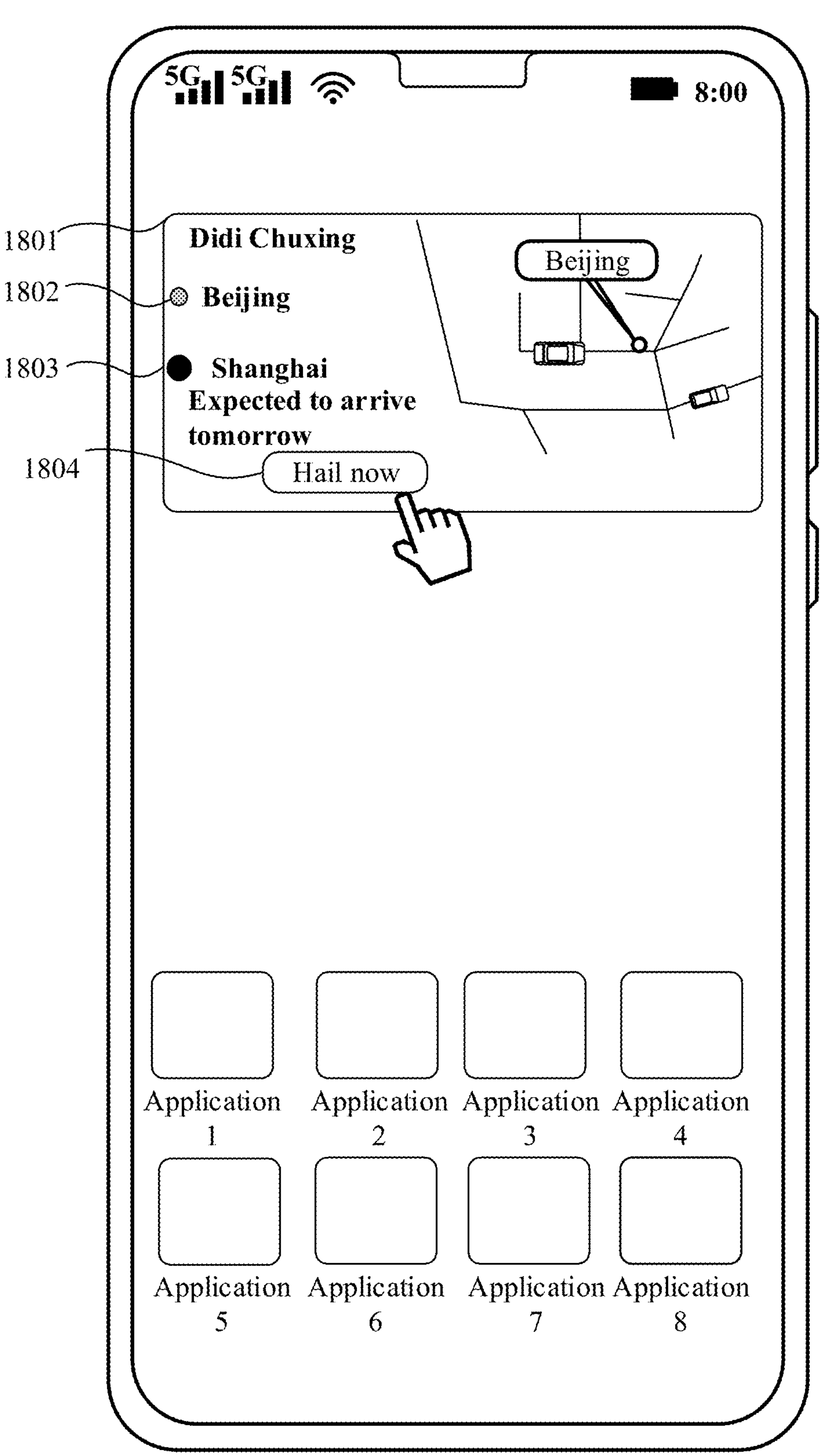
FIG. 20 is an example diagram of another interface presented when a terminal user is in a second state or a third state.

FIG. 20 is an example diagram of another interface presented when the user is located in a high-speed train carriage (for example, is in the second state or the third state) according to an embodiment of this application. In an example, the seventh interface may be the interface shown in FIG. 20.

As shown in FIG. 20, the interface includes a pop-up window 1801 of Didi Chuxing. The pop-up window 1801 includes a start point input bar 1802, a destination point input bar 1803, and a hail now option 1804.

The start point input bar 1802 is used to input a start location. For example, if the mobile phone is currently located in Beijing, Beijing is displayed in the start point input bar 1802. For another example, the user may manually enter the start location in the start point input bar 1802.

The destination point input bar 1803 is used to input a destination. For example, if the user manually enters Shanghai, Shanghai is displayed in the destination input bar 1803. For another example, if it may be identified, based on high-speed train travel information, that the destination is Shanghai, Shanghai is displayed in the destination point input bar 1803.

The hail now option 1804 is used to provide a ride hailing function. If the user taps "hail now", a ride hailing service may be provided for the user.

The pop-up window 1801 may further include other information. For example, a real-time map is displayed in an upper-right area of the pop-up window 1801. The real-time map includes information such as a current location point (Beijing), a nearest available vehicle in a surrounding area, and a map of the current location.

Optionally, the interface shown in FIG. 20 may further include an application 1, an application 2, . . . , and an application 8. An application type is not specifically limited in this embodiment of this application.

It may be understood that the interface shown in FIG. 20 is merely an example for description, and this embodiment of this application is not limited thereto. Actually, the pop-up window 1801 may further include more information.

It may be further understood that in FIG. 20, the pop-up window of Didi Chuxing is merely used as an example for description, and this embodiment of this application is not limited thereto. Actually, other ride hailing software is also applicable to this embodiment of this application.

Optionally, when the second state or the third state is intelligently determined, a high-speed railway line map may be further displayed to the user.

Figure 21A:
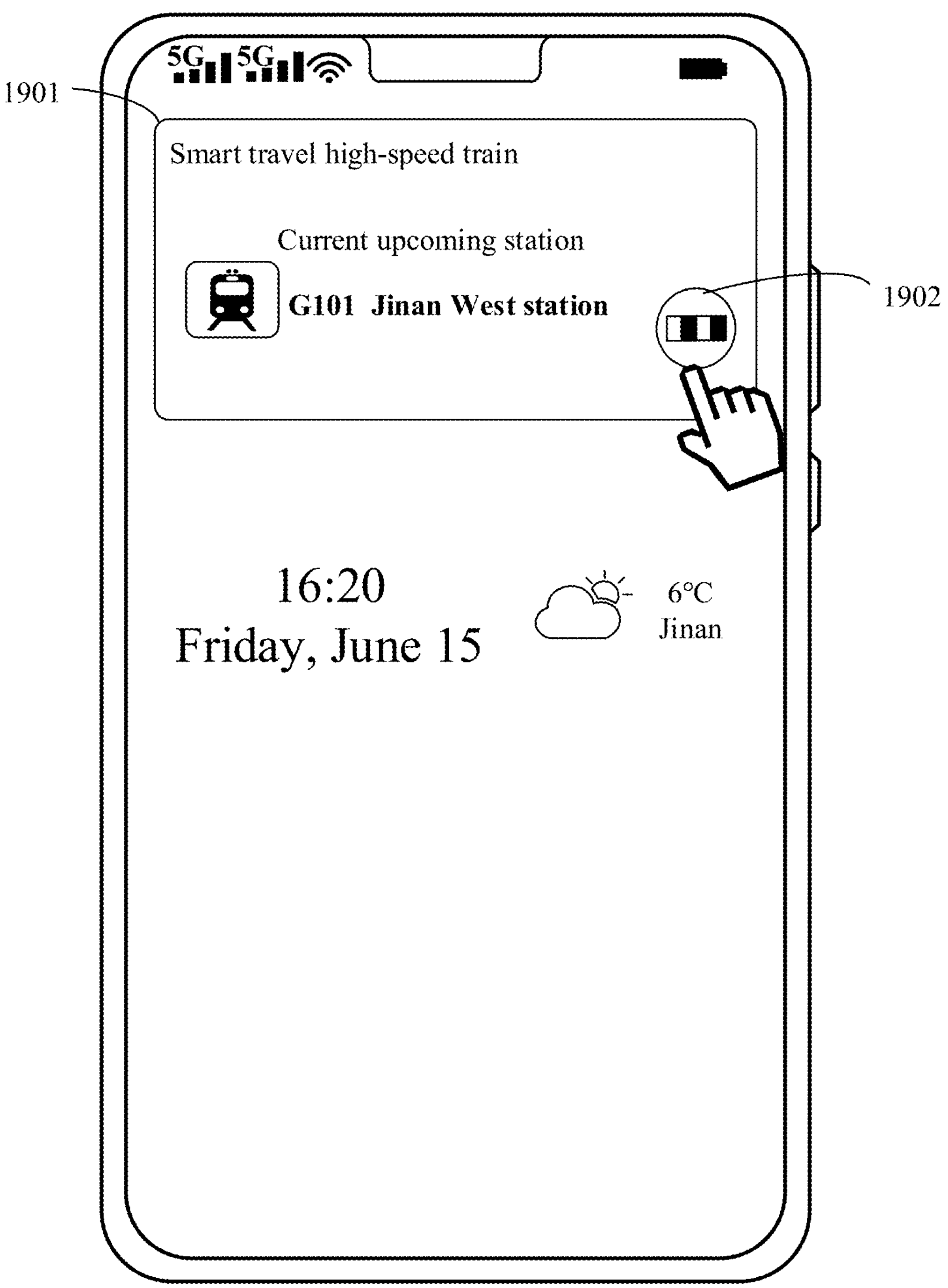
FIG. 21A and FIG. 21B are an example diagram of still another interface presented when a terminal user is in a second state or a third state.
Figure 21B:
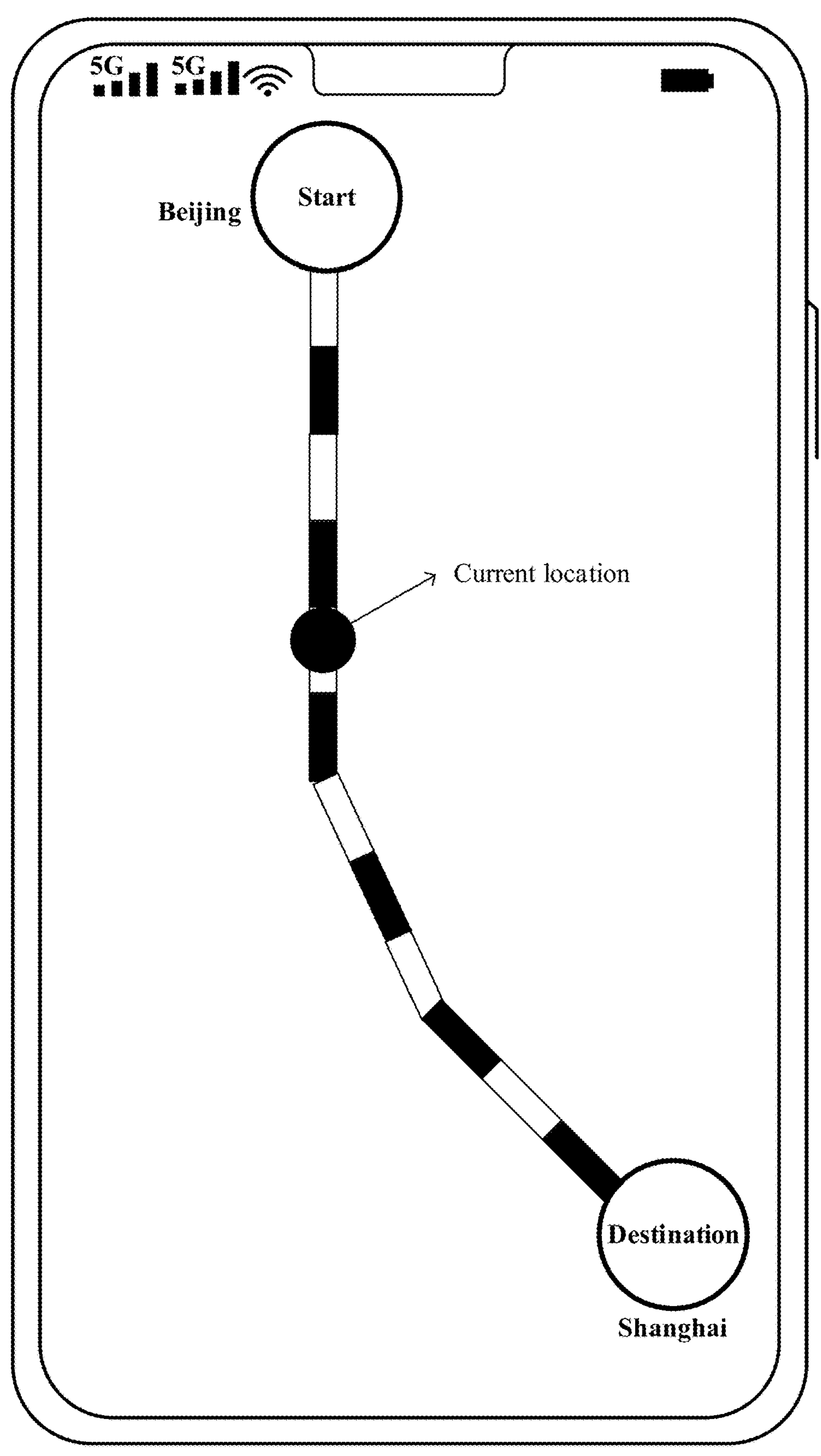

FIG. 21A and FIG. 21B are an example diagram of still another interface presented when the user is located in a high-speed train carriage (for example, is in the second state or the third state) according to an embodiment of this application.

In an interface shown in FIG. 21A, after it is detected that the user is in the second state or the third state, a window 1901 may pop up. The current high-speed train number (for example, G101) and an upcoming station (for example, the Jinan West station) may be displayed in the window 1901.

Optionally, the window 1901 may further include a control 1902. The control 1902 is an entry to the high-speed railway line map. After the user taps the control 1902, interface display of the high-speed railway line map may be entered. The high-speed railway line map may be a high-speed railway line map (which may be specifically a high-speed railway line map displayed on a map) corresponding to the current train number.

In a possible implementation, after the user taps the control 1902, an interface shown in FIG. 21B may be displayed. The interface shown in FIG. 21B is the high-speed railway line map corresponding to the current train number. A start location (Beijing) and an arrival location (Shanghai) of the train number and a current location of the user may be further displayed in the interface shown in FIG. 21B, so that the user learns of the current location of the user in real time.

It should be understood that the interface shown in FIG. 21B is merely a simplified example for description. Actually, in an actual interface, names of all the stations corresponding to the train number may be displayed together in the interface, to facilitate viewing by the user.

It should be further understood that the interface in FIG. 21A and FIG. 21B is merely an example for description, and this embodiment of this application is not limited thereto.

It should be further understood that the example diagrams of the mobile phone interfaces shown in this embodiment of this application are merely for ease of understanding by a person skilled in the art, and are not intended to limit this embodiment of this application to specific example scenarios.

The terminal state identification method provided in the embodiments of this application is described in detail above with reference to FIG. 1 to FIG. 21A and FIG. 21B. An apparatus embodiment of this application is described in detail below with reference to FIG. 22.

It should be understood that the terminal state identification apparatus in the embodiments of this application may perform the embodiments of the various terminal state identification methods in the embodiments of this application. That is, for specific working processes of the following products, refer to the corresponding processes in the foregoing method embodiments.

Figure 22:
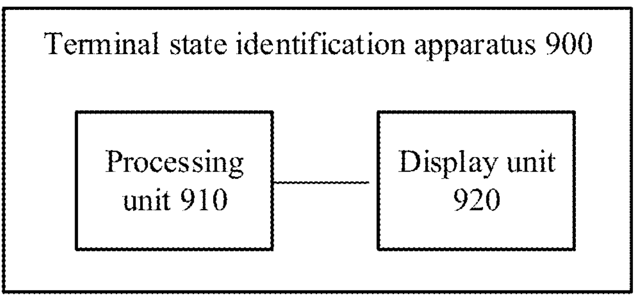
FIG. 22 is a schematic block diagram of a terminal state identification apparatus according to an embodiment of this application.

FIG. 22 is a schematic block diagram of a terminal state identification apparatus 900 according to an embodiment of this application. As shown in FIG. 22, the apparatus 900 includes a processing unit 910 and a display unit 920.

It should be understood that the apparatus 900 may perform the terminal state identification method shown in FIG. 5A and FIG. 5B to FIG. 21A and FIG. 21B. In a possible example, the apparatus 900 may be a terminal device.

In a possible example, the processing unit 910 is configured to:

obtain acceleration data of a terminal by using an acceleration sensor;

determine a first probability value based on the acceleration data, where the first probability value is used to represent a probability that the terminal is in a walking state, and when the first probability value is greater than a first probability threshold, the terminal is in the walking state;

determine a second probability value based on the acceleration data, where the second probability value is used to represent a probability that the terminal is in a high-speed train state, and when the second probability value is greater than a second probability threshold, the terminal is in the high-speed train state;

determine a state of a terminal user based on the first probability value and the second probability value, where the state of the terminal user includes a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and when determining that the terminal user is in the first state, invoke the display unit 920 to display a first interface, where the first interface includes a first window, and the first window is used to display travel recommendation information for a current location to the user.

Optionally, in a possible implementation, the processing unit 910 is further configured to:

obtain identification information of M access network devices, where the M access network devices are a plurality of access network devices recently connected to the terminal user;

and determine a first quantity based on the identification information of the M access network devices, where the first quantity is a quantity of first access network devices in the M access network devices, and the first access network device is an access network device that carries a first identifier; and the determining a state of a terminal user based on the first probability value and the second probability value includes:

determining the state of the terminal user based on the first quantity, the first probability value, and the second probability value.

Optionally, in a possible implementation, when determining that the terminal user is in the first state, the processing unit 910 is further configured to:

detect subway station information based on location information of the terminal;

after identifying a subway station, invoke the display unit 920 to display a second window in the first interface, where the second window is used to display information required for the terminal user to enter the subway station to the user, and the second window includes a first control;

detect an operation performed on the first control; and in response to the operation performed on the first control, invoke the display unit 920 to display a second interface, where the second interface includes a subway boarding code.

Optionally, in a possible implementation, the second window further includes a second control; and the processing unit 910 is further configured to:

detect an operation performed on the second control; and in response to the operation performed on the second control, invoke the display unit 920 to display a third interface, where the third interface includes a personal health code of the terminal user.

Optionally, in a possible implementation, the second window further includes a third control; and the processing unit 910 is further configured to:

detect an operation performed on the third control; and in response to the operation performed on the third control, invoke the display unit 920 to display a fourth interface, where the fourth interface includes a communications itinerary card of the terminal user.

Optionally, in a possible implementation, the processing unit 910 is further configured to:

enable a network acceleration module when determining that the terminal user is in the second state.

Optionally, in a possible implementation, that the processing unit 910 is configured to determine a state of a terminal user based on the first probability value and the second probability value includes:

obtaining a plurality of first probability values in first preset duration;

obtaining, based on the plurality of first probability values, first duration that is in the first preset duration and in which the terminal is in the walking state;

determining whether the first duration is greater than a first time threshold;

obtaining a plurality of second probability values in second preset duration;

obtaining, based on the plurality of second probability values, second duration that is in the second preset duration and in which the terminal is in the high-speed train state;

determining whether the second duration is less than a second time threshold; and when the first duration is greater than the first time threshold and the second duration is less than the second time threshold, determining that the terminal user is in the first state, where the state of the terminal user is switched from the second state to the first state.

Optionally, in a possible implementation, that the processing unit 910 is configured to determine a state of a terminal user based on the first probability value and the second probability value includes:

obtaining a plurality of first probability values in first preset duration;

obtaining, based on the plurality of first probability values, first duration that is in the first preset duration and in which the terminal is in the walking state;

determining whether the first duration is less than a third time threshold;

obtaining a plurality of second probability values in third preset duration;

obtaining, based on the plurality of second probability values, third duration that is in the third preset duration and in which the terminal is in the high-speed train state;

determining whether the third duration is less than a fourth time threshold; and when the first duration is less than the third time threshold and the third duration is less than the fourth time threshold, determining that the terminal user is in the third state, where the state of the terminal user is switched from the second state to the third state.

Optionally, in a possible implementation, that the processing unit 910 is configured to determine a state of a terminal user based on the first probability value and the second probability value includes:

obtaining a plurality of second probability values in second preset duration;

obtaining, based on the plurality of second probability values, second duration that is in the second preset duration and in which the terminal is in the high-speed train state;

determining whether the second duration is greater than a fifth time threshold; and when the second duration is greater than the fifth time threshold, determining that the state of the terminal user is the second state, where the state of the terminal user is switched from the third state to the second state.

Optionally, in a possible implementation, that the processing unit 910 is configured to determine the state of the terminal user based on the first quantity, the first probability value, and the second probability value includes:

determining whether the first quantity is greater than a first quantity threshold;

obtaining a plurality of first probability thresholds in fourth preset duration;

obtaining, based on the plurality of first probability thresholds, fourth duration that is in the fourth preset duration and in which the terminal is in the walking state;

determining whether the fourth duration is greater than a sixth time threshold;

obtaining a plurality of second probability values in second preset duration;

obtaining, based on the plurality of second probability values, second duration that is in the second preset duration and in which the terminal is in the high-speed train state;

determining whether the second duration is greater than a seventh time threshold; and when the first quantity is greater than the first quantity threshold, the fourth duration is greater than the sixth time threshold, and the second duration is greater than the seventh time threshold, determining that the state of the terminal user is the second state, where the state of the terminal user is switched from the first state to the second state.

Optionally, in a possible implementation, the processing unit 910 is further configured to:

after enabling the network acceleration module, invoke the display unit 920 to display a prompt box to the user, where the prompt box includes a first option and a second option, the first option is used to choose to disable the network acceleration module, and the second option is used to choose to continue to enable the network acceleration module.

Optionally, in a possible implementation, when receiving an operation performed on the first option, the processing unit 910 disables the network acceleration module.

Optionally, in a possible implementation, when receiving an operation performed on the second option, the processing unit 910 maintains a state of enabling the network acceleration module.

Optionally, in a possible implementation, the processing unit 910 is further configured to:

before enabling the network acceleration module, detect whether the user is currently using the mobile phone; and enable the network acceleration module when detecting that the user is using the mobile phone.

Optionally, in a possible implementation, the processing unit 910 is further configured to:

determine whether the terminal is in a screen-on state; and enable the network acceleration module if the terminal is in the screen-on state; or not enable the network acceleration module if the terminal is not in the screen-on state.

Optionally, in a possible implementation, the processing unit 910 is further configured to:

when determining that the terminal user is in the second state or the third state, invoke the display unit 920 to display a fifth interface, where the fifth interface includes a third window, the third window is used to display information about long-distance public transportation navigation to the user, and the third window includes a fourth control;

detect an operation performed on the fourth control; and in response to the operation performed on the fourth control, invoke the display unit 920 to display a sixth interface, where the sixth interface includes one or more of the following information: information about a current station, information about a passed station, and information about all stations of a current train number.

Optionally, in a possible implementation, that the processing unit 910 is configured to determine a first probability value based on the acceleration data includes:

calculate the first probability value based on the acceleration data by using a first binary classification network.

Optionally, in a possible implementation, that the processing unit 910 is configured to determine a second probability value based on the acceleration data includes:

calculate the second probability value based on the acceleration data by using a second binary classification network.

Optionally, in a possible implementation, the processing unit 910 is further configured to:

invoke the display unit 920 to display a first setting interface, where the first setting interface includes a high-speed train setting control; and in response to an operation performed by the user on the high-speed train setting control, invoke the display unit 920 to enter a high-speed train setting interface, where the high-speed train setting interface includes a third option, and the third option is used to choose to enable or disable the network acceleration module in the second state by default.

Optionally, in a possible implementation, the processing unit 910 is further configured to:

when determining that the state of the terminal user is the second state or the third state, invoke the display unit 920 to display a seventh interface, where the seventh interface includes a fourth window, and the fourth window is used to display a recommendation interface of a ride hailing application to the user.

It should be understood that the apparatus 900 is embodied in a form of a functional unit. The term "unit" herein may be implemented in a form of software and/or hardware. This is not specifically limited in this embodiment of this application.

For example, the "unit" may be a software program, a hardware circuit, or a combination of a software program and a hardware circuit for implementing the foregoing functions. The hardware circuit may include an application-specific integrated circuit (application specific integrated circuit, ASIC), an electronic circuit, a processor (for example, a shared processor, a dedicated processor, or a processor group) and a memory for executing one or more software or firmware programs, an integrated logic circuit, and/or another proper component that can provide the foregoing functions. In a simple embodiment, a person skilled in the art may figure out that the apparatus 900 may use the form shown in FIG. 4. For example, the processing unit 910 is implemented by using a first detection module, a second detection module, and a subway mode determining module; and the display unit 920 is implemented by using a display driver.

A person of ordinary skill in the art may be aware that the units and the algorithm steps in the examples described with reference to the embodiments disclosed in this specification can be implemented by using electronic hardware or a combination of computer software and electronic hardware. Whether these functions are performed in a hardware or software manner depends on particular applications and design constraints of the technical solutions. A person skilled in the art may use different methods to implement the described functions for each specific application, but it should not be considered that such an implementation goes beyond the scope of this application.

This application further provides a computer program product. When the computer program product is executed by a processor, the method in any method embodiment of this application is implemented.

The computer program product may be stored in a memory, and is finally converted, by performing processing processes such as preprocessing, compiling, assembling, and linking, into an executable target file that can be executed by the processor.

This application further provides a computer-readable storage medium. The computer-readable storage medium stores a computer program. When the computer program is executed by a computer, the method in any method embodiment of this application is implemented. The computer program may be an advanced language program, or may be an executable target program.

The computer-readable storage medium may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and serves as an external cache. Through example descriptions but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that the units and the algorithm steps in the examples described with reference to the embodiments disclosed in this specification can be implemented by using electronic hardware or a combination of computer software and electronic hardware. Whether these functions are performed in a hardware or software manner depends on particular applications and design constraints of the technical solutions. A person skilled in the art may use different methods to implement the described functions for each specific application, but it should not be considered that such an implementation goes beyond the scope of this application.

It may be clearly understood by a person skilled in the art that for convenience and brevity of description, for specific working processes of the described system, apparatus, and unit, refer to the corresponding processes in the foregoing method embodiments. Details are not described herein again.

In several embodiments provided in this application, it should be understood that the disclosed system, apparatus, and method may be implemented in another manner. For example, the apparatus embodiments described above are merely examples. For example, the unit division is merely logical function division, and there may be another division manner in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electrical form, a mechanical form, or another form.

The units described as separate components may or may not be physically separated, and components displayed as units may or may not be physical units, that is, may be located in one place, or may be distributed on a plurality of network units. Some or all of the units may be selected based on actual requirements to achieve the objectives of the solutions in the embodiments.

In addition, the functional units in the embodiments of this application may be integrated into one processing unit, each of the units may exist alone physically, or two or more units may be integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory ROM, a random access memory RAM, a magnetic disk, or an optical disc.

It should be understood that in the embodiments of this application, sequence numbers of the processes do not mean an execution sequence. The execution sequence of the processes should be determined based on functions and internal logic of the processes, and should not be construed as any limitation on the implementation processes of the embodiments of this application.

In addition, the terms "system" and "network" are usually used interchangeably in this specification. The term "and/or" in this specification is merely an association relationship for describing associated objects, and represents that three relationships may exist. For example, A and/or B may represent the following three cases: Only A exists, both A and B exist, and only B exists. In addition, the character "/" in this specification usually represents an "or" relationship between associated objects. For example, A/B may indicate A or B.

The terms (or numbers) "first", "second", and the like that appear in the embodiments of this application are merely used for the purpose of description, that is, used to distinguish between different objects, for example, different "fingerprints", and cannot be understood as an indication or implication of relative importance or an implicit indication of a quantity of indicated technical features. Therefore, a feature defined by "first", "second", or the like can explicitly or implicitly includes one or more features. In the descriptions of the embodiments of this application, "at least one" means one or more; "a plurality of" means two or more; and "at least one of the following" or a similar expression thereof indicates any combination of these items, including a single item or any combination of a plurality of items.

For example, unless otherwise specified, an expression that is similar to the expression "the item includes at least one of the following: A, B, and C" and that appears in the embodiments of this application usually means that the item may be any one of the following: A. B; C; A and B; A and C; B and C; A, B, and C; A and A; A, A, and A; A, A, and B; A, A, and C, and A, B, and B; A, C, and C; B and B, B, B, and B, B, B and C, and C and C; and C, C, and C, and another combination of A, B, and C. Three elements A, B, and C are used above as examples to illustrate an optional entry of the item. When the expression is "the item includes at least one of the following: A, B, . . . , and X", that is, when there are more elements in the expression, an applicable entry of the item may be obtained based on the foregoing rule.

In conclusion, the foregoing descriptions are merely example embodiments of the technical solutions of this application, and are not intended to limit the protection scope of this application. Any modification, equivalent replacement, improvement, and the like made within the spirit and principle of this application shall fall within the protection scope of this application.

The invention claimed is:

1. A terminal state identification method, comprising:

obtaining acceleration data of a terminal by using an acceleration sensor;

determining a first probability value based on the acceleration data, wherein the first probability value is used to represent a probability that the terminal is in a walking state, and when the first probability value is greater than a first probability threshold, the terminal is in the walking state;

determining a second probability value based on the acceleration data, wherein the second probability value is used to represent a probability that the terminal is in a high-speed train state, and when the second probability value is greater than a second probability threshold, the terminal is in the high-speed train state;

determining a state of a terminal user based on the first probability value and the second probability value, wherein the state of the terminal user comprises a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and displaying a first interface when determining that the terminal user is in the first state, wherein the first interface comprises a first window, and the first window is used to display travel recommendation information for a current location to the user.

2. The method of claim 1, wherein the method further comprises:

obtaining identification information of M access network devices, wherein the M access network devices are a plurality of access network devices recently connected to the terminal user; and determining a first quantity based on the identification information of the M access network devices, wherein the first quantity is a quantity of first access network devices in the M access network devices, and the first access network device is an access network device that carries a first identifier; and the determining a state of a terminal user based on the first probability value and the second probability value comprises:

determining the state of the terminal user based on the first quantity, the first probability value, and the second probability value.

3. The method of claim 1, wherein when it is determined that the terminal user is in the first state, the method further comprises:

detecting subway station information based on location information of the terminal;

displaying a second window in the first interface after identifying a subway station, wherein the second window is used to display information required for the terminal user to enter the subway station to the user, and the second window comprises a first control;

detecting an operation performed on the first control; and displaying a second interface in response to the operation performed on the first control, wherein the second interface comprises a subway boarding code.

4. The method of claim 3, wherein the second window further comprises a third control; and the method further comprises:

detecting an operation performed on the third control; and displaying a fourth interface in response to the operation performed on the third control, wherein the fourth interface comprises a communications itinerary card of the terminal user.

5. The method of claim 1, wherein the method further comprises:

enabling a network acceleration module when determining that the terminal user is in the second state.

6. The method of claim 1, wherein the determining a state of a terminal user based on the first probability value and the second probability value comprises:

obtaining a plurality of first probability values in first preset duration;

obtaining, based on the plurality of first probability values, first duration that is in the first preset duration and in which the terminal is in the walking state;

determining whether the first duration is greater than a first time threshold;

obtaining a plurality of second probability values in second preset duration;

obtaining, based on the plurality of second probability values, second duration that is in the second preset duration and in which the terminal is in the high-speed train state;

determining whether the second duration is less than a second time threshold; and when the first duration is greater than the first time threshold and the second duration is less than the second time threshold, determining that the terminal user is in the first state, wherein the state of the terminal user is switched from the second state to the first state.

7. The method of claim 1, wherein the determining a state of a terminal user based on the first probability value and the second probability value comprises:

obtaining a plurality of first probability values in first preset duration;

obtaining, based on the plurality of first probability values, first duration that is in the first preset duration and in which the terminal is in the walking state;

determining whether the first duration is less than a third time threshold;

obtaining a plurality of second probability values in third preset duration;

obtaining, based on the plurality of second probability values, third duration that is in the third preset duration and in which the terminal is in the high-speed train state;

determining whether the third duration is less than a fourth time threshold; and when the first duration is less than the third time threshold and the third duration is less than the fourth time threshold, determining that the terminal user is in the third state, wherein the state of the terminal user is switched from the second state to the third state.

8. The method of claim 1, wherein the determining a state of a terminal user based on the first probability value and the second probability value comprises:

obtaining a plurality of second probability values in second preset duration;

obtaining, based on the plurality of second probability values, second duration that is in the second preset duration and in which the terminal is in the high-speed train state;

determining whether the second duration is greater than a fifth time threshold; and when the second duration is greater than the fifth time threshold, determining that the state of the terminal user is the second state, wherein the state of the terminal user is switched from the third state to the second state.

9. The method of claim 2, wherein the determining the state of the terminal user based on the first quantity, the first probability value, and the second probability value comprises:

determining whether the first quantity is greater than a first quantity threshold;

obtaining a plurality of first probability thresholds in fourth preset duration;

obtaining, based on the plurality of first probability thresholds, fourth duration that is in the fourth preset duration and in which the terminal is in the walking state;

determining whether the fourth duration is greater than a sixth time threshold;

obtaining a plurality of second probability values in second preset duration;

obtaining, based on the plurality of second probability values, second duration that is in the second preset duration and in which the terminal is in the high-speed train state;

determining whether the second duration is greater than a seventh time threshold; and when the first quantity is greater than the first quantity threshold, the fourth duration is greater than the sixth time threshold, and the second duration is greater than the seventh time threshold, determining that the state of the terminal user is the second state, wherein the state of the terminal user is switched from the first state to the second state.

10. The method of claim 5, wherein after the enabling a network acceleration module, the method further comprises:

displaying a prompt box to the user, wherein the prompt box comprises a first option and a second option, the first option is used to choose to disable the network acceleration module, and the second option is used to choose to continue to enable the network acceleration module.

11. The method of claim 1, wherein the method further comprises:

displaying a fifth interface when determining that the terminal user is in the second state or the third state, wherein the fifth interface comprises a third window, the third window is used to display information about long-distance public transportation navigation to the user, and the third window comprises a fourth control;

detecting an operation performed on the fourth control; and displaying a sixth interface in response to the operation performed on the fourth control, wherein the sixth interface comprises one or more of the following information:

information about a current station, information about a passed station, and information about all stations of a current train number.

12. The method of claim 1, wherein the determining a first probability value based on the acceleration data comprises:

calculating the first probability value based on the acceleration data by using a first binary classification network.

13. The method of claim 1, wherein the determining a second probability value based on the acceleration data comprises:

calculating the second probability value based on the acceleration data by using a second binary classification network.

14. The method of claim 1, wherein the method further comprises:

displaying a first setting interface, wherein the first setting interface comprises a high-speed train setting control; and entering a high-speed train setting interface in response to an operation performed by the user on the high-speed train setting control, wherein the high-speed train setting interface comprises a third option, and the third option is used to choose to enable or disable the network acceleration module in the second state by default.

15. An electronic device, comprising:

a processor; and a memory, wherein the processor is coupled to the memory, the memory is configured to store a computer program, and when the computer program is executed by the processor, the electronic device is configured to:

obtain acceleration data of a terminal by using an acceleration sensor;

determine a first probability value based on the acceleration data, wherein the first probability value is used to represent a probability that the terminal is in a walking state, and when the first probability value is greater than a first probability threshold, the terminal is in the walking state;

determine a second probability value based on the acceleration data, wherein the second probability value is used to represent a probability that the terminal is in a high-speed train state, and when the second probability value is greater than a second probability threshold, the terminal is in the high-speed train state;

determine a state of a terminal user based on the first probability value and the second probability value, wherein the state of the terminal user comprises a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and display a first interface when determining that the terminal user is in the first state, wherein the first interface comprises a first window, and the first window is used to display travel recommendation information for a current location to the user.

16. A non-transitory computer-readable storage medium storing instructions that, when executed by one or more processors of an electronic device, cause the electronic device to be configured to:

obtain acceleration data of a terminal by using an acceleration sensor;

determine a first probability value based on the acceleration data, wherein the first probability value is used to represent a probability that the terminal is in a walking state, and when the first probability value is greater than a first probability threshold, the terminal is in the walking state;

determine a second probability value based on the acceleration data, wherein the second probability value is used to represent a probability that the terminal is in a high-speed train state, and when the second probability value is greater than a second probability threshold, the terminal is in the high-speed train state;

determine a state of a terminal user based on the first probability value and the second probability value, wherein the state of the terminal user comprises a first state, a second state, and a third state, the first state is a state in which the terminal user leaves a high-speed train carriage, the second state is a state in which the terminal user is located in a high-speed train carriage and a high-speed train is driving, and the third state is a state in which the terminal user is located in a high-speed train carriage and a high-speed train stops running; and display a first interface when determining that the terminal user is in the first state, wherein the first interface comprises a first window, and the first window is used to display travel recommendation information for a current location to the user.

17. The electronic device of claim 15, wherein when the computer program is executed by the processor, the electronic device is further configured to:

obtain identification information of M access network devices, wherein the M access network devices are a plurality of access network devices recently connected to the terminal user; and determine a first quantity based on the identification information of the M access network devices, wherein the first quantity is a quantity of first access network devices in the M access network devices, and the first access network device is an access network device that carries a first identifier; and the determine a state of a terminal user based on the first probability value and the second probability value comprises:

determine the state of the terminal user based on the first quantity, the first probability value, and the second probability value.

18. The electronic device of claim 15, wherein when it is determined that the terminal user is in the first state, the computer program is executed by the processor, the electronic device is further configured to:

detect subway station information based on location information of the terminal;

display a second window in the first interface after identifying a subway station, wherein the second window is used to display information required for the terminal user to enter the subway station to the user, and the second window comprises a first control;

detect an operation performed on the first control; and display a second interface in response to the operation performed on the first control, wherein the second interface comprises a subway boarding code.

19. The electronic device of claim 18, wherein the second window further comprises a third control, and when the computer program is executed by the processor, the electronic device is further configured to:

detect an operation performed on the third control; and display a fourth interface in response to the operation performed on the third control, wherein the fourth interface comprises a communications itinerary card of the terminal user.

20. The electronic device of claim 15, wherein when the computer program is executed by the processor, the electronic device is further configured to:

enable a network acceleration module when determining that the terminal user is in the second state.

* * * * *